(12) United States Patent
Maruyama et al.

(10) Patent No.: US 6,344,249 B1
(45) Date of Patent: Feb. 5, 2002

(54) MULTI-LAYERED ARTICLE

(75) Inventors: Katsuya Maruyama; Takeshi Hara, both of Hiratsuka; Yoshihiro Terada; Takao Ota, both of Tokyo, all of (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/274,340

(22) Filed: Mar. 23, 1999

(30) Foreign Application Priority Data

Mar. 11, 1999 (JP) ............................................ 11-064359

(51) Int. Cl.$^7$ ............................ B29D 22/00; B32B 3/00
(52) U.S. Cl. .................... 428/34.1; 428/36.6; 428/36.7; 425/130; 264/328.8
(58) Field of Search .............................. 428/35.7, 36.6, 428/36.7; 425/430; 264/328.8

(56) References Cited

U.S. PATENT DOCUMENTS

| 4,174,413 A | * | 11/1979 | Yasuike et al. ................ 428/35 |
| 4,535,901 A | * | 8/1985 | Okudaira et al. ............ 215/1 C |
| 4,609,519 A | * | 9/1986 | Krishnakumar et al. .... 264/255 |
| 4,646,925 A | * | 3/1987 | Nohara ........................ 215/1 C |
| 4,994,313 A | * | 2/1991 | Shimizu et al. ............. 428/36.7 |

FOREIGN PATENT DOCUMENTS

| EP | 0 904 922 | 3/1999 |
| JP | 56-130351 | 10/1981 |
| JP | 57-128516 | 8/1982 |
| JP | 57-128520 | 8/1982 |
| JP | 60-240409 | 11/1985 |
| JP | 61-206612 | 9/1986 |
| JP | 5-309648 | 11/1993 |
| JP | 5-309649 | 11/1993 |

* cited by examiner

Primary Examiner—Harold Pyon
Assistant Examiner—Sow-Fun Hon
(74) Attorney, Agent, or Firm—Wenderoth, Lind & Ponack, L.L.P.

(57) ABSTRACT

A multi-layered article having a first portion constituted of laminated three resin layers and a second portion extending from the first portion, the first portion being constituted mainly of consecutively laminated resin layers composed of a first resin layer formed of a first resin, a second resin layer formed mainly of a second resin and a third resin layer formed of the first resin, the second portion being constituted of resin layers extending from the first resin layer and the third resin layer which constitute the first portion, the first resin layer constituting the outer surface layer of the multi-layered article, the third resin layer constituting the inner surface layer of the multi-layered article which inner surface layer is opposed to said outer surface layer, the second resin layer being encapsulated with the first resin layer and the third resin layer, the second resin layer having a thickness which decreases towards the second portion, and being discontinued, in a region of the first portion in the vicinity of the second portion.

31 Claims, 37 Drawing Sheets

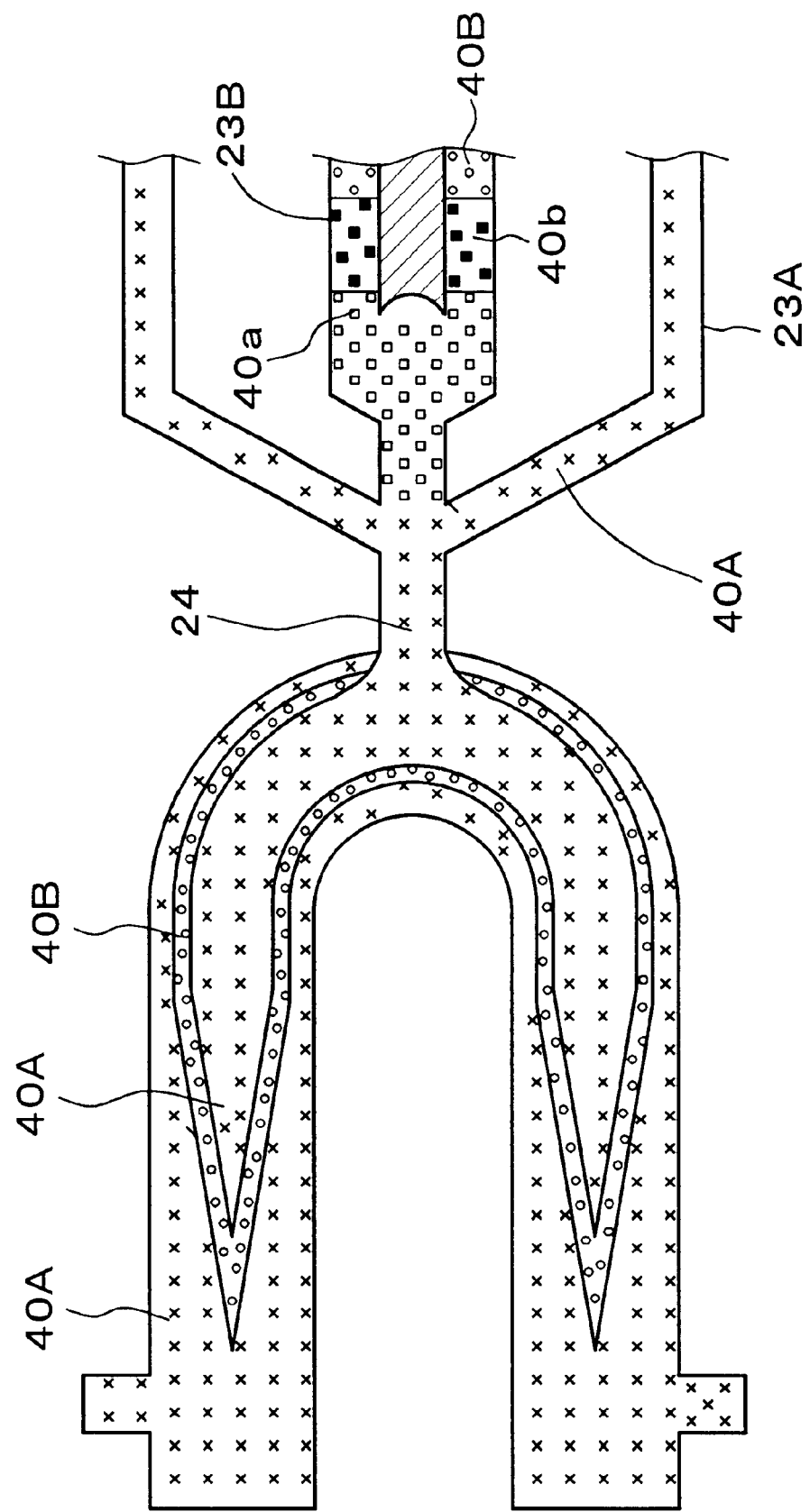

Fig. 17
[SIMULTANEOUS-INJECTION MOLDING METHOD]
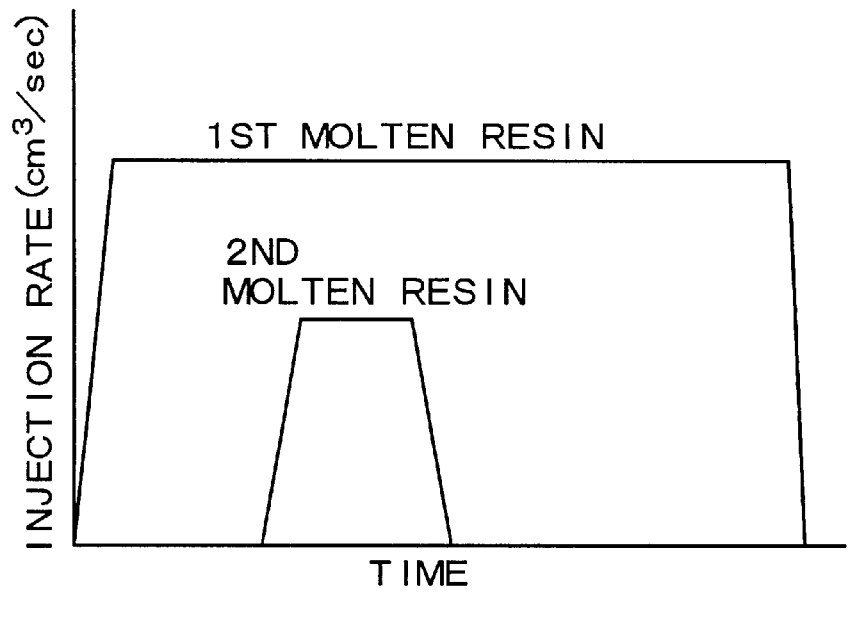
1ST INJECTION
CYLINDER
      INJECTION    DWELLING
2ND INJECTION
CYLINDER
      INJECTION
STATE OF
BACK FLOW MEANS
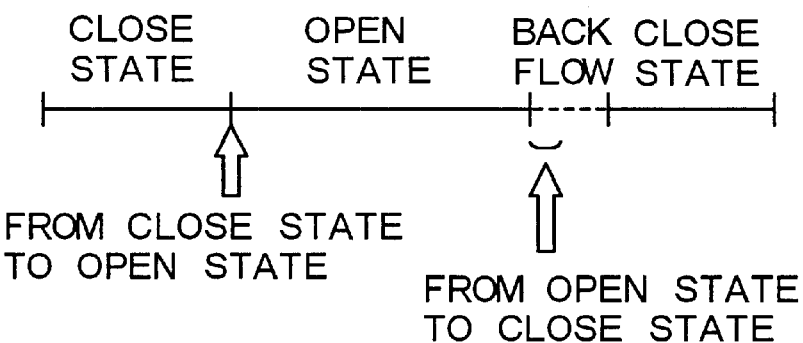

Fig. 18
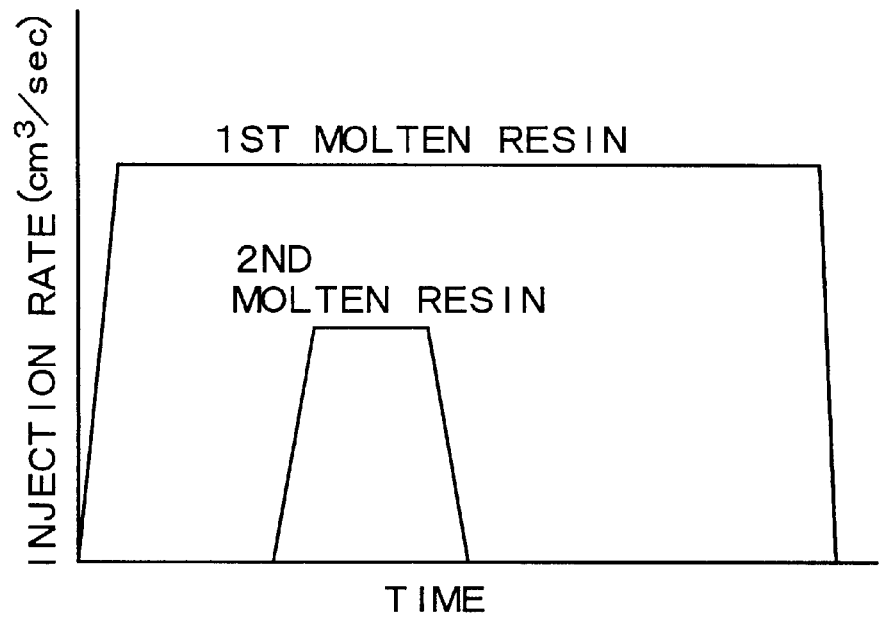
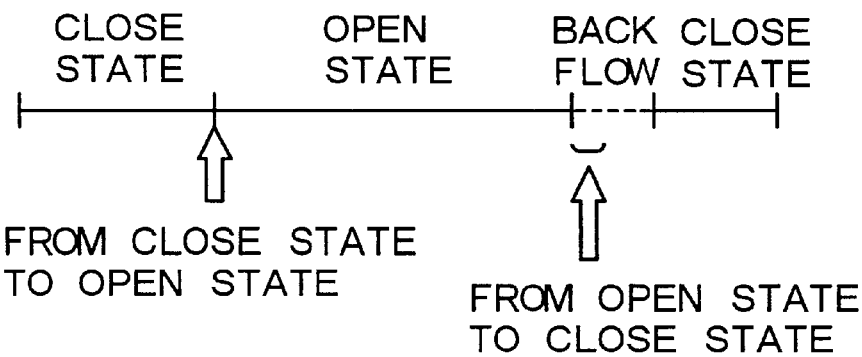

[SIMULTANEOUS-INJECTION MOLDING METHOD]

[ALTERNATE-INJECTION MOLDING METHOD]

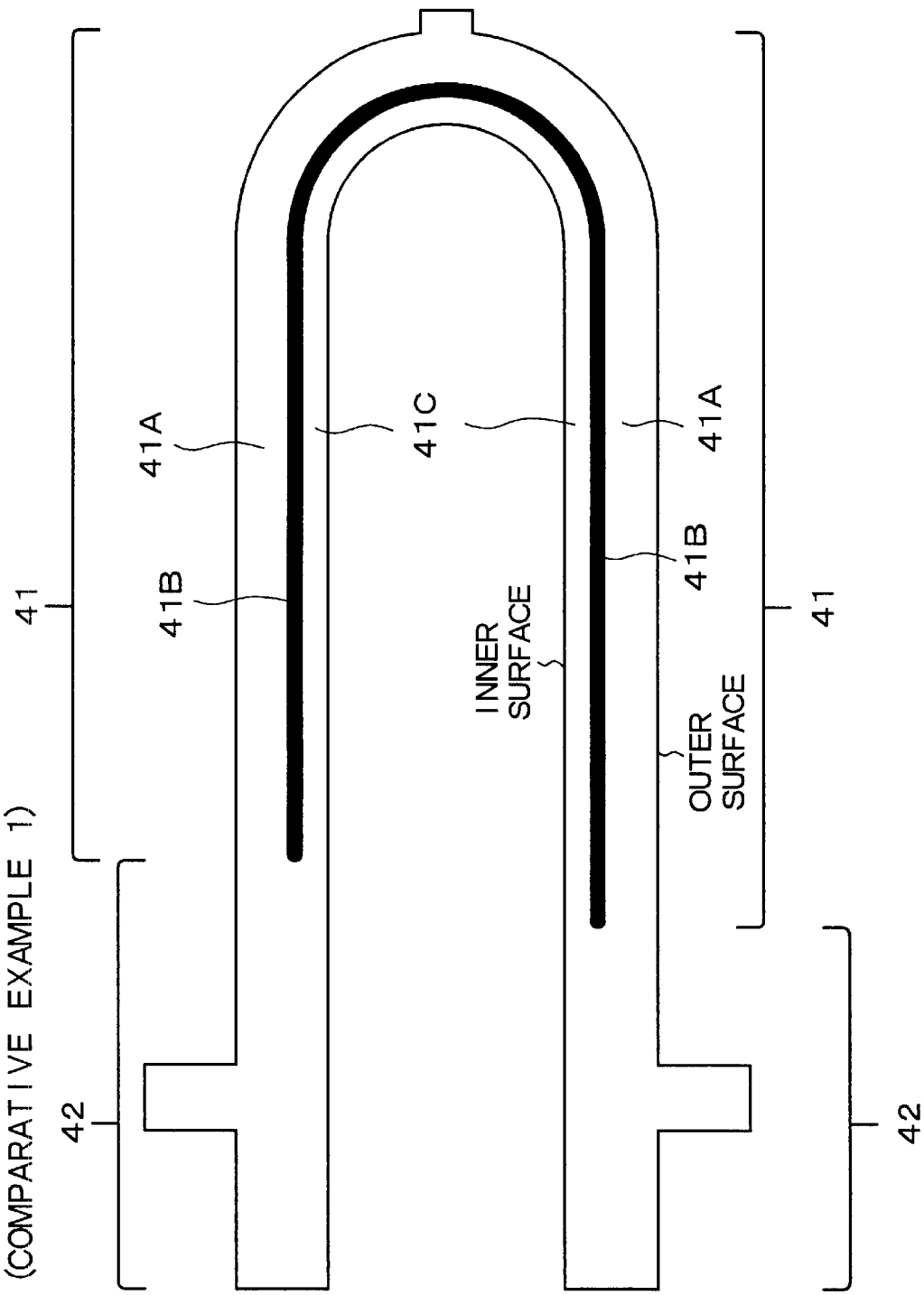
Fig. 24 (COMPARATIVE EXAMPLE 1)

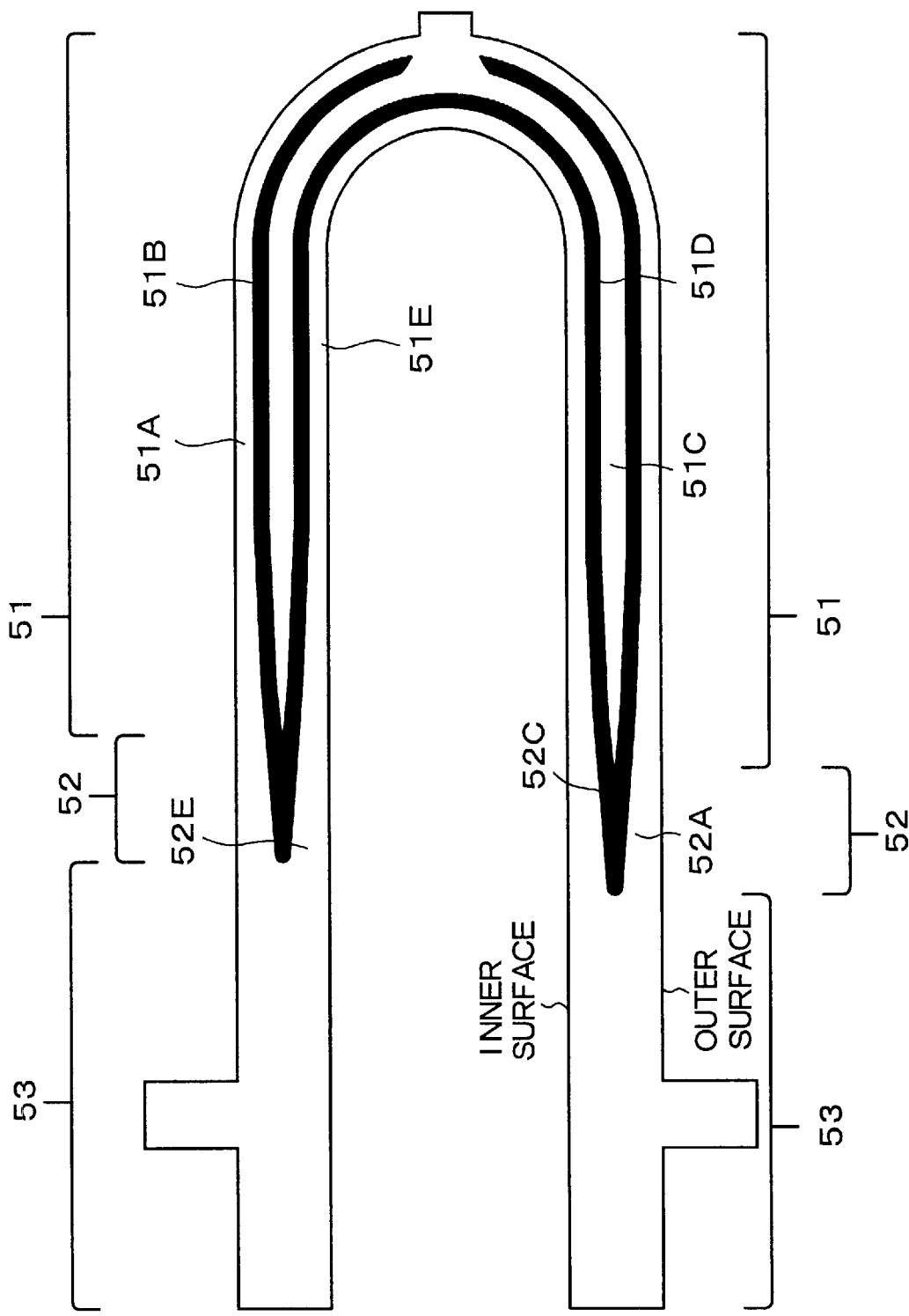
Fig. 25 (COMPARATIVE EXAMPLE 2)

MULTI-LAYERED ARTICLE

BACKGROUND OF THE INVENTION

1. Field of the Invention

The present invention relates to a multi-layered article such as a multi-layered container, a multi-layered parison which is a precursor of a multi-layered container, and a blow molded multi-layered container.

2. Description of the Related Art

In recent years, containers formed of thermoplastic resins are widely used as containers for cosmetics, foods, beverages and the like, from the viewpoints of light weight and safety for breaking. The development of containers formed of a polyethylene terephthalate resin (to be sometimes abbreviated as "PET resin" hereinafter) in particular is rapidly advancing owing to improvements in biaxial orientation blow molding technology. However, a container formed of a biaxially oriented thermoplastic polyester resin composed mainly of PET resin does not necessarily have complete performances. That is, when the content to be filled in a container is a food which requires high gas barrier properties of the container, the container formed of PET resin is insufficient in gas barrier properties against oxygen gas and carbon dioxide gas, and therefore, the container formed of PET resin has a defect that the taste of the content is impaired.

For satisfying the above requirement, JP-A-57-128520 (corresponding to U.S. Pat. No. 4,535,901) discloses a method in which an injection-molding apparatus having two injection cylinders for separately plasticizing and melting a thermoplastic polyester resin and an m-xylylene-group-containing polyamide resin (to be sometimes abbreviated as "MX nylon resin" hereinafter) which is a thermoplastic gas-barrier resin, respectively, and having a single mold is used, and in one molding cycle, the molten thermoplastic polyester resin is injected, the molten MX nylon resin is injected while the molten thermoplastic polyester resin is being injected, and the injection of the molten thermoplastic polyester resin is continued even after completion of injection of the molten MX nylon resin, to form a parison having a three-layer structure of the thermoplastic polyester resin layer/the MX nylon resin layer/the thermoplastic polyester resin layer. The above injection molding method is called a simultaneous-injection molding method.

Further, JP-A-60-240409 (corresponding to EP No. 161625/1985) discloses an injection-molding method similar to the above method, in which, for example, a molten thermoplastic polyester resin and a molten MX nylon resin are injected under specific conditions in the order of the molten thermoplastic resin, the molten MX nylon resin and the thermoplastic polyester resin, to form a parison having a five-layer structure of the thermoplastic polyester resin layer/the MX nylon resin layer/the thermoplastic polyester resin layer/the MX nylon resin layer/the thermoplastic polyester resin layer. The above method is called an alternate-injection molding method.

In recent years, further, a technique is being developed for pelletizing collected containers composed mainly of PET resin and recycling them as a recycled PET resin. When the above recycled PET resin (including a PET resin reclaimed from defective products in the production of parisons and a recycled PET resin once used in the production of parisons) is used to produce parisons for beverage containers, it is required to form a parison having a three-layer structure of the PET resin layer/the recycled PET resin layer/the PET resin layer or a five-layer structure of the PET resin layer/the recycled PET resin layer/the PET resin layer/the recycled PET resin layer/the PET resin layer.

The methods disclosed in the above Japanese Laid-open Patent Publications have enabled the production of multi-layered containers (bottles) having an appearance and mechanical performances equivalent to those of a container formed of a polyethylene terephthalate resin and having greatly improved barrier properties against oxygen gas and carbon dioxide gas, and thus-produced containers are now being used. Meanwhile, there are increasing demands for small-sized bottles in recent years. Since a small-sized bottle has a large surface area relative to a unit internal volume, the loss of carbon dioxide gas contained in a content generally increases, and oxygen gas permeates the contents to affect it to a greater degree. Small-sized bottles are therefore inevitably required to have higher gas-barrier properties.

Conventionally, when a multi-layered molded article (e.g., a multi-layered parison as a precursor of a multi-layered container) formed of two or more resins is produced by means of two or more injection cylinders, there is used an injection molding apparatus having a mold provided with a cavity and having two or more injection cylinders. For example, in an injection molding apparatus having two injection cylinders, resin-flow-passages (a first resin-flow-passage in which a first molten resin flows and a second resin-flow-passage in which a second molten resin flows) connecting the insides of the injection cylinders to the cavity are structured so as to meet with each other in a junction portion in the upstream of a gate portion opened to the cavity. Portions of the first and second resin-flow-passages positioned within the mold have a hot runner structure. Further, portions of the first and second resin-flow-passages upstream to the junction portion generally have the structure of a multiple tube. A screw provided in each injection cylinder is generally structured so as to move back when a pressure is exerted from the resin-flow-passage in any case other than the cases of injection of the molten resin and application of a dwell pressure, so that the molten resin in each resin-flow-passage flows back into each injection cylinder.

A multi-layered container (bottle) formed by biaxially stretch-blow molding a parison having the three-layer structure of PET resin layer/MX nylon resin layer/PET resin layer or the five-layer structure of PET resin layer/MX nylon resin layer/PET resin layer/MX nylon resin layer/PET resin layer has a problem that it is liable to undergo interlayer separation (delamination) when an impact is exerted thereon or when a sharp change occurs in internal pressure after carbonate beverage is filled therein. Further, when a multi-layered container (bottle) having an extremely bend portion is produced by a biaxially stretch-blow molding method, there is another problem that the bend portion is liable to undergo interlayer separation.

For example, JP-A-56-130351 discloses a method of improving the interlayer separation strength. It is described that the above method enables the production of a multi-layered article having high interlayer separation strength by forming an adhesive layer having a specific structure. Impractically, however, the method disclosed in the above Japanese Laid-open Patent Publication requires three injection molding apparatus, and at least there resins are required. Further, JP-A-57-128516 discloses a method of improving the interlayer separation strength, in which the injection of a molten resin for constituting the outermost layer (outer surface and inner surface) is completed before a resin for constituting no outermost layer is cooled to solidness, whereby each layer is brought into an amorphous state.

However, the above method is not fully satisfactory for improving the interlayer separation strength.

As compared with a multi-layered container (bottle) having an MX nylon resin layer which extends from its body portion only to its neck portion, a multi-layered container having an MX nylon resin layer which extends from its body portion up to its spout or closure portion through its neck portion has improved barrier properties against oxygen gas and carbonate gas. Since, however, the spout portion is in a non-stretched state, the spout portion is whitened due to water absorption with the lapse of time (i.e., spherulite is formed), which is undesirable in appearance. Further, since gas-barrier resins including the MX nylon resin has a refractive index different from the refractive index of a thermoplastic polyester resin, the ending portion of the gas-barrier resin layer in a multi-layered container is visually recognized as a line, which is clearly observed. That is, the boundary, for example, of the PET resin layer/MX nylon resin layer is clearly observed, which is undesirable in appearance. Moreover, interlayer separation is liable to occur in the above boundary.

In the injection molding apparatus having the above structure, when a first molten resin for forming the outermost layer of the multi-layered article is injected into the cavity through the first resin-flow-passage for completely filling the cavity with the first and second molten resins, the first molten resin flowing along the first resin-flow-passage flows into the second resin-flow-passage. In this case, the inflow of the first molten resin is not constant. As a result, the amount of the first molten resin injected into the cavity is destabilized. Further, during the first injection of the first molten resin, the second molten resin present in the second resin-flow-passage near the junction portion and the first molten resin are injected into the cavity together in a state of a mixture of these resins. This therefore causes a problem that the second resin which is not to compose the outermost layer of the multi-layered article comes to exist on the outermost layer surface.

For preventing the above flow of the first molten resin into the second resin-flow-passage, a prior art uses a hydraulic shut-off valve provided in a nozzle portion of the injection cylinder which is for injecting the second molten resin. Only during the injection of the second molten resin, the shut-off valve is opened, and in any other case, the shut-off valve is closed, whereby the flowing of the first molten resin into the second resin-flow-passage is prevented.

JP-A-61-206612 (corresponding to U.S. Pat. No. 4,657, 496) discloses a hot liner mold for injection-molding, which has a first resin-flow-passage 11 and a second resin-flow-passage 12, the second resin-flow-passage 12 being provided with a check valve 13. It is said that when a first resin material A is injected, a cavity 22 is completely filled with the resin but that since the second resin-flow-passage 12 is provided with the check valve 13, a second resin material B flows back due to the first resin material A in no case.

When the flow of a molten resin is controlled by means of the shut-off valve, the flowing of the first molten resin into the second resin-flow-passage can be prevented. However, this causes the following problem. During the first injection of the first molten resin, the first molten resin and the second molten resin are mixed in the vicinity of the junction portion of the resin-flow-passages, or the second molten resin which is not in an injected state is taken into the first molten-resin which is being injected. As a result, the second molten resin present near the junction portion flows into the cavity, and the second resin comes to exist on the surface of the multi-layered article. That is, there is a problem that the second resin which is not to compose the outermost layer of the multi-layered article comes to exist on the outermost layer surface.

OBJECT AND SUMMARY OF THE INVENTION

It is an object of the present invention to provide a multi-layered article which is formed of at least two resins and has resin layers of these resins laminated, which has an excellent appearance and is free from the occurrence of interlayer separation (delamination), and which is structured such that the resin which is not to compose the outermost layer of the multi-layered article can be reliably prevented from coming to exist on the outermost layer surface thereof, in other words, which is structured such that the resin which is not to compose the outermost layer of the multi-layered article is reliably encapsulated, sealed or blocked with a resin layer composing the outermost layer of the multi-layered article.

The multi-layered article according to a first aspect of the present invention for achieving the above object is a multi-layered article having a first portion constituted of laminated three resin layers and a second portion extending from the first portion, the first portion being constituted mainly of consecutively laminated resin layers composed of a first resin layer formed of a first resin, a second resin layer formed mainly of a second resin and a third resin layer formed of the first resin, the second portion being constituted of resin layers extending from the first resin layer and the third resin layer which constitute the first portion, the first resin layer constituting the outer surface layer of the multi-layered article, the third resin layer constituting the inner surface layer of the multi-layered article which inner surface layer is opposed to said outer surface layer, the second resin layer being encapsulated with the first resin layer and the third resin layer, and the second resin layer having a thickness which decreases towards the second portion, and being discontinued, in a region of the first portion in the vicinity of the second portion.

The above region of the first portion in the vicinity of the second portion will be sometimes simply referred to as "first portion region" hereinafter.

The multi-layered article according to the first aspect of the present invention can be essentially molded using any type of an injection molding apparatus, but is preferably molded using an injection molding apparatus which comprises;

(a) a mold having a cavity block provided with a cavity and a hot runner block, (b) a first injection cylinder for injecting a first molten resin and a second injection cylinder for injecting a second molten resin, (c) a first resin-flow-passage for connecting an inside of the first injection cylinder and the cavity, and (d) a second resin-flow-passage for connecting an inside of the second injection cylinder and the cavity, the injection molding apparatus having a structure in which;

those portions of the first and second resin-flow-passages which are located within the mold are provided in the hot runner block, and the first resin-flow-passage and the second resin-flow-passage meet with each other in a junction portion upstream to a gate portion opened to the cavity, the injection molding apparatus being provided with back flow means for letting the first molten resin in the first resin-flow-passage flow into the second resin-flow-passage after the second molten resin is injected into the cavity through the second resin-flow-passage, and the back flow means being operable with a pressure which the first molten resin in the first resin-flow-passage exerts on the second molten resin in the second resin-flow-passage.

Preferably, the first portion is constituted mainly of consecutively laminated resin layers composed of the first resin layer and the third resin layer which are formed of the first molten resin injected from the first injection cylinder into the cavity through the first resin-flow-passage and the gate portion, and the second resin layer which is formed of the second molten resin injected from the second injection cylinder into the cavity through the second resin-flow-passage and the gate portion, and the above first portion region is formed of the first molten resin which has flowed into the second resin-flow-passage and the second molten resin from the second injection cylinder. The thus-structured multi-layered article will be referred to as "multi-layered article according to the second aspect of the present invention" for convenience.

In the multi-layered article according to the first aspect of the present invention, including the multi-layered article according to the second aspect of the present invention, the first portion region has a discontinuity. That is, the first portion region is formed of the second resin and the first resin, which are in a crudely mixed state, and the first portion region is constituted of a portion the second resin occupies and the balanced portion the first resin occupies. The first portion is constituted mainly of consecutively laminated resin layers composed of the first resin layer formed of the first resin, the second resin layer formed mainly of the second resin and the third resin layer formed of the first resin. The "second resin layer formed mainly of the second resin" as used herein means that the second resin layer is constituted of a portion of the second resin layer formed of the second resin and a portion of the second resin layer formed of the second resin and the first resin. Further, the "constituted mainly of consecutively laminated resin layers" as used herein means that there is included a case where part of the first portion is constituted of only the first resin layer and the third resin layer which are formed of the first resin.

The multi-layered article according to the first aspect of the present invention, including the second aspect of the present invention, includes an embodiment in which the second resin layer is discontinuously present in the first portion region and along the direction toward the second portion, and an embodiment in which the second resin layer is discontinuously present in the first portion region and along the direction which is at right angles with the direction toward the second portion and which is at right angles with the thickness direction of the multi-layered article. Further, it includes an embodiment in which the second resin layer is discontinuously present in the first portion region and along the direction toward the second portion and along the direction which is at right angles with the direction toward the second portion and is at right angles with the thickness direction of the multi-layered article.

The multi-layered article according to a third aspect of the present invention for achieving the above object is a multi-layered article having a first portion constituted of laminated five resin layers, a second portion extending from the first portion and a third portion extending from the second portion, the first portion being constituted mainly of consecutively laminated resin layers composed of a first resin layer formed of a first resin, a second resin layer formed of a second resin, a third resin layer formed of the first resin, a fourth resin layer formed of the second resin and a fifth resin layer formed of the first resin, the second portion being constituted mainly of a first-resin-layer extension layer extending from the first resin layer constituting the first portion, a fifth-resin-layer extension layer extending from the fifth resin layer constituting the first portion, and a second-resin-layer/fourth-resin-layer extension layer mainly extending from the second resin layer and the fourth resin layer constituting the first portion, the third portion being constituted of resin layers extending from the first-resin-layer extension layer and the fifth-resin-layer extension layer constituting the second portion, the first resin layer and the first-resin-layer extension layer constituting the outer surface layer of the multi-layered article, the fifth resin layer and the fifth-resin-layer extension layer constituting the inner surface layer of the multi-layered article which inner surface layer is opposed to said outer surface layer, the second resin layer being encapsulated with the first resin layer and the third resin layer, the fourth resin layer being encapsulated with the fifth resin layer and the third resin layer, the second-resin-layer/fourth-resin-layer extension layer being encapsulated with the first-resin-layer extension layer and the fifth-resin-layer extension layer, and the second-resin-layer/fourth-resin-layer extension layer having a thickness which decreases toward the third portion, and being discontinued, in a region of the second portion in the vicinity of the third portion.

The above region of the second portion in the vicinity of the third portion will be sometimes simply referred to as "second portion region" hereinafter.

The multi-layered article according to the third aspect of the present invention can be essentially molded using any type of an injection molding apparatus, but is preferably molded using an injection molding apparatus which comprises;

(a) a mold having a cavity block provided with a cavity and a hot runner block, (b) a first injection cylinder for injecting a first molten resin and a second injection cylinder for injecting a second molten resin, (c) a first resin-flow-passage for connecting an inside of the first injection cylinder and the cavity, and (d) a second resin-flow-passage for connecting an inside of the second injection cylinder and the cavity, the injection molding apparatus having a structure in which;

those portions of the first and second resin-flow-passages which are located within the mold are provided in the hot runner block, and the first resin-flow-passage and the second resin-flow-passage meet with each other in a junction portion upstream to a gate portion opened to the cavity, the injection molding apparatus being provided with back flow means for letting the first molten resin in the first resin-flow-passage flow into the second resin-flow-passage after the second molten resin is injected into the cavity through the second resin-flow-passage, the back flow means being operable with a pressure which the first molten resin in the first resin-flow-passage exerts on the second molten resin in the second resin-flow-passage.

Preferably, the first portion is constituted mainly of consecutively laminated resin layers composed of the first resin layer, the third resin layer and the fifth resin layer which are formed of the first molten resin injected from the first injection cylinder into the cavity through the first resin-flow-passage and the gate portion, and the second resin layer and the fourth resin layer which are formed of the second molten resin injected from the second injection cylinder into the cavity through the second resin-flow-passage and the gate portion, and the above second portion region is formed of the first molten resin which has flowed into the second resin-flow-passage and the second molten resin from the second injection cylinder. The thus-structured multi-layered article will be referred to as "multi-layered article according to the fourth aspect of the present invention" for convenience.

In the multi-layered article according to the third aspect of the present invention, including the fourth aspect of the present invention, the second-resin-layer/fourth-resin-layer extension layer has a discontinuity in the second portion region. That is, the second portion region is formed of the second resin and the first resin, which are in a crudely mixed state, and the second portion region is constituted of a portion the second resin occupies and the balanced portion the first resin occupies. The first portion is constituted mainly of consecutively laminated resin layers composed of the first resin layer formed of the first resin, the second resin layer formed of the second resin, the third resin layer formed of the first resin, the fourth resin layer formed of the second resin and the fifth resin layer formed of the first resin. The "constituted mainly of consecutively laminated resin layers" means that there is included a case where part of the first portion is constituted of the first resin layer, the third resin layer and the fifth resin layer which are formed of the first resin, and the fourth resin layer which is formed of the second resin. Further, the second portion is constituted mainly of the first-resin-layer extension portion extending from the first resin layer constituting the first portion, the fifth-resin-layer extension layer extending from the fifth resin layer constituting the first portion, and the second-resin-layer/fourth-resin-layer extension layer extending from the second resin layer and the fourth resin layer which constitute the first portion. The "constituted mainly of the second-resin-layer/fourth-resin-layer extension layer extending from the second resin layer and the fourth resin layer which constitute the first portion" means that the second-resin-layer/fourth-resin-layer extension layer is constituted of a portion of the second-resin-layer/fourth-resin-layer extension layer formed of the second resin and a portion of the second-resin-layer/fourth-resin-layer extension portion formed of the second resin and the first resin.

The multi-layered article according to the third aspect of the present invention, including the fourth aspect of the present invention, includes an embodiment in which the second-resin-layer/fourth-resin-layer extension layer is discontinuously present in the second portion region and along the direction toward the third portion, and an embodiment in which the second-resin-layer/fourth-resin-layer extension layer is discontinuously present in the second portion region and along the direction which is at right angles with the direction toward the third portion and which is at right angles with the thickness direction of the multi-layered article. Further, it includes an embodiment in which the second-resin-layer/fourth-resin-layer extension layer is discontinuously present in the second portion region and along the direction toward the third portion and along the direction which is at right angles with the direction toward the third portion and is at right angles with the thickness direction of the multi-layered article.

In the multi-layered article according to the present invention, the first resin is at least one resin selected from the group consisting of thermoplastic polyester resins such as polyethylene terephthalate and polyethylene-2,6-naphthalate (PEN); a thermoplastic copolyester resin; a polyolefin resin; an aliphatic polyamide resin; a polycarbonate resin; a polyacrylonitrile resin; a polyvinyl chloride resin; and a polystyrene resin. Of these, thermoplastic polyester resins are preferred. Further, a blend prepared by blending two or more resins, e.g., a blend prepared by blending a polyethylene terephthalate resin and a polyethylene-2,6-naphthalate resin may be used as required.

The above polyethylene terephthalate generally refers to a polyester formed of a dicarboxylic acid moiety at least 80 mol %, preferably at least 90 mol %, of which is from terephthalic acid and a diol moiety at least 80 mol %, preferably at least 90 mol %, of which is from ethylene glycol. The balance of the acid component thereof is selected from isophthalic acid, diphenyl ether-4,4-dicarboxylic acid, naphthalene-1,4, or 2,6-dicarboxylic acid, adipic acid, sebacic acid, decane-1,10-decarboxylic acid and hexahydroterephthalic acid. The balance of the glycol component is selected from propylene glycol, 1,4-butanediol, neopentyl glycol, diethylene glycol, cyclohexanedimethanol and 2,2-bis(4-hydroxyethoxyphenyl)propane. Further, there may be used a polyester resin containing p-hydroxybenzoic acid as a hydroxy acid.

Further, the polyethylene-2,6-naphthalate may contain other ester-forming units in an amount of 20 mol % or less, preferably 10 mol % or less in addition to ethylene-2,6-naphthalate. A dicarboxylic acid for forming the "other" ester-forming units preferably includes aromatic dicarboxylic acids such as phthalic acid, isophthalic acid, terephthalic acid, 1,4-naphthalenedicarboxylic acid, 1,5-naphthalenedicarboxylic acid, 2,5-naphthalenedicarboxylic acid, 2,7-naphthalenedicarboxylic acid, 4,4'-diphenylcarboxylic acid and 3,4'-diphenylcarboxylic acid; aliphatic dicarboxylic acids such as succinic acid, adipic acid, sebacic acid and dodecanedioic acid; and aliphatic dicarboxylic acids such as 1,4-cyclohexanedicarboxylic acid, 1,3-cyclohexanedicarboxylic acid, decalindicarboxylic acid and tetralindicarboxylic acid. A diol for forming the "other" ester-forming units preferably includes aliphatic glycols such as propylene glycol, trimethylene glycol, diethylene glycol and 1,4-butanediol; aliphatic glycols such as 1,3-cyclohexanedimethanol, 1,4-cyclohexanedimethanol and 1,6-cyclohexanediol; and aromatic glycols such as bisphenol A. The above polyethylene-2,6-naphthalate may have a molecule whose terminal is blocked with a small amount of a monofunctional compound such as benzoic acid, benzoylbenzoic acid, benzyloxybenzoic acid or methoxypolyethylene glycol. Further, it may contain a very small amount of a polyfunctional compound such as glycerin, trimesic acid or pentaerythritol.

The intrinsic viscosity of the above thermoplastic polyester resin is properly at least 0.40, preferably 0.50 to 1.4.

When the above intrinsic viscosity is less than 0.40, an obtained multi-layered article (e.g., multi-layered bottle) is poor in mechanical strength, and further, it is difficult to produce, e.g., a multi-layered article in an amorphous and transparent state. The "intrinsic viscosity (η)" is a viscosity measured at 30° C. using mixed solvents of phenol/tetrachloroethane=6/4 (weight ratio).

The above thermoplastic copolyester resin refers to a thermoplastic copolyester resin obtained by copolymerizing at least one acid component and at least one diol component. The acid component is selected from terephthalic acid, isophthalic acid, 1,4-naphthalenedicarboxylic acid, 1,5-naphthalenedicarboxylic acid, 2,5-naphthalenedicarboxylic acid, 2,6-naphthalenedicarboxylic acid and 2,7-naphthalenedicarboxylic acid. The diol component is selected from ethylene glycol, propylene glycol, 1,3-cyclohexanedimethanol, 1,4-cyclohexanedimethanol, 1,3-bis(2-hydroxyethoxy)benzene, and 1,4-bis(2-hydroxyethoxy)benzene. The above thermoplastic copolymer resin may be used with other thermoplastic polyester resin as required.

In the multi-layered article according to the present invention, the second resin is at least one resin selected from the group consisting of a thermoplastic resin having gas barrier properties (gas-barrier resin), a recycled polyethylene terephthalate resin (including a polyethylene terephthalate resin reclaimed from a resin once used in the production of multi-layered articles) and a colored polyethylene terephthalate resin.

The above gas-barrier resin is preferably at least one resin selected from the group consisting of a m-xylylene-group-containing polyamide resin (MX nylon resin), a saponification product of an ethylene-vinyl acetate copolymer resin, a polyacrylonitrile resin and a polyvinylidene chloride resin. Of these resins, MX nylon resin is particularly preferred.

The above MX nylon resin refers to a polymer containing diamine component including m-xylylenediamine of at least 70 mol % and dicarboxylic acid component including adipic acid of at least 70 mol %. Diamines other than m-xylylenediamine are not specifically limited and may include paraxylylenediamine, 1,3-bis(aminomethyl)cyclohexane, 1,4-bis(aminomethyl)cyclohexane, tetramethylenediamine, hexamethylenediamine, nonamethylenediamine, 2-methyl-1,5-pentanediamine, etc. Dicarboxylic acids other than adipic acid are not specifically limited and may include suberic acid, azelaic acid, sebacic acid, 1,10-decanedicarboxylic acid, terephthalic acid, isophthalic acid, 2,6-naphthalenedicarboxylic acid, etc. The polyamide used may contain a small amount of a monoamine and a monocarboxylic acid added during the condensation polymerization as a molecular weight modifier. The above polymers may contain polymers such as nylon 6, nylon 66, nylon 610 or nylon 11.

The relative viscosity of the MX nylon resin is properly at least 1.5, preferably 2.0 to 4.0. The relative viscosity ($\eta_{rel}$) is a viscosity measured at 25° C. under a condition of resin 1 gram/96% sulfuric acid 100 ml.

In the multi-layered article according to the present invention, a combination of a thermoplastic polyester resin, particularly, a polyethylene terephthalate resin (PET resin), with MX nylon resin is most preferred, since these resins are excellent in all of transparency, mechanical strength, injection moldability and stretch blow moldability. Further, since these two resins have similar thermal properties, it is easy to determine molding temperature conditions. In this case, preferably, the polyethylene terephthalate resin and the MX nylon resin have melt viscosity values close to each other.

For example, when a polyethylene terephthalate resin having an intrinsic viscosity of 0.7 to 0.8 is used, it is desirable to use an MX nylon resin having a relative viscosity of approximately 2.7. When other gas-barrier resin is used, preferably, the gas-barrier resin has a melt viscosity close to the melt viscosity of the polyethylene terephthalate resin.

When PET resin and MX nylon resin are combined, in the second resin layer or the second-resin-layer/fourth-resin-layer extension layer, the second resin which is dispersed like islands or is extending in an acicular form can be observed by staining the MX nylon resin with iodine tincture. Otherwise, they can be observed by placing the first portion or the second portion between two polarizers arranged in Crossed Nicols, i.e., in directions at right angles with each other.

In the multi-layered article according to the present invention, further, the first resin, the second resin or each of resins forming a multi-layered article may contain a colorant, an ultraviolet absorbent, an antistatic agent, an antioxidant, a lubricant, a nucleating agent, a bactericide and a fungicide.

In the injection molding apparatus used for the production of the multi-layered article according to the second or fourth aspect of the present invention, the term "upstream" means a position on the injection cylinder side, "downstream" means a position on the cavity side, and these terms will be used in these sense hereinafter.

The multi-layered article according to the second aspect of the present invention can be manufactured by the steps of;

(A) injecting the first molten resin prepared in the first injection cylinder into the cavity through the first resin-flow-passage, (B) injecting the second molten resin prepared in the second injection cylinder into the cavity through the second resin-flow-passage during the injection of the first molten resin, and (C) after completion of injection of the second molten resin, letting the first molten resin in the first resin-flow-passage flow into the second resin-flow-passage on the basis of operation of the back flow means during the injection of the first molten resin or after completion of injection of the first molten resin. The above injection molding method is called a simultaneous-injection molding method. In the above step (B), the injection amount of the first molten resin per unit time is preferably greater than the injection amount of the second molten resin per unit time.

FIGS. 17, 18 and 19 show changes of injection rates, etc., with the elapse of time in the method of injection molding the multi-layered article according to the second aspect of the present invention. In FIGS. 17 to 22, "closed state" in "state of back flow means" means that the inside of the second injection cylinder and the cavity are maintained in a non-communicated state on the basis of operation of the back flow means, and "open state" means that the inside of the second injection cylinder and the cavity are maintained in a communicated state by means of the back flow means. The "back flow" means the following state. That is, the back flow means is being operated with a pressure which the first molten resin in the first resin-flow-passage exerts on the second molten resin in the second resin-flow-passage, so that the first molten resin in the first resin-flow-passage flows into the second resin-flow-passage, and as a result, the second molten resin flows toward the second injection cylinder. When the first molten resin in the first resin-flow-passage is allowed to flow into the second resin-flow-passage on the basis of operation of the back flow means after the completion of injection of the first molten resin, specifically, a dwell pressure is applied with the first injection cylinder, and after completion of injection of the first molten resin, the back flow means is operated to allow the first molten resin in the first resin-flow-passage to flow into the second resin-flow-passage (see FIG. 19). When the first molten resin in the first resin-flow-passage begins to flow into the second resin-flow-passage on the basis of operation of the back flow means during the injection of the first molten resin, the inflow of the first molten resin into the second resin-flow-passage may be completed during the injection of the first molten resin (see FIG. 17), concurrently with completion of injection of the first molten resin or during the application of a dwell pressure after completion of injection of the first molten resin (see FIG. 18).

The multi-layered article according to the fourth aspect of the present invention can be manufactured by the steps of;

(A) injecting the first molten resin prepared in the first injection cylinder into the cavity through the first resin-flow-passage and then discontinuing the injection of the first molten resin, (B) injecting the second molten resin prepared in the second injection cylinder into the cavity through the second resin-flow-passage and then terminating the injection of the second molten resin, and then, (C) injecting the first molten resin prepared in the first injection cylinder into the cavity through the first resin-flow-passage and letting the first molten resin in the first resin-flow-passage flow into the second resin-flow-passage on the basis of operation of the back flow means during the injection of the first molten resin or after completion of injection of the first molten resin. The above method is called an alternate-injection molding method.

FIGS. 20, 21 and 22 show changes of injection rates, etc., with the lapse of time in the method of injection molding the multi-layered article according to the fourth aspect of the present invention. When the first molten resin in the first resin-flow-passage is allowed to flow into the second resin-flow-passage on the basis of operation of the back flow means after completion of injection of the first molten resin, specifically, a dwell pressure is applied with the first injection cylinder, and after the completion of injection of the first molten resin, the back flow means is operated to allow the first molten resin in the first resin-flow-passage to flow into the second resin-flow-passage (see FIG. 22). When the first molten resin in the first resin-flow-passage begins to flow into the second resin-flow-passage on the basis of operation of the back flow means during the injection of the first molten resin, the inflow of the first molten resin into the second resin-flow-passage may be completed during the injection of the first molten resin (see FIG. 20), concurrently with the completion of injection of the first molten resin or during the application of a dwell pressure after completion of injection of the first molten resin (see FIG. 21).

In the injection molding apparatus for injection molding the multi-layered article according to the second or fourth aspect of the present invention, preferably, the back flow means (counter-flow means) allows a constant amount of the first molten resin in the first resin-flow-passage to flow into the second resin-flow-passage. Preferably, further, when the second molten resin is being injected into the cavity through the second resin-flow-passage and after the injection of the second molten resin is completed, the inside of the second injection cylinder and the cavity are brought into a communicated state by means of the back flow means, and after a predetermined amount of the first molten resin in the first resin-flow-passage is allowed to flow into the second resin-flow-passage, the inside of the second injection cylinder and the cavity are brought into a non-communicated state on the basis of operation of the back flow means. "Predetermined amount" and "constant amount" have a relationship of (predetermined amount)≦(constant amount). Alternatively, preferably, when the second molten resin is being injected into the cavity through the second resin-flow-passage and after the injection of the second molten resin is completed, the inside of the second injection cylinder and the cavity are brought into a communicated state by means of the back flow means, and after the first molten resin in the first resin-flow-passage begins to flow into the second resin-flow-passage, the inside of the second injection cylinder and the cavity are brought into a non-communicated state on the basis of operation of the back flow means. The back flow means is preferably provided in that part of the second resin-flow-passage which is between the junction portion of the first and second resin-flow-passages and the second injection cylinder. In this case, particularly preferably, the back flow means is provided between the nozzle portion of the second injection cylinder and the mold, or in the nozzle portion of the second injection cylinder. Preferably, the back flow means is a back flow control valve (a counter-flow control valve) from the viewpoint of allowing a constant amount of the first molten resin to flow into the second resin-flow-passage and from the viewpoint of structural simplification. The back flow control valve includes a ball-type back flow control valve and a sliding valve-type back flow control valve.

In the multi-layered article according to the second or fourth aspect of the present invention, the volume of the first molten resin which is allowed to flow into the second resin-flow-passage is 5 to 50%, preferably 5 to 35%, more preferably 5 to 25%, based on the volume of the cavity. When the volume of the first molten resin which is allowed to flow into the second resin-flow-passage is less than 5% based on the volume of the cavity, it may be difficult to prevent the resin which is not to compose the outermost layer of the multi-layered article from coming to exist on the outermost layer surface thereof. Although depending upon injection conditions, the resin layers composing the layers of the multi-layered article undergo turbulence since the first molten resin is allowed to flow into the second resin-flow-passage. For reliably preventing the above turbulence, the volume of the first molten resin which is allowed to flow into the second resin-flow-passage is preferably 35% or less, particularly preferably, 25% or less, based on the volume of the cavity. When the above amount of the first molten resin exceeds 50% based on the volume of the cavity, the resin layers composing the layers of the multi-layered article may have a turbulence which is a practical problem in many cases.

In the multi-layered article according to the first aspect of the present invention, including the second aspect of the present invention, for reliably decreasing the thickness of the second resin layer in the first portion region toward the second portion, it is preferred to gradually increase the injection rate of the second molten resin without sharply increasing it in the beginning of the injection, as shown in FIG. 23A. In the multi-layered article according to the third aspect of the present invention, including the fourth aspect of the present invention, for reliably decreasing the thickness of the second-resin-layer/fourth-resin-layer extension layer in the second portion region toward the third portion, it is preferred to gradually increase the injection rate of the second molten resin without sharply increasing it in the beginning of the injection, as shown in FIG. 23B.

Further, it is preferred to bring the melt viscosity of the first resin and the melt viscosity of the second resin into values which are as close to each other as possible, and the first resin/second resin melt viscosity ratio is preferably 0.5 to 2. When the melt viscosity of the first resin is too high relative to the melt viscosity of the second resin, it is sometimes difficult to gradually decrease the thickness of the second resin layer in the first portion region in the multi-layered article according to the first aspect of the present invention, including the second aspect of the present invention, or it is sometimes difficult to gradually decrease the thickness of the second-resin-layer/fourth-resin-layer extension layer in the second portion region in the molded article according to the third aspect of the present invention, including the fourth aspect of the present invention. When the melt viscosity of the first resin is too low relative to the melt viscosity of the second resin, it is possible to gradually decrease the thickness of the second-resin-layer/fourth-resin-layer extension layer in the second portion region, while there is sometimes a problem that the ending portion of the third resin layer formed from the first molten resin comes to be roundish.

The multi-layered article according to the first to fourth aspects of the present invention may have any structure or form, and it includes a multi-layered container, a parison as a precursor for forming a multi-layered container (bottle) and a blow molded multi-layered container. Further, the multi-layered article includes a bumper and a door handle for an automobile. Further, the multi-layered article also includes a multi-layered article formed by combining a plurality of resins for imparting it with different functions such as strength, an appearance and the like, on the basis of a multi-layer forming technique. It is sometimes difficult to identify the outer surface layer and the inner surface layer of a multi-layered article having some form. In this case, a first surface can be considered the outer surface layer and a second surface which is opposed to the first surface can be considered the inner surface layer.

In the first portion region of the multi-layered article according to the first aspect of the present invention, including the second aspect of the present invention, the thickness of the second resin layer decreases toward the second portion. In the second portion region of the multi-layered article according to the third aspect of the present invention, including the fourth aspect of the present invention, the second-resin-layer/fourth-resin-layer extension layer decreases toward the third portion. As a result, the clear observation of these regions comes to be not easy, and there can be overcome the problem of prior art in which, for example, the boundary of a PET resin layer/MX nylon resin layer is clearly observable. Further, the ratio of the third portion of the multi-layered article can be relatively decreased, and the multi-layered article as a whole can be also further improved in gas barrier properties.

Further, in the first portion region of the multi-layered article according to the first aspect of the present invention, including the second aspect of the present invention, the second resin layer is discontinuously present. In the second portion region of the multi-layered article according to the third aspect of the present invention, including the fourth aspect of the present invention, the second-resin-layer/ fourth-resin-layer extension layer is discontinuously present. The interlayer separation (delamination) can be therefore improved. Further, there can be also overcome the problem that the multi-layered article comes to be whitened with the lapse of time.

Moreover, in the first portion region of the multi-layered article according to the first aspect of the present invention, including the second aspect of the present invention, the second resin layer is encapsulated with the first resin layer and the third resin layer. In the second portion region of the multi-layered article according to the third aspect of the present invention, including the fourth aspect of the present invention, the second resin layer is encapsulated with the first resin layer and the third resin layer, the fourth resin layer is encapsulated with the fifth resin layer and the third resin layer, and the second-resin-layer/fourth-resin-layer extension layer is encapsulated with the first-resin-layer extension layer and the fifth-resin-layer extension layer. There is therefore overcome the problem that the resin layer which is not to constitute the outermost layer appears on the outermost layer surface.

The multi-layered article according to the second or fourth aspect of the present invention is manufactured using the injection molding apparatus provided with the back flow means for allowing the first molten resin in the first resin-flow-passage to flow into the second resin-flow-passage. When the first molten resin is injected into the cavity, therefore, the first molten resin (which has flowed into the second resin-flow-passage in a previous molding cycle) has been present in that portion of the second resin-flow-passage which is near the junction portion of the resin-flow-passages. Therefore, there can be prevented a phenomenon that the first molten resin to be injected is mixed with the second molten resin in the second resin-flow-passage in the vicinity of the junction portion, and there can be prevented a phenomenon that the second molten resin which is not in an injected state is taken into the first molten resin which is being injected. As a result, there can be reliably prevented a problem that the second resin comes to exist on the surface of the multi-layered article.

BRIEF DESCRIPTION OF THE DRAWINGS

FIG. 8, is a conceptual view of the cavity, etc., for explaining the method of injection molding a multi-layered article by means of the injection molding apparatus feasible for the production of a multi-layered article of the present invention.

FIG. 10 following FIG. 9, is a conceptual view of the cavity, etc., for explaining the method of injection molding a multi-layered article by means of the injection molding apparatus feasible for the production of a multi-layered article of the present invention.

FIG. 17 is a graph showing changes of an injection rate, etc., with the elapse of time in the method of injection molding the multi-layered article according to the second aspect of the present invention.

FIG. 18 is a graph showing changes of an injection rate, etc., with the elapse of time in the method of injection molding the multi-layered article according to the second aspect of the present invention.

FIG. 24 is a schematic cross-sectional view of a parison obtained in Comparative Example 1.

FIG. 25 is a schematic cross-sectional view of a parison obtained in Comparative Example 2.

DESCRIPTION OF THE PREFERRED EMBODIMENTS

The present invention will be explained in detail with reference to drawings hereinafter. Prior thereto, an injection molding apparatus feasible for the production of a multi-layered article from a parison which is a multi-layered article of the present invention will be outlined.

Figure 6:
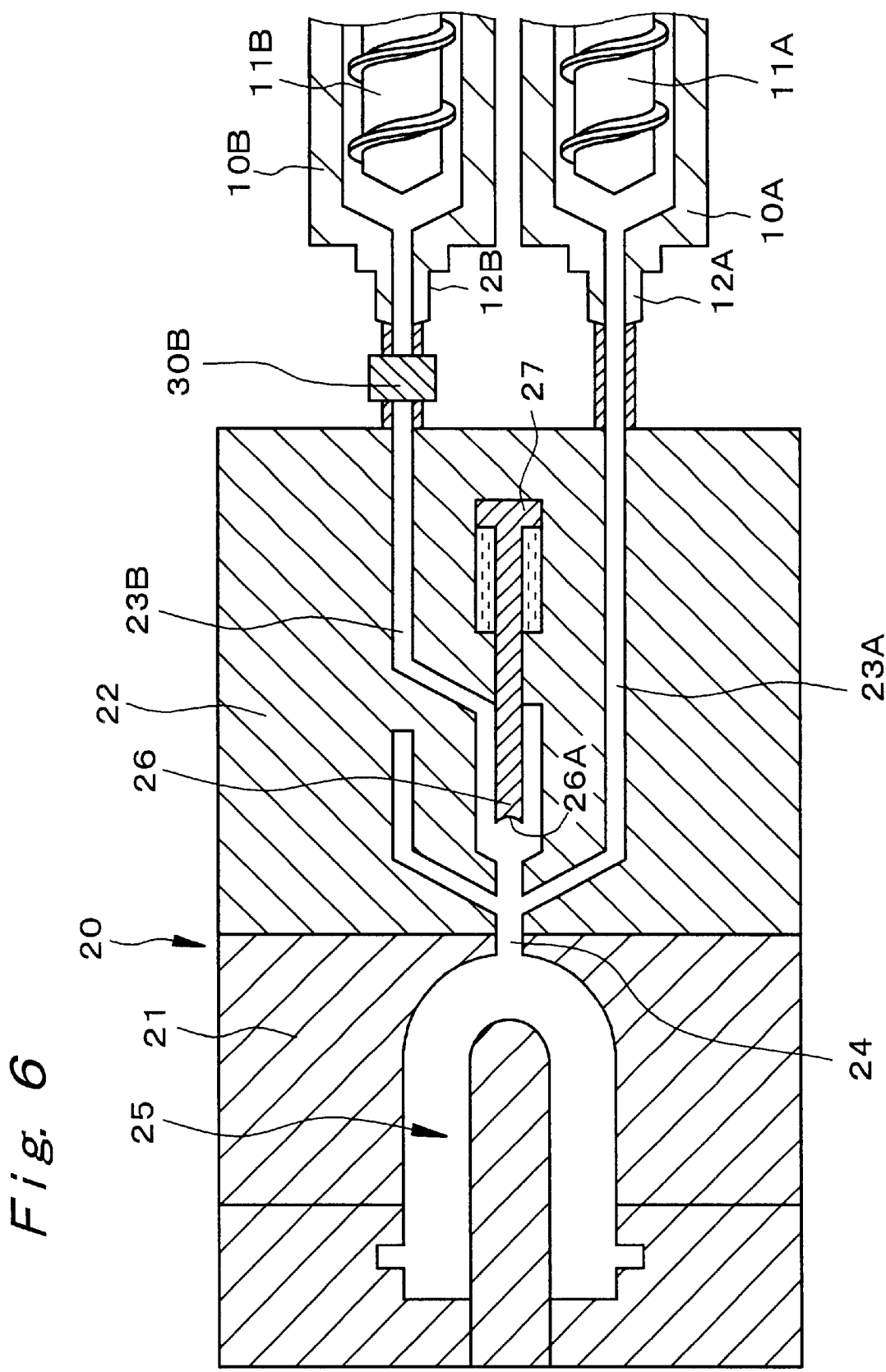
FIG. 6 is a conceptual view of an injection molding apparatus which is feasible for the production of a multi-layered article of the present invention and is in a state where no injection molding is carried out.
Figure 7:
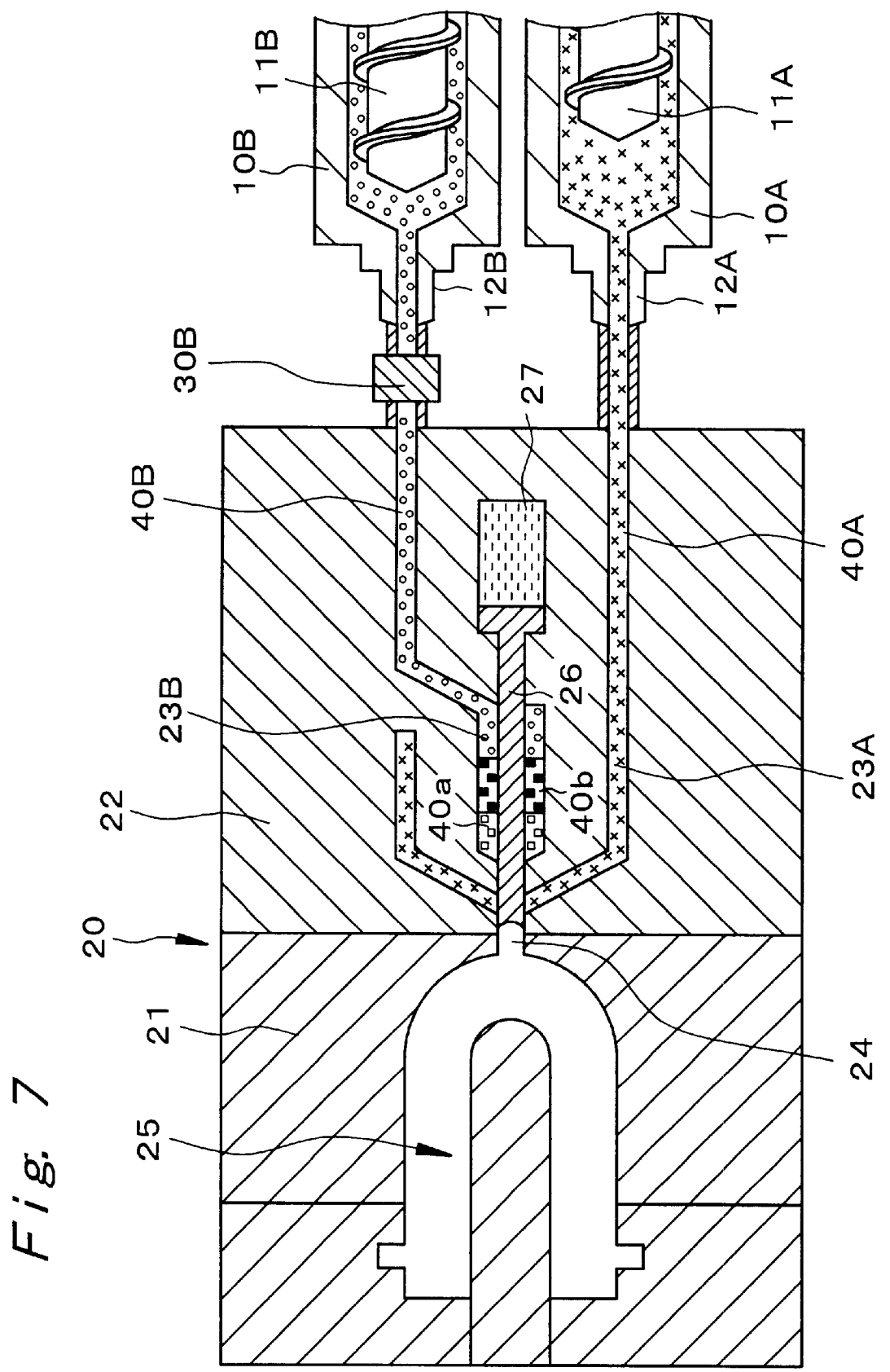
FIG. 7 is a conceptual view of the injection molding apparatus which is feasible for the production of a multi-layered article of the present invention and which is in a state where the metering of the first and second molten resins have been finished immediately before the formation of the multi-layered article.

FIGS. 6 and 7 schematically show the injection molding apparatus for injection molding a multi-layered article such as a parison (to be simply referred to as "injection molding apparatus" hereinafter). FIG. 6 shows the injection molding apparatus in a state where no injection molding is carried out, and FIG. 7 shows the injection molding apparatus in a state where the metering of a first molten resin 40A and a second molten resin 40B is finished immediately before the injection molding of a multi-layered article.

The injection molding apparatus has a mold 20, two injection cylinders 10A and 10B, a first resin-flow-passage 23A for connecting an inside of the first injection cylinder 10A and a cavity 25 and a second resin-flow-passage 23B for connecting an inside of the second injection cylinder 10B and the cavity 25. The mold 20 is composed of a cavity block 21 provided with the cavity 25 and a hot runner block 22. The cavity block 21 is composed of a combination of a plurality of block members. Those portions of the first resin-flow-passage 23A and the second resin-flow-passage 23B which are located in the mold 20 are provided in the hot runner block 22. Further, the first resin-flow-passage 23A and the second resin-flow-passage 23B are structured so as to meet with each other in a junction portion upstream to a gate portion 24 which is opened to the cavity 25. Reference numerals 12A and 12B show nozzle portions of the first and second injection cylinders 10A and 10B, respectively.

That part of each of the first and second resin-flow-passages 23A and 23B which is positioned upstream to the junction portion of the first and second resin-flow-passages 23A and 23B (on the injection cylinder side) has a dual (double) tube structure. The tubular second resin-flow-passage 23B inside the dual tube structure is provided with a gate cut pin 26 inside. The gate cut pin 26 is movable in a direction near to, and far from, the cavity 25 by the actuation of an air cylinder 27. The communication between the tubular first resin-flow-passage 23A on the outer side of the dual tube structure and the cavity 25 and the communication between the tubular second resin-flow-passage 23B on an inner side of the dual tube structure and the cavity 25 can be controlled on the basis of movement of the gate cut pin 26. That is, when the gate cut pin 26 is moved to a forward end, the communication between the first resin-flow-passage 23A and the cavity and the communication between the second resin-flow-passage 23B and the cavity 25 are blocked. When the gate cut pin 26 is moved to a backward end, the communication between the first resin-flow-passage 23A and the cavity 25 and the communication between the second resin-flow-passage 23B and the cavity 25 are secured. FIG. 6 shows a state where the gate cut pin 26 is withdrawn from the gate portion 24 (positioned in the backward end). FIG. 7 shows a state where the gate cut pin 26 is inserted in the gate portion 24 (positioned in the forward end). The cavity block 21 has a tubing for flowing water inside and the hot runner block 22 has a heater inside, while the tubing and the heater are not shown.

In FIG. 7, reference numeral 40A shows a first molten resin to be injected from the first injection cylinder 10A to the cavity 25 through the first resin-flow-passage 23A and the gate portion 24, and reference numeral 40B shows a second molten resin to be injected from the second injection cylinder 10B to the cavity 25 through the second resin-flow-passage 23B and the gate portion 24. Further, reference numeral 40a shows a remaining molten resin 40A which has flowed into to be left in the second resin-flow-passage 23B in a previous molding cycle (shown by blank squares in FIG. 7). Reference numeral 40b shows crudely mixed resins which are in a state where a remaining first molten resin 40A which has flowed into and has been left in the second resin-flow-passage 23B during the previous injection and second molten resin 40B which is left in the second resin-flow-passage 23B are crudely mixed (the crudely mixed resins are indicated by black squares in FIG. 7). The above mixture in a crudely mixed state, indicated by 40b, will be referred to as "crudely-mixed-state resin portion 40b" hereinafter.

The top end surface of the conventional gate cut pin has a plain or convex surface, while the top end surface 26A of the gate cut pin 26 of the injection molding apparatus feasible for the production of a multi-layered article of the present invention may be concave, concavo-convex or notched. When the top end surface 26A is provided, a remainder of the first molten resin 40A which has flowed into and left in the second resin-flow-passage 23B during the previous injection and the second molten resin 40B which is left in the second resin-flow-passage 23B are easily brought into a crudely mixed state.

The injection molding apparatus is provided with back flow means for allowing a constant amount of the first molten resin 40A in the first resin-flow-passage 23A to flow into the second resin-flow-passage 23B after the second molten resin 40B is injected into the cavity 25 through the second resin-flow-passage 23B. The back flow means is operated by a pressure which the first molten resin 40A in the first resin-flow-passage 23A exerts on the second molten resin 40B in the second resin-flow-passage 23B. In the injection molding apparatus, the back flow means is a back flow control valve provided in that portion of the resin-flow-passage 23B which is upstream to the junction portion of the first and second resin-flow-passages 23A and 23B. Specifically, the back flow control valve is a ball-type back flow control valve 30B. The back flow control valve 30B is disposed between the nozzle portion 12B of the second injection cylinder 10B and the mold 20, while it may be disposed in the nozzle portion 12B.

A conventional ball check valve is provided for preventing back flow of a molten resin. In contrast, the back flow control valve 30B is structured so as to be capable of allowing a constant amount of the second molten resin 40B to flow back. Specifically, the back flow control valve 30B is composed of a cylindrical tube portion 31 having a hollow portion 32 and a ball 34 housed in the hollow portion 32, as shown in the schematic end view of FIG. 11A. That predetermined portion of the hollow portion 32 which is located from the end portion of the hollow portion 32 (on the mold side) toward the upstream side of the hollow portion 32 has a larger diameter than the ball 34. The above predetermined portion of the hollow portion 32 is called a diameter-enlarged portion 33. Other portion of the hollow portion 32 than the diameter-enlarged portion 33 has a diameter nearly equal to the diameter of the ball 34.

Figure 11A:
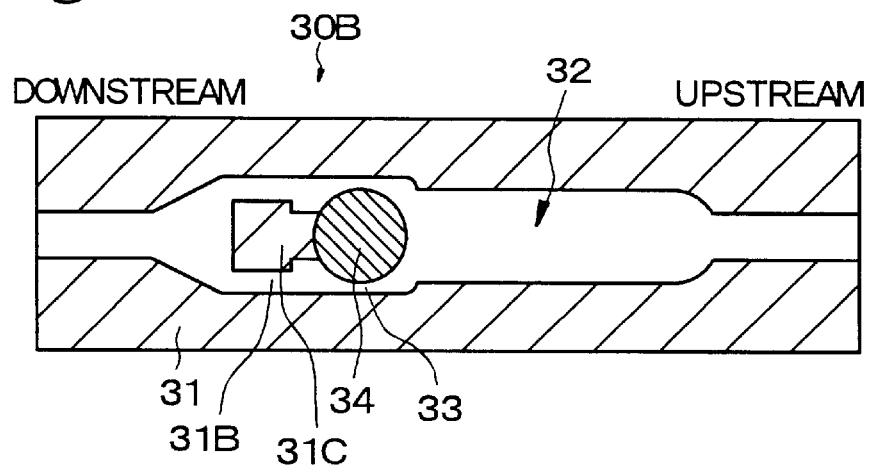
FIGS. 11A, 11B and 11C are schematic end views of a ball-type back flow control valve which is a back flow means provided in the injection molding apparatus feasible for the production of a multi-layered article of the present invention.
Figure 11B:
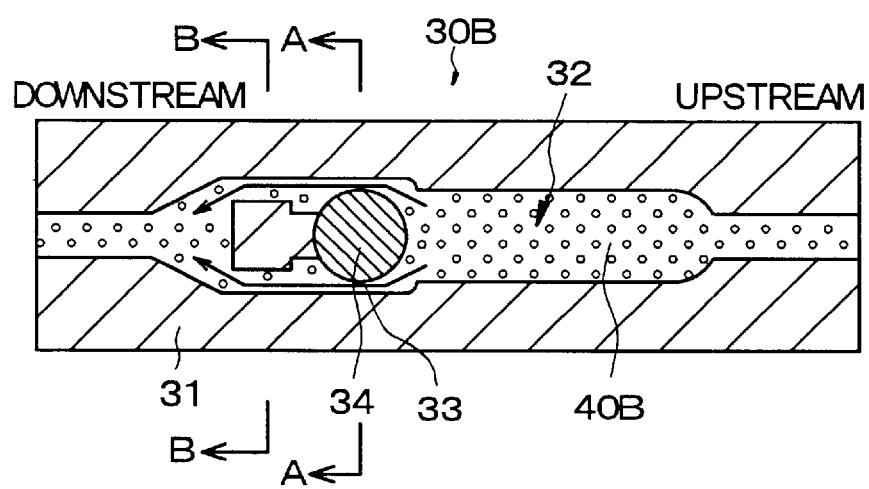

When the second molten resin 40B is forwarded from the second injection cylinder 10B to the cavity 25, the ball 34 is pushed to the diameter-enlarged portion 33 on the downstream end side of the hollow portion 32 by the pressure of the second molten resin 40B as shown in FIG. 11B. When the second molten resin 40B is injected into the cavity 25 through the second resin-flow-passage 23B and after the injection is completed, therefore, the inside of the second injection cylinder 10B and the cavity 25 are brought into a communicated state by means of the back flow control valve 30B. The second molten resin 40B flows toward the cavity 25 through a gap between the ball 34 and the diameter-enlarged portion 33.

Figure 11C:
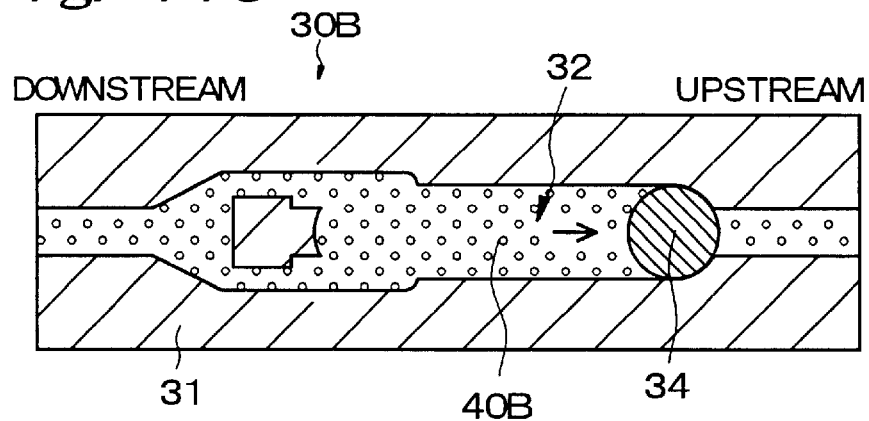

On the other hand, the second molten resin 40B flows back due to a pressure which the first molten resin 40A in the first resin-flow-passage 23A exerts on the molten resin 40B in the second resin-flow-passage 23B. And, when the second molten resin 40B flows back through the back flow control valve 30B, the ball 34 is moved toward the upstream end portion of the hollow portion 32 by the pressure of the second molten resin 40B which is flowing back, and finally, the ball 34 is pushed to the upstream end portion of the hollow portion 32 (see FIG. 11C). There is no gap between the ball 34 and the upstream end portion of the hollow portion 32. In a state shown in FIG. 11C, therefore, no further back flow of the second molten resin 40B takes place. In other words, while the ball 34 is moving from the diameter-enlarged portion 33 of the cylindrical tube portion 31 to the upstream end portion of the hollow portion 32, the second molten resin 40B flows back through the back flow control valve 30B. Generally, the volume of the second molten resin 40B which flows back is approximately defined by a product of the cross sectional area of the ball 34 and the movement distance of the ball 34, and is a constant amount. In other words, generally, the volume of the second molten resin 40B which flows back is nearly equal to a volume obtained by deducting the volume of the ball 34 from the volume of the hollow portion 32, and is a constant amount. The volume of the first molten resin 40A which flows into the second resin-flow-passage 23B can be defined by properly selecting and determining the diameter of the ball 34 and the movement distance of the ball 34. The first molten resin 40A which flows into the second resin-flow-passage 23B is referred to as "inflow first molten resin", hereinafter, in some cases. That is, it is sufficient to properly select and 5 determine the diameter of the ball 34 and the movement distance of the ball 34 such that the volume of the inflow first molten resin is 5 to 50%, preferably 5 to 35%, more preferably 5 to 25%, based on the volume of the cavity. In other words, the product of the cross sectional area of the ball 34 and the movement distance of the ball 34 is nearly equal to the volume of the inflow first molten resin. In FIGS. 11B and 11C, arrows show directions in which the second molten resin 40B flows.

The first molten resin 40A in the first resin-flow-passage 23A begins to flow into the second resin-flow-passage 23B, and the ball 34 begins to move from the diameter-enlarged portion 33 of the cylindrical tube portion 31 to the upstream end portion of the hollow portion 32. When the predetermined amount of the first molten resin 40A in the first resin-flow-passage 23A flows into the second resin-flow-passage 23B, the ball 34 reaches the boundary between the diameter-enlarged portion 33 and other portion of the hollow portion 32 than the diameter-enlarged portion 33. The inside of the second injection cylinder 10B and the cavity 25 are brought into a non-communicated state by means of the back flow control valve 30B at a point of time when the ball 34 moves into other portion of the hollow portion 32 than the diameter-enlarged portion 33, since other portion of the hollow portion 32 than the diameter-enlarged portion 33 has a diameter nearly equal to the diameter of the ball 34.

Figure 12A:
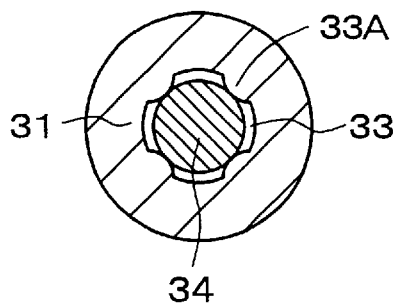
FIGS. 12A, 12B, 12C and 12D are schematic cross-sectional views of the cylindrical portion of the ball-type back flow control valve taken along line A—A in FIG. 11B, and FIGS. 12E, 12F, 12G and 12H are schematic cross-sectional views of the cylindrical portion of the ball-type back flow control valve taken along line B—B in FIG. 11B.
Figure 12B:
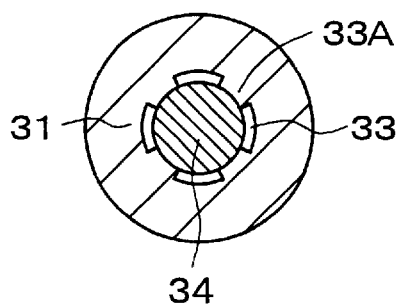
Figure 12C:
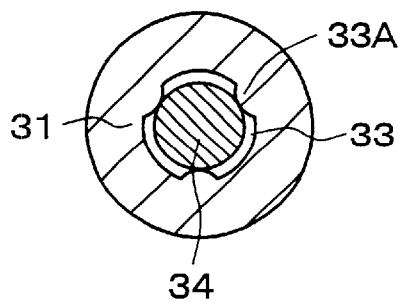
Figure 12D:
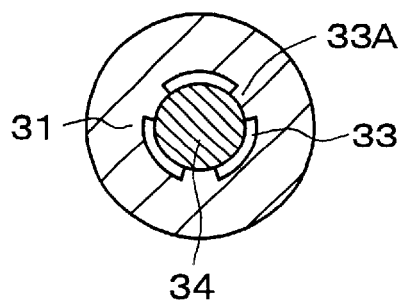

FIGS. 12A and 12B show schematic cross-sectional views of the cylindrical tube portion taken along a line A—A in FIG. 11B. In structures shown in FIGS. 12A and 12B, protrusions 33A extend from four places of the inner surface of diameter-enlarged portion 33 of the cylindrical tube portion 31 near to a ball receptor 31C in parallel with an axial line of the cylindrical tube portion 31, and the ball 34 moves while it is kept in contact with the top end or top end surface of each protrusion 33A. FIGS. 12C and 12D show variants of the diameter-enlarged portion 33 of the cylindrical tube portion 31 taken along the line A—A in FIG. 11B. In structures shown in FIGS. 12C and 12D, protrusions 33A extend from three places of the inner surface of diameter-enlarged portion 33 of the cylindrical tube portion 31 near to the ball receptor 31C in parallel with the axial line of the cylindrical tube portion 31. In the structures shown in FIGS. 12A and 12C, each protrusion 33A has a cross-sectional form obtained by cutting off part of a circle. In the structures shown in FIGS. 12B and 12D, each protrusion 33A has a nearly rectangular cross-sectional form.

Figure 12E:
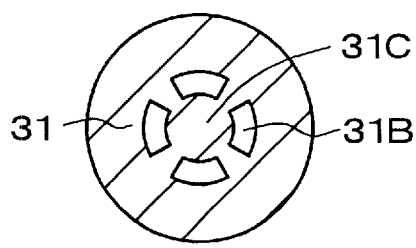

The second molten resin 40B flows through a space surrounded by the ball 34, the protrusions 33A and inner surfaces of the diameter-enlarged portion 33. The cross-sectional forms of the protrusions 33A, the number of the protrusions 33A and the form of the above space obtained by cutting the space with a plane perpendicular to the axial line of the cylindrical tube portion 31 shall not be limited to those shown in FIGS. 12A to 12D. FIG. 12E shows a schematic cross-sectional view of the ball receptor 31C taken along a line B—B in FIG. 11B.

Figure 12F:
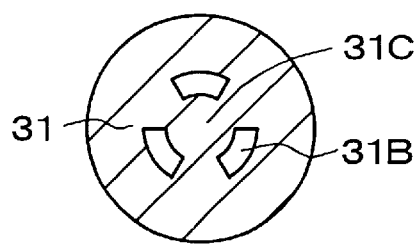
Figure 12G:
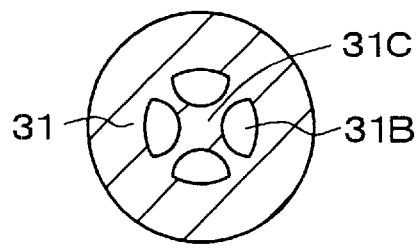
Figure 12H:
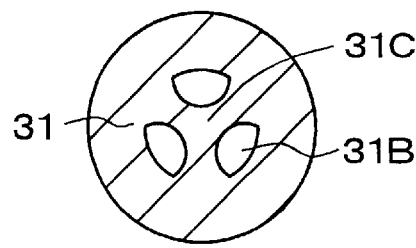

Further, FIGS. 12F, 12G and 12H show schematic cross-sectional views of variants of that part of the ball receptor 31C which is taken along the line B—B in FIG. 11B. As shown in FIGS. 12E to 12H, spaces 31B extending in the direction in parallel with the axial line of the cylindrical tube portion 31 are provided between the ball receptor 31C in the downstream end portion of the hollow portion 32 and the cylindrical tube portion 31, each space 31B is in communication with the diameter-enlarged portion 33, and the second molten resin 40B flows in each space 31B. The ball receptor 31C and the, cylindrical tube portion 31 may be integrally produced, or they may be separately produced. The number of the above spaces 31B and the form of the above spaces 31B obtained by cutting the spaces 31B with a plane perpendicular to the axial line of the cylindrical tube portion 31 shall not be limited to those shown in FIGS. 12E to 12H.

Figure 13A:
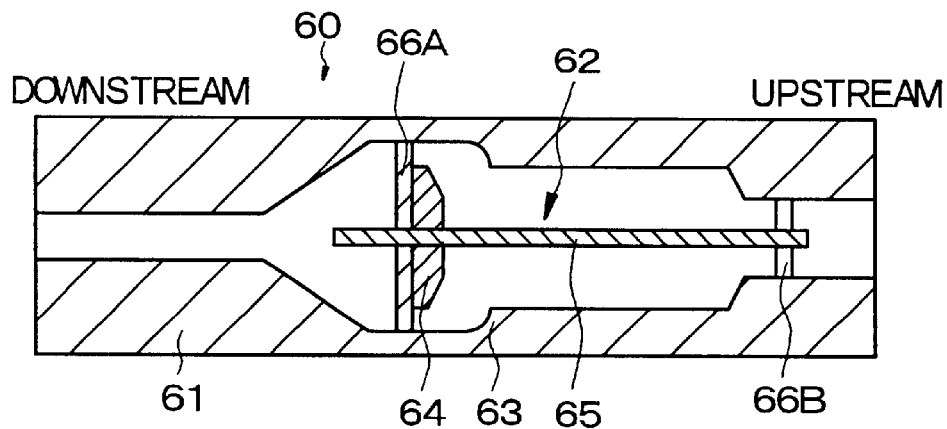
FIGS. 13A, 13B and 13C are schematic end views of a sliding valve-type back flow control valve.
Figure 13B:
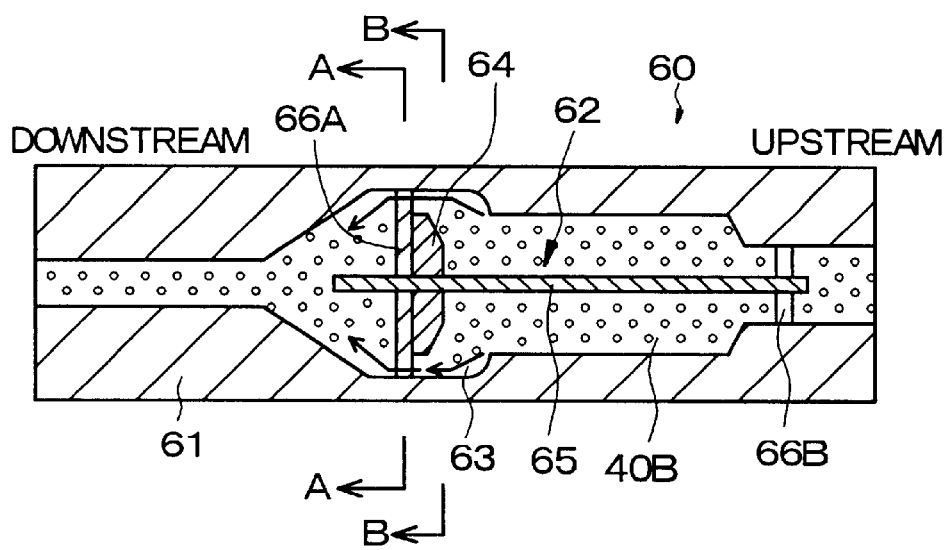
Figure 13C:
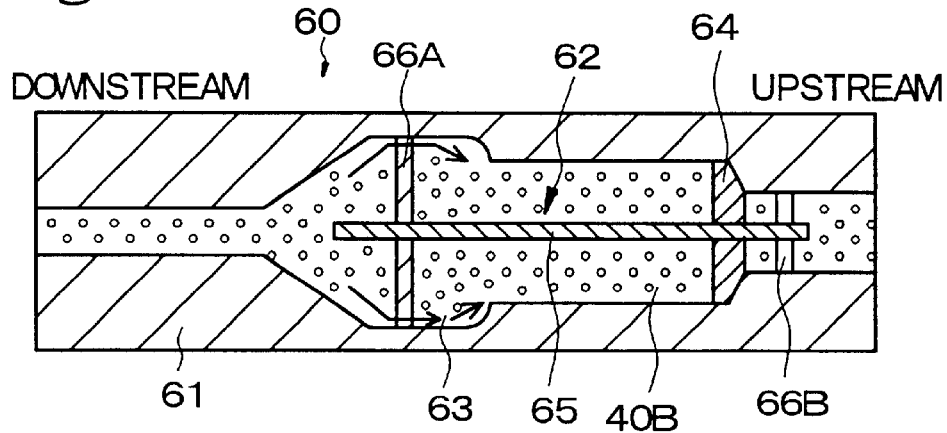

As a back flow control valve, the ball-type back flow control valve shown in FIGS. 11A, 11B and 11C may be replaced with a sliding valve-type back flow control valve 60 shown in FIGS. 13A, 13B and 13C. The sliding valve-type back flow control valve 60 has a structure in which a constant amount of the second molten resin 40B can flow back. Specifically, the back flow control valve 60 comprises a cylindrical tube portion 61 having a hollow portion 62, a valve member (sliding valve) 64 housed in the hollow portion 62 and a bar 65 as FIG. 13A shows its schematic end view. The bar 65 is provided in the central portion of the cylindrical tube portion 61 and along an axial line thereof, and attached to the cylindrical tube portion 61 with supports 66A and 66B. The second molten resin 40B can pass through the supports 66A and 66B freely. The central portion of the valve member 64 is slidably attached to the bar 65. That predetermined portion of the hollow portion 62 which is located from the downstream end portion of the hollow portion 62 (on the mold side) toward the upstream side of the hollow portion 62 has a larger cross sectional area than the valve member 64. The above predetermined portion of the hollow portion 62 will be called a diameter-enlarged portion 63. Other portion of the hollow portion 62 than the diameter-enlarged portion 63 has a cross sectional area nearly equal to the cross sectional area of the valve member 64.

When the second molten resin 40B is injected toward the cavity 25 from the second injection cylinder 10B, the valve member 64 is pressed to the support 66A on the downstream end portion side of the hollow portion 62 with a pressure of the second molten resin 40B. When the second molten resin 40B is injected into the cavity through the second resin-flow-passage 23B, and after the completion of the injection, therefore, the inside of the second injection cylinder 10B and the cavity 25 are brought into a communicated state by means of the back flow control valve 60. The second molten resin 40B flows toward the cavity 25 through a space between the valve member 64 and the diameter-enlarged portion 63.

On the other hand, the second molten resin 40B flows back due to a pressure which the first molten resin 40A in the first resin-flow-passage 23A exerts on the second molten resin 40B in the second resin-flow-passage 23B. When the second molten resin 40B flows back through the back flow control valve 60, the valve member 64 is moved toward the upstream end portion of the hollow portion 62 with the pressure of the first molten resin 40A which flows into the second resin-flow-passage 23B and the valve member 64 is finally pressed to the upstream end portion of the hollow portion 62 (see FIG. 13C). There is no gap between the valve member 64 and the upstream end portion of the hollow portion 62. In a state shown in FIG. 13C, therefore, the second molten resin 40B does not flow back any further. In other words, while the valve member 64 is moving from the down stream end portion to the upstream end portion of the hollow portion 62 of the cylindrical tube portion 61, the second molten resin 40B flows back through the back flow control valve 60. Generally, the volume of the second molten resin 40B which flows back is approximately defined by a product of the cross sectional area of the portion of the hollow portion 62 where the valve member 64 moves and the movement distance of the valve member 64, and is a constant value. In other words, generally, the volume of the second molten resin 40B which flows back is nearly equal to a volume obtained by deducting the volume of the valve member 64 from the volume of the hollow portion 62, and is a constant amount. Therefore, the volume of the first molten resin 40A which flows into the second resin-flow-passage 23B can be defined by properly selecting and determining the cross sectional area of the portion of the hollow portion 62 where the valve member 64 moves and the movement distance of the valve member 64. In other words, a product of the cross sectional area of the portion of the hollow portion 62 where the valve member 64 moves and the movement distance of the valve member 64 is nearly equal to a volume of the inflow first molten resin. In FIGS. 13B and 13C, directions in which the second molten resin 40B flows are indicated by arrows. The cross-sectional forms of the valve member 64 and the hollow portion 62, obtained by cutting them with a plane perpendicular to the flow directions of the second molten resin 40B, are preferably circular but shall not be limited thereto. The above cross-sectional forms may be rectangular or any other form.

The first molten resin 40A in the first resin-flow-passage 23A begins to flow into the second resin-flow-passage 23B, and the valve member 64 begins to move from the diameter-enlarged portion 63 of the cylindrical tube portion 61 to the upstream end portion of the hollow portion 62. When the predetermined amount of the first molten resin 40A in the first resin-flow-passage 23A flows into the second resin-flow-passage 23B, the valve member 64 reaches the boundary between the diameter-enlarged portion 63 and other portion of the hollow portion 62 than the diameter-enlarged portion 63. The inside of the second injection cylinder 10B and the cavity 25 are brought into a non-communicated state at a point of time when the valve member 64 comes into other portion of the hollow portion 62 than the diameter-enlarged portion 63, since the cross-sectional form of other portion of the hollow portion 62 than the diameter-enlarged portion 63 is nearly equal to the cross-sectional form of the valve member 64.

Figure 14A:
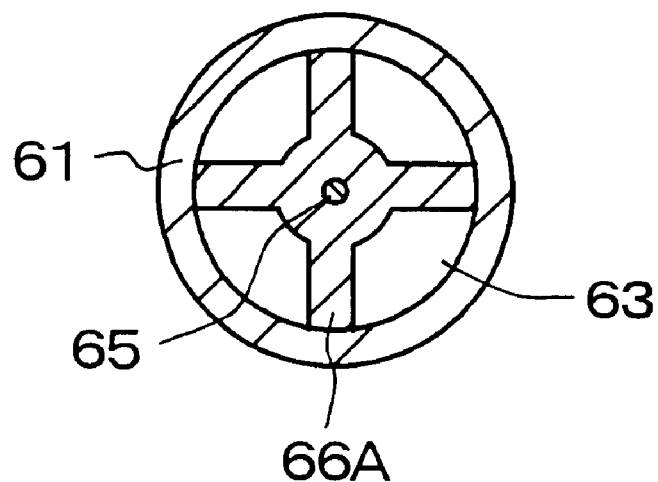
FIG. 14A is a schematic cross-sectional view of a cylindrical portion taken along line A—A in FIG. 13B.
Figure 14B:
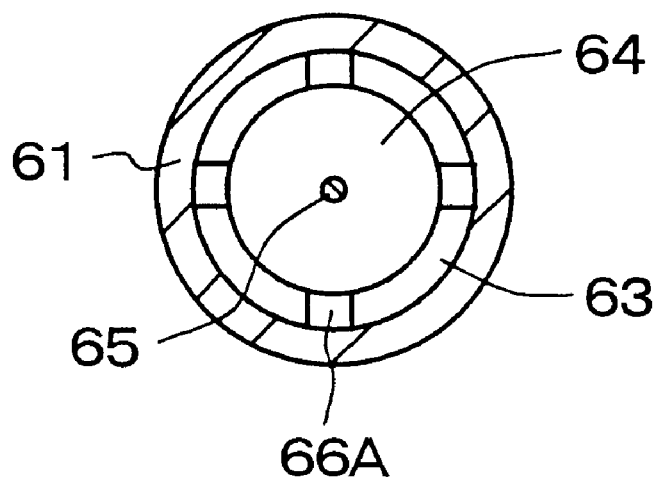
FIG. 14B is a schematic cross-sectional view of the cylindrical portion taken along line B—B in FIG. 13B.

FIG. 14A shows a schematic cross-sectional view of the cylindrical tube portion 61 taken along a line A—A in FIG. 13B, and FIG. 14B shows a schematic cross-sectional view of the cylindrical tube portion 61 taken along a line B—B in FIG. 13B. The support 66A has a disk-shaped central portion, four arms extend from its circumference, and the top end of each arm reaches an inner surface of the cylindrical tube portion 61. The support 66A and the cylindrical tube portion 61 may be integrally produced, or they may be separately produced. The support 66A has the bar 65 fixed to its central portion. The structure of the support 66A shall not be limited to structures shown in FIGS. 14A and 14B, and the form of the central portion of the support 66A and the number of the arms may be determined as required.

As mentioned above, the back flow means constituted of a back flow control valve (a counter-flow control valve) can avoid an increase in the size of an injection molding apparatus and a complication of the apparatus, and prevents the leakage of molten resin from the resin-flow-passages. When a ball-type back flow control value is used as a back flow control valve, nothing but a ball moves under a fluid pressure, the back flow control valve is structurally simple, and neither a movable part nor a sliding part is present. When a conventional shut-off valve is used, an electromagnetic valve or a cylinder is operated with an external hydraulic pressure or air pressure, and the flow passage of a fluid is forcibly opened and closed with the rotation or reciprocal movement thereof. Therefore, the conventional shut-off valve is structurally complicated and has poor durability.

Figure 15:
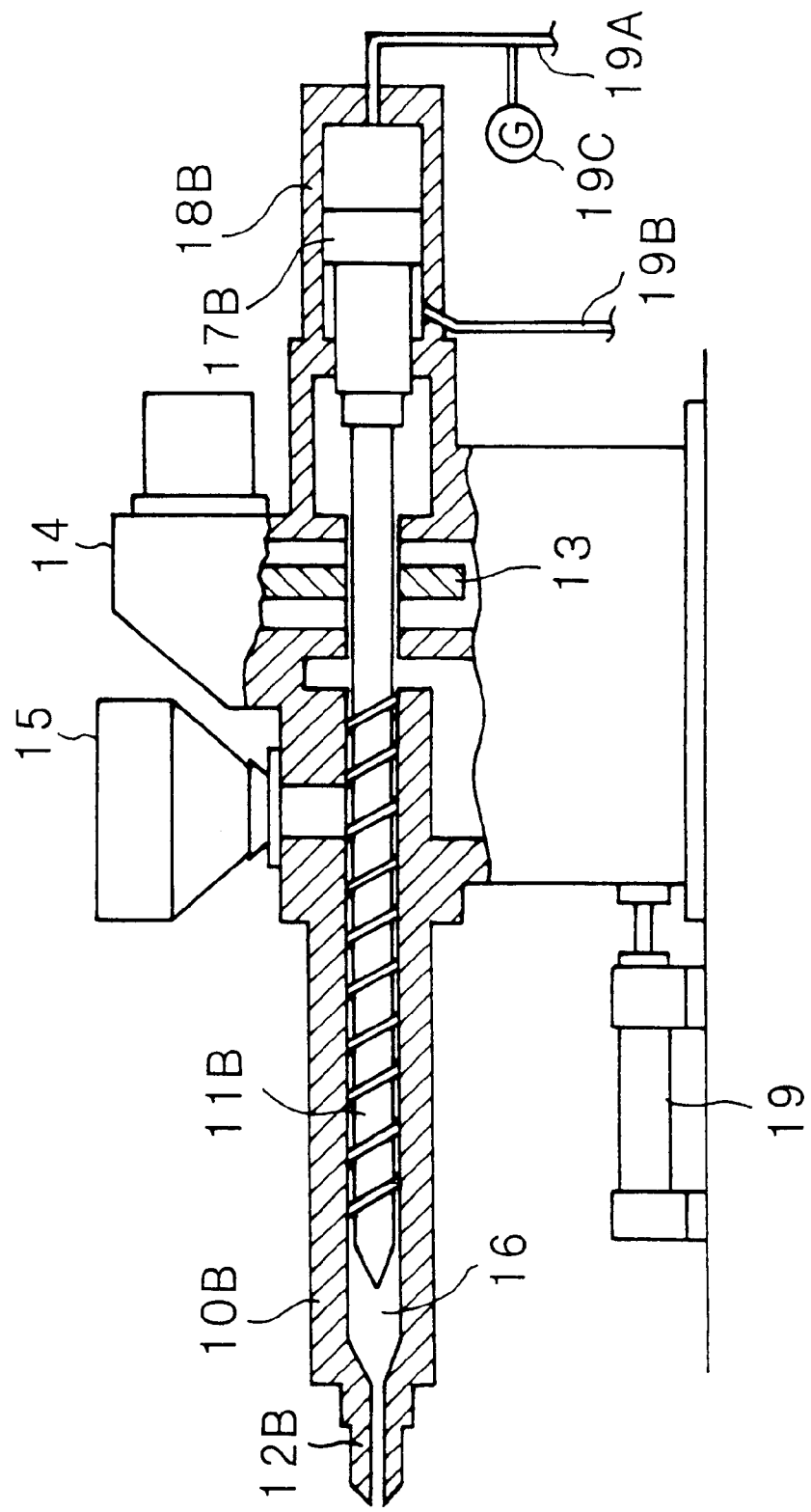
FIG. 15 is a schematic cross-sectional view showing the structure of a second injection cylinder.
Figure 16:
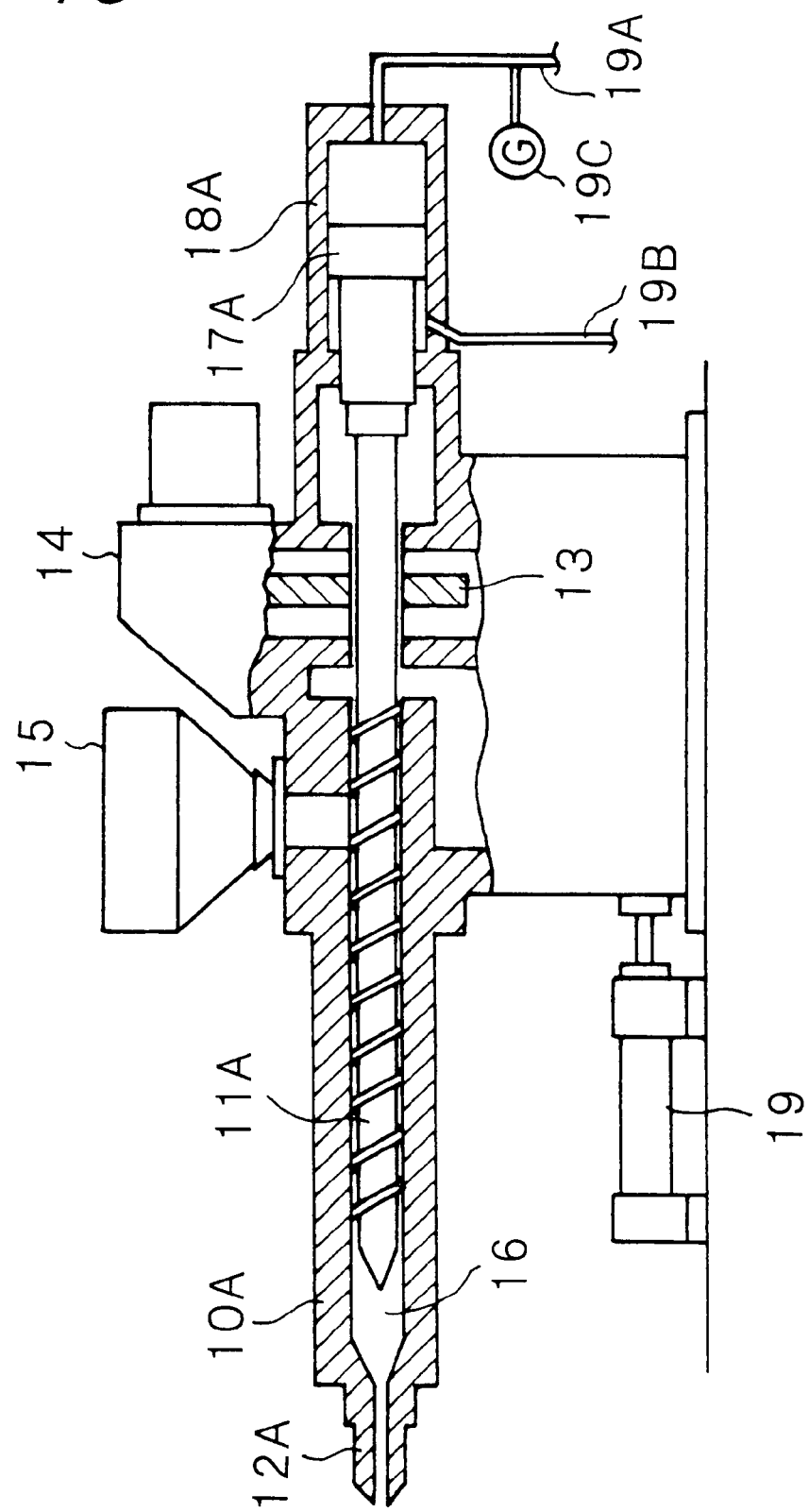
FIG. 16 is a schematic cross-sectional view showing the structure of a first injection cylinder.

Each of screws 11A and 11B provided in the first and second injection cylinders 10A and 10B are in-line screw type screws which plasticize and melt a resin and also have the function of a plunger. The second injection cylinder 10B will be explained as an example with reference to FIG. 15 below, while the first injection cylinder 10A can have the same structure as shown in FIG. 16. The screw 11B is rotated with a hydraulic motor 14 through a reduction gear 13. The second resin fed to the screw 11B from a hopper 15 is heated, plasticized, melted and metered with the heating injection cylinder 10B and the screw 11B and reserved in a space 16 formed between the heating injection cylinder 10B and the top portion of the screw 11B. The screw 11B has an injection ram 17B attached to the backward end thereof, and the injection ram 17B is pressurized with an injection hydraulic cylinder 18B. The injection ram 17B is pressurized with the injection hydraulic cylinder 18B to push the screw 11B forward, and a pressure is exerted on the second molten resin. As a result, the second molten resin reserved in the space 16 is injected into the cavity 25 through the back flow control valve 30B, the second resin-flow-passage 23B and the gate portion 24. In FIG. 15, reference numeral 19 indicates a cylinder for moving an injection apparatus forward and backward, reference numerals 19A and 19B indicate hydraulic tubes, and reference numeral 19C indicates a pressure gage.

Figure 20:
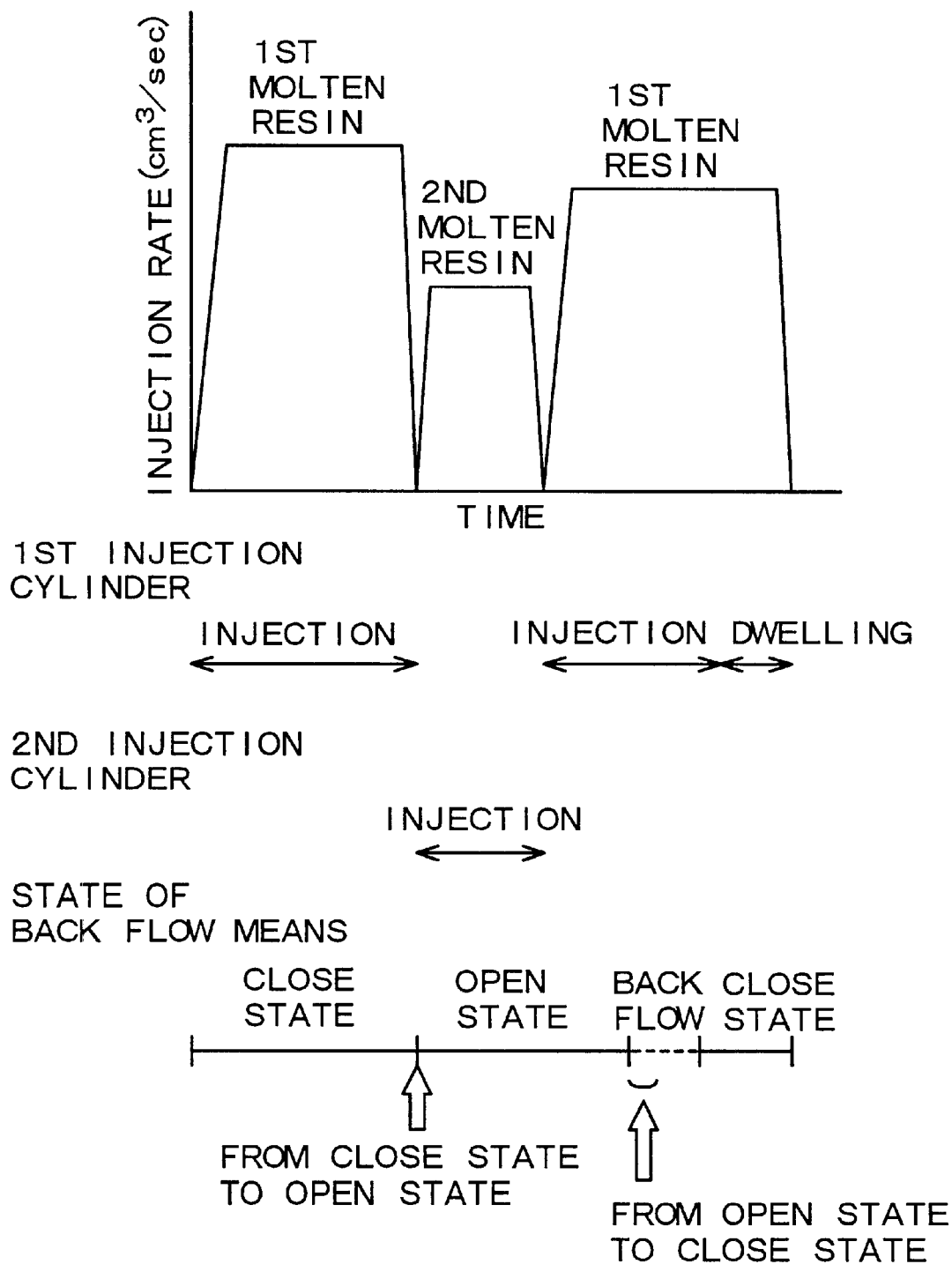
FIG. 20 is a graph showing changes of an injection rate, etc., with the elapse of time in the method of injection molding the multi-layered article according to the fourth aspect of the present invention.

The method of injection molding the multi-layered article according to the fourth aspect of the present invention using the above-mentioned injection molding apparatus will be explained with reference to FIGS. 7 to 10. The injection molding method here is included in an alternate-injection method. FIG. 20 shows changes of injection rates, etc., with the lapse of time in the method of injection molding the multi-layered article.

[Step-100]

Figure 8:
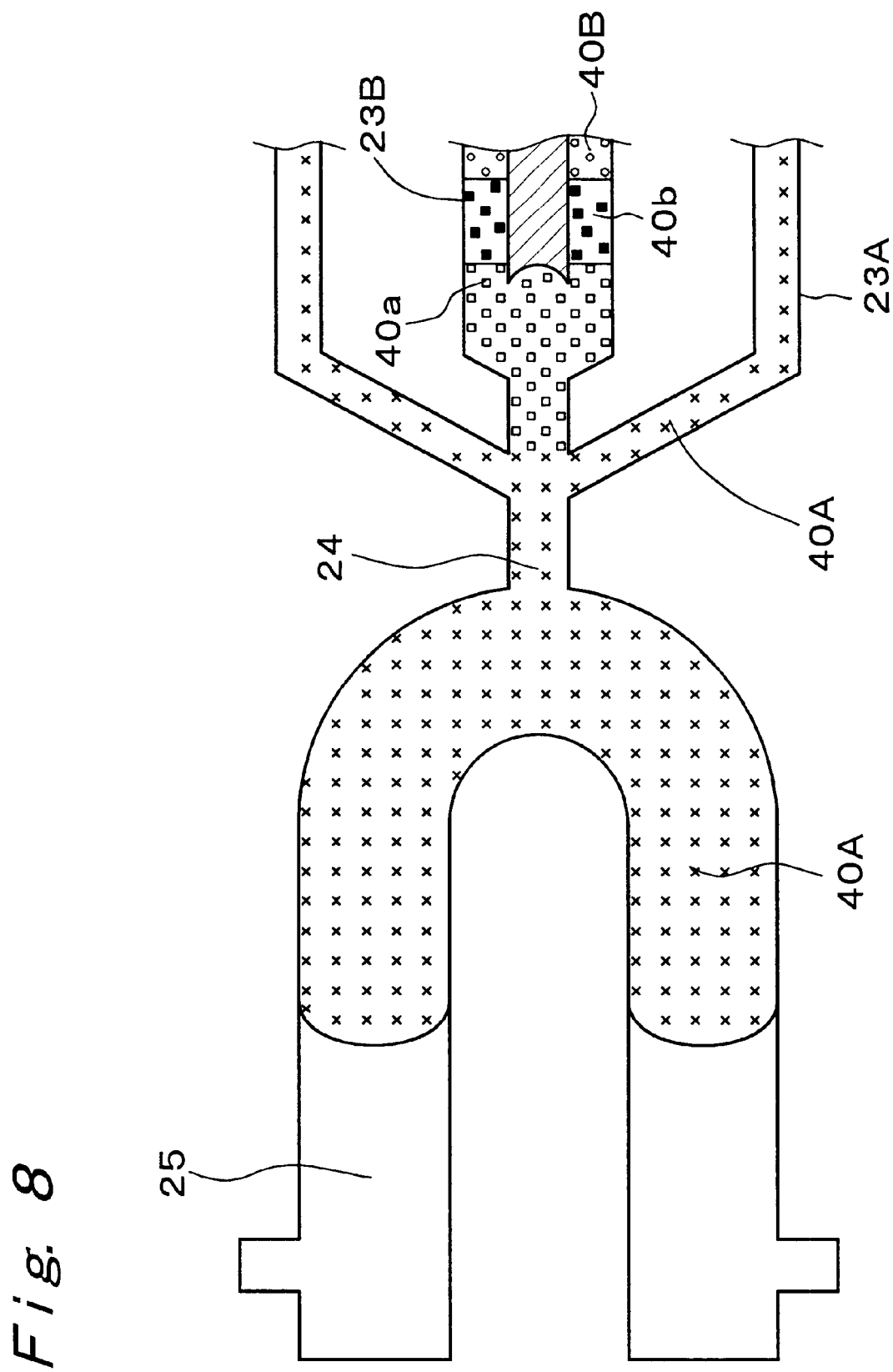
FIG. 8 is a conceptual view of a cavity, etc., for explaining the method of injection molding a multi-layered article by means of the injection molding apparatus feasible for the production of a multi-layered article of the present invention.

For forming a multi-layered article (a parison), in a state where the first and second molten resins 40A and 40B are metered as shown in FIG. 7, the air pressure cylinder 27 is actuated to move the gate cut pin 26 backward, whereby the gate cut pin 26 is withdrawn from the gate portion 24 and positioned in a backward end to open the gate portion 24. Part of the first molten resin 40A prepared in the first injection cylinder 10A is injected into the cavity 25 through the first resin-flow-passage 23A. That is, a pressure is applied to the injection ram 17A with the injection hydraulic cylinder 18A to push the screw 11A forward, whereby part of the first molten resin 40A prepared in the first injection cylinder 10A is injected into the cavity 25 through the first resin-flow-passage 23A and the gate portion 24. This state is schematically shown in FIG. 8.

Before injecting the first molten resin 40A into the cavity 25 through the first resin-flow-passage 23A for forming the outermost layer of the multi-layered article, i.e., before the above [Step-100], (specifically, in a previous molding cycle), a constant amount of a molten resin other than a molten resin for a layer which is not the outermost layer of the multi-layered article (the first molten resin 40A) has already flowed into and been present in the second resin-flow-passage 23B upstream to the junction portion. A remaining molten resin 40A which has flowed into and has been left in the second resin-flow-passage 23B during the previous molding cycle is expressed by white squares in FIG. 7, and indicated by reference numeral 40a. Further, reference numeral 40b shows a crudely-mixed-state resin portion (indicated by black squares in FIG. 7) which is a mixture of a remaining first molten resin 40A which has flowed into and has been left in the second resin-flow-passage 23B during the previous injection with the second molten resin 40B which is left in the second resin-flow-passage 23B.

For example, as far as the molten resin filling ratio in the cavity 25 does not exceed, e.g., 70% of the volume of the cavity 25, and when the first molten resin 40A is injected into the cavity 25, a pressure heading for the second injection cylinder 10B, caused by the injection of the first molten resin 40A, is hardly exerted on the second molten resin 40B in the second resin-flow-passage 23B. In no case, therefore, the second molten resin 40B in the second resin-flow-passage 23B flows back toward the second injection cylinder 10B.

[Step-110]

Figure 9:
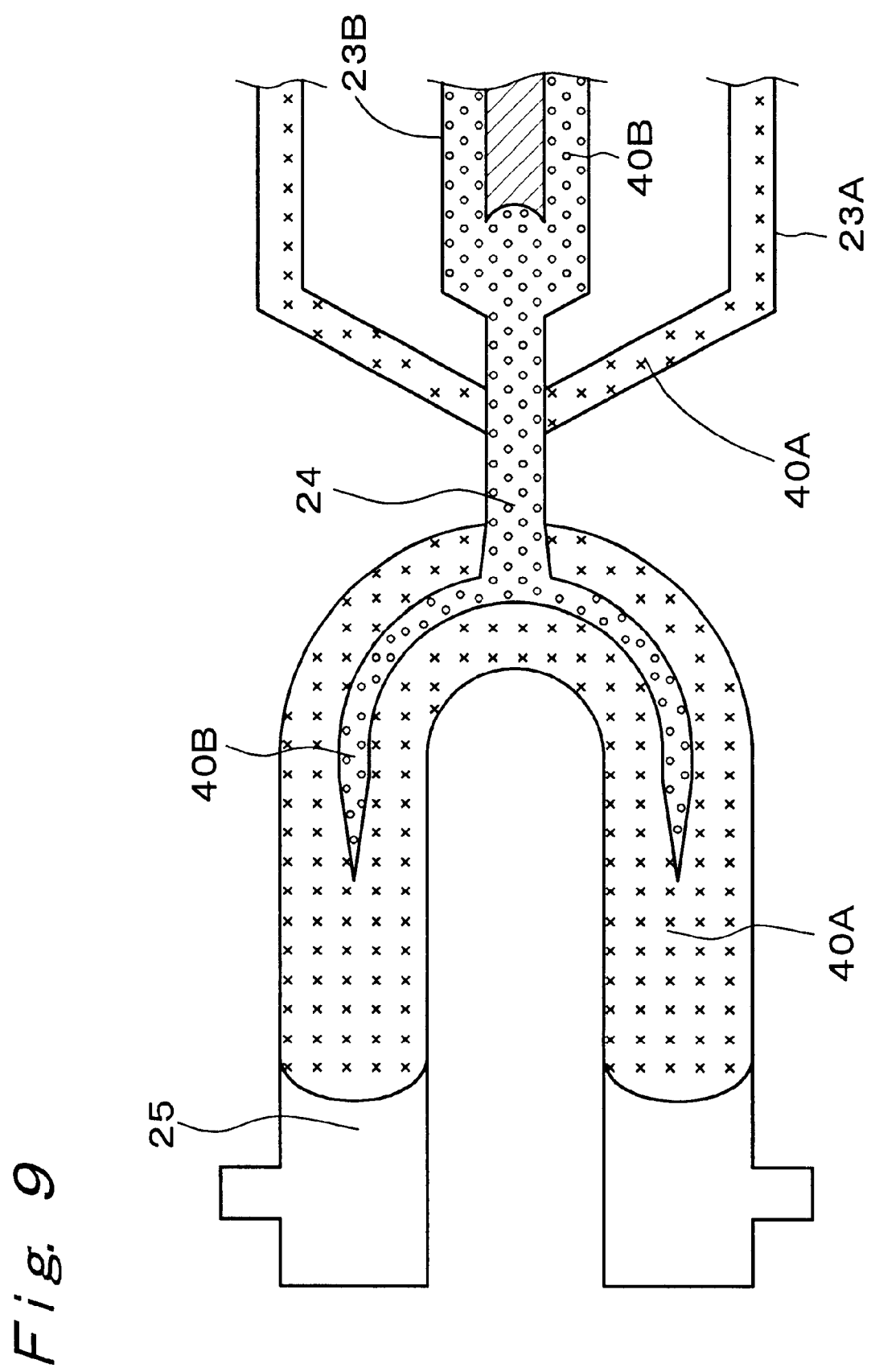
FIG. 9, following

Then, the injection of the first molten resin 40A is discontinued. That is, the application of a pressure to the injection ram 17A with the injection hydraulic cylinder 18A in the first injection cylinder 10A is discontinued. Then, the second molten resin 40B prepared in the second injection cylinder 10B is injected into the cavity 25 through the second resin-flow-passage 23B. That is, in the second injection cylinder 10B, a pressure is applied to the injection ram 17B with the injection hydraulic cylinder 18B to push the screw 11B forward. The second molten resin 40B prepared in the second injection cylinder 10B is injected into the cavity 25 through the second resin-flow-passage 23B and the gate portion 24. FIG. 9 schematically shows a state where the second molten resin 40B is being injected. Although depending upon injection conditions, the second molten resin 40B injected into the cavity 25 moves forward through a central portion of the first molten resin 40A filled in part of the cavity 25. The first molten resin 40a and crudely-mixed-state resin portion 40b which were left in the second resin-flow-passage 23B in a previous molding cycle are injected into the cavity 25 together with the second molten resin 40B. However, FIGS. 9 and 10 omit showing of the first molten resin 40a and the crudely-mixed-state resin portion 40b.

An injection molding apparatus having three injection cylinders may be used to inject a third resin melted in a third injection cylinder into the cavity through a third resin-flow-passage after the Step-110. In this case, the third resin may be the same as, similar to, or different from, the first resin.

[Step-120]

When the injection of the second molten resin 40B is completed, the application of a pressure to the injection ram 17B with the injection hydraulic cylinder 18B in the second injection cylinder 10B is terminated. And, the balance of the first molten resin 40A prepared in the first injection cylinder 11A is injected into the cavity 25 through the first resin-flow-passage 23A and the gate portion 24. That is, in the first injection cylinder 10A, a pressure is applied to the injection ram 17A with the injection hydraulic cylinder 18A to push the screw 11A forward, whereby the balance of the first molten resin 40A prepared in the first injection cylinder 10A is injected into the cavity 25 through the first resin-flow-passage 23A and the gate portion 24. FIG. 10 schematically shows a state where the injection of the balance of the first molten resin 40A is completed. The amount of the balance of the first molten resin 40A to be injected is a total of an amount of the first molten resin 40A sufficient for finally filling the entire cavity 25 and an amount of the first molten resin 40a which flows into the second resin-flow-passage 23B. Although depending upon injection conditions, the first molten resin 40A injected into the cavity 25 moves forward through a central portion of the second molten resin 40B filled in part of the cavity 25.

At this moment, a pressure which heads for the second injection cylinder 10B is exerted on the second molten resin 40B in the second resin-flow-passage 23B with the first molten resin 40A. Therefore, the second molten resin 40B in the second resin-flow-passage 23B flows back toward the second injection cylinder 10B. As a result, part of the first molten resin 40A in the first resin-flow-passage 23A flows into the second resin-flow-passage 23B. As explained already, the ball 34 is moved from the diameter-enlarged portion 33 of the cylindrical tube portion 31 to the upstream end portion of the hollow portion 32 by the back flow of the second molten resin 40B. The volume of the second molten resin 40B which flows back is constant. The amount of the first molten resin 40A which flows into the second resin-flow-passage 23B from the first resin-flow-passage 23A is therefore a constant amount. That part of the first molten resin which flows into the second resin-flow-passage 23B is indicated by reference numeral 40a and shown by blank squares. A crudely-mixed-state resin portion which is a mixture of the first molten resin 40A which flows into the second resin-flow-passage 23B with second molten resin 40B which is left in the second resin-flow-passage 23B is expressed by black squares. The crudely-mixed-state resin portion 40b is formed, for example, as follows. The first molten resin which flows into the second resin-flow-passage 23B washes the internal surface of the second resin-flow-passage 23B and the surface of the gate cut pin 26 with moving the second molten resin 40B back, and in this process, the flow of the first molten resin is disrupted. As a result, the first molten resin comes into a state where it is crudely mixed with the second molten resin 40B to form the crudely-mixed-state resin portion 40b. Under some injection conditions, in this step there occurs no phenomenon that part of the first molten resin 40A in the first resin-flow-passage 23A flows into the second resin-flow-passage 23B, but during e subsequent application of a dwell pressure, there occurs a phenomenon that part of the first molten resin 40A in the first resin-flow-passage 23A flows into the second resin-flow-passage 23B. Further, the flowing of part of the first molten resin 40A in the first resin-flow-passage 23A into the second resin-flow-passage 23B comes to an end during the injection of the first molten resin 40A or during the application of a dwell pressure, which differs depending upon injection conditions.

[Step-130]

After completion of the injection of the first molten resin 40A, a dwell pressure is applied with the first injection cylinder 10A. Then, the gate cut pin 26 is moved forward to close the gate portion 24 therewith. Then, the resin in the cavity 25 is cooled, the mold is then opened, and a parison as a multi-layered article is taken out.

Figure 1:
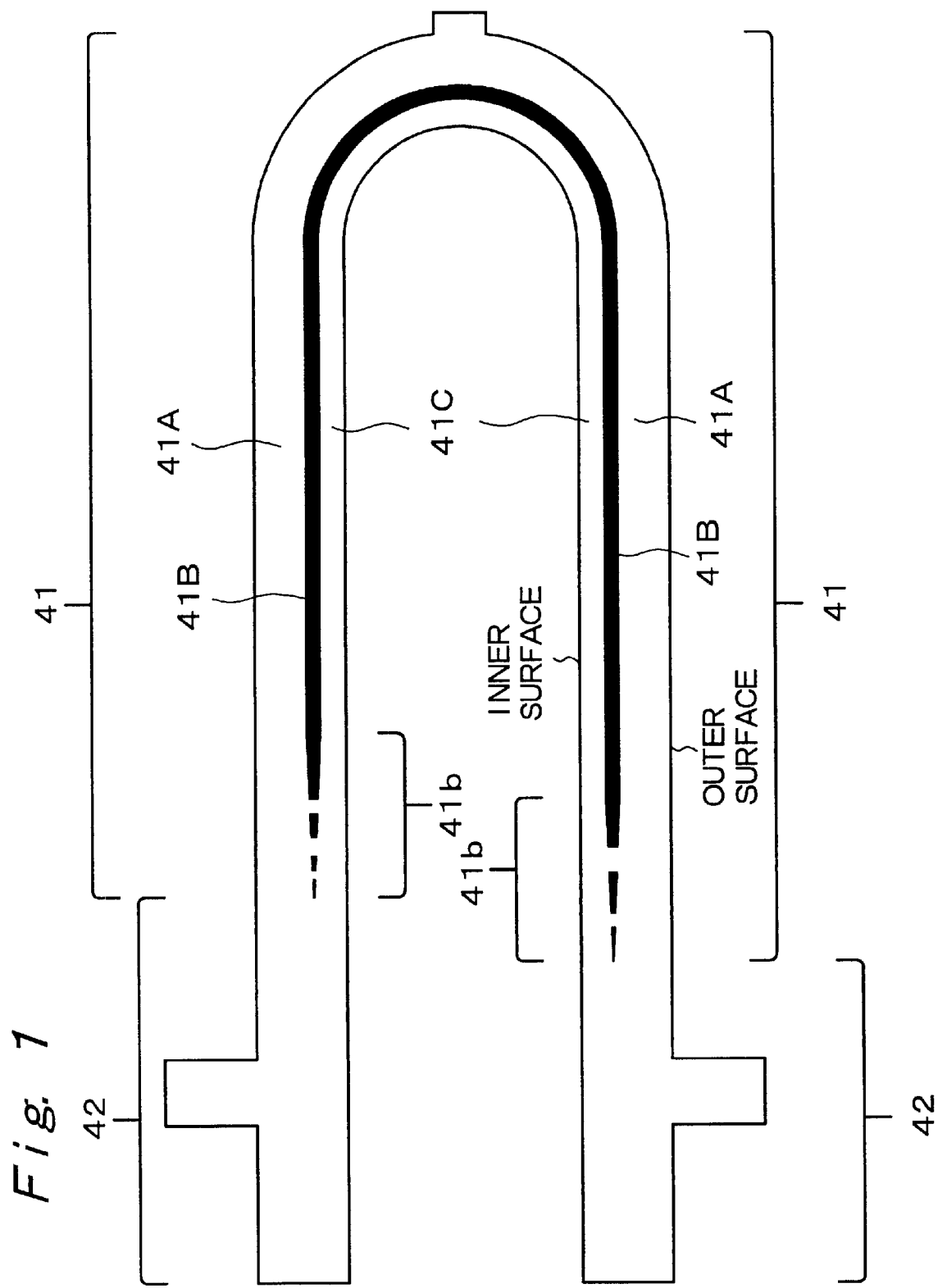
FIG. 1 is a schematic cross-sectional view of a parison which is a multi-layered article according to the first aspect of the present invention, including the second aspect of the present invention.
Figure 2:
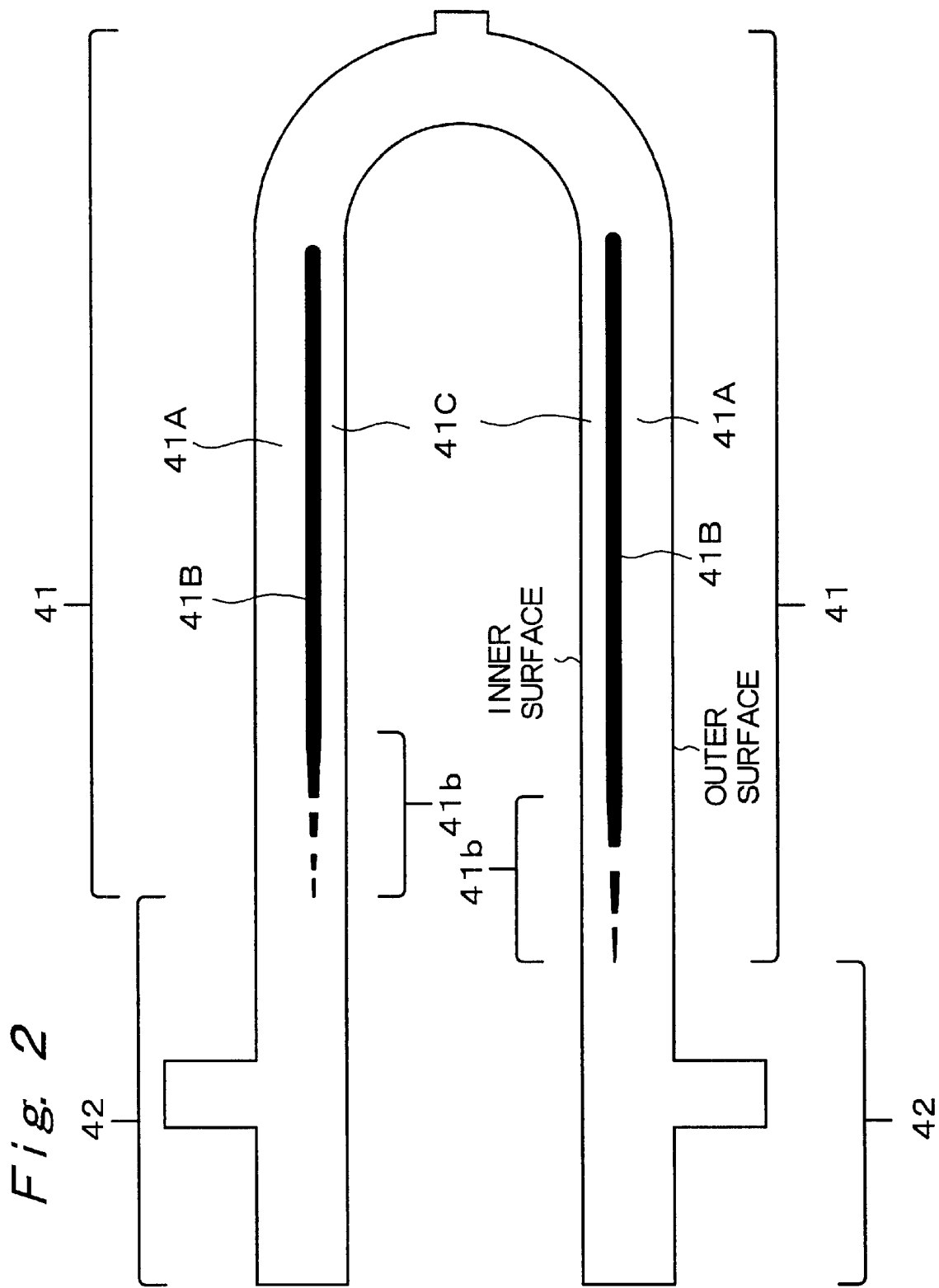
FIG. 2 is a schematic cross-sectional view of a variant of the parison which is a multi-layered article according to the first aspect of the present invention, including the second aspect of the present invention.
Figure 3:
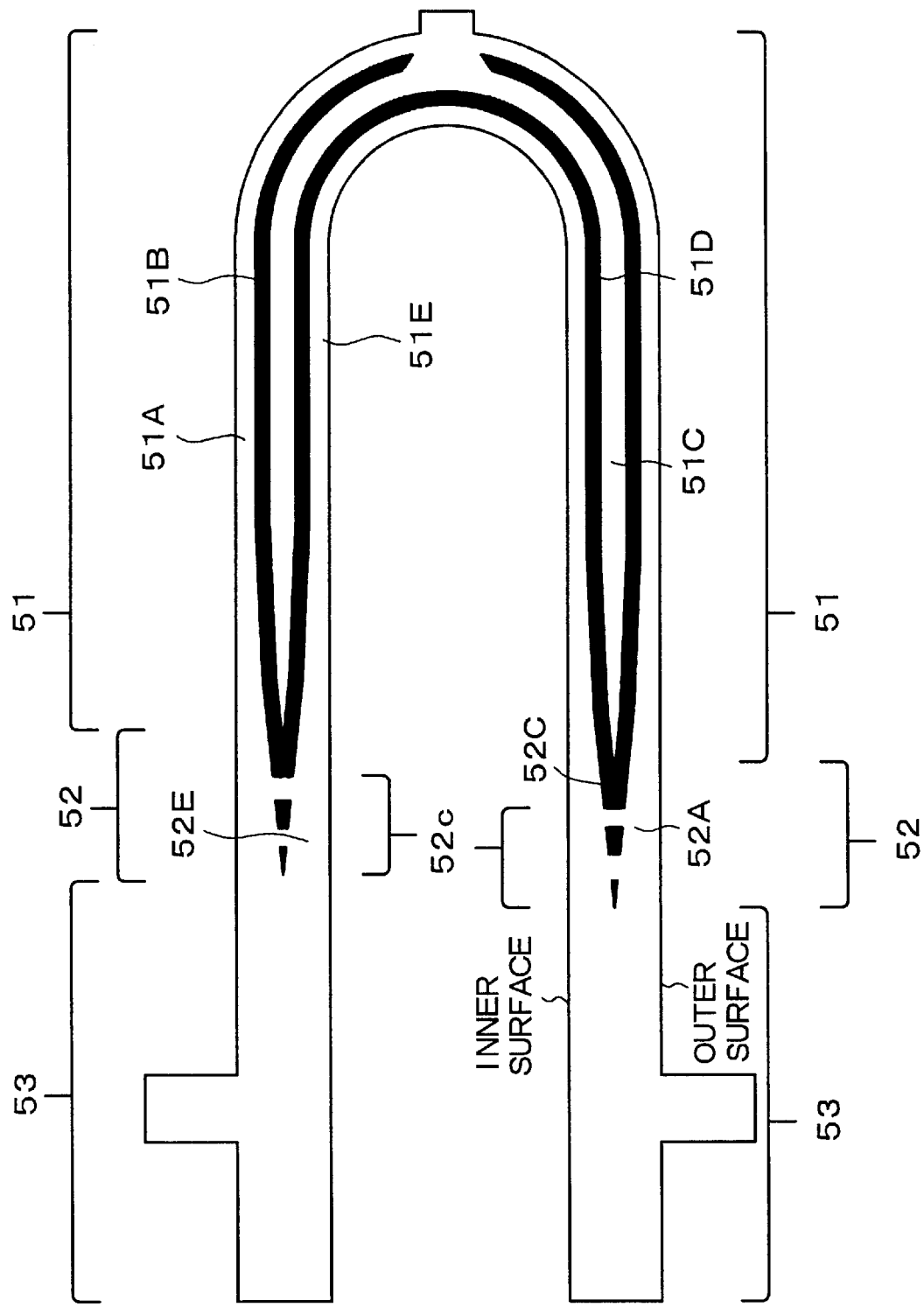
FIG. 3 is a schematic cross-sectional view of a parison which is a multi-layered article according to the third aspect of the present invention, including the fourth aspect of the present invention.

In the above-obtained multi-layered article according to the third aspect of the present invention, including the fourth aspect of the present invention, the first portion 51 is constituted mainly of consecutively laminated resin layers of the first resin layer 51A formed of the first resin 40A, the second resin layer 51B formed of the second resin 40B, the third resin layer 51C formed of the first resin 40A, the fourth resin layer 51D formed of the second resin 40B and the fifth resin layer 51E formed of the first resin 40A, as FIG. 3 shows a schematic cross-sectional view. Further, the second portion 52 is constituted mainly of the first-resin-layer extension portion 52A extending from the first resin layer 51A constituting the first portion, the fifth-resin-layer extension layer 52E extending from the fifth resin layer 51E constituting the first portion, and the second-resin-layer/fourth-resin-layer extension layer 52C extending from the second resin layer 51B and the fourth resin layer 51D which constitute the first portion 51. Further, the third portion 53 is constituted of resin layers extending from the first-resin-layer extension layer 52A and the fifth-resin-layer extension layer 52E which constitute the second portion 52. The second-resin-layer/fourth-resin-layer extension layer 52C is substantially a layer in which an extension portion from the second resin layer 51B and an extension portion from the fourth resin layer 51D are integrated. Further, the third portion 53 is substantially a layer in which an extension portion from the first-resin-layer extension layer 52A and an extension portion from the fifth-resin-layer extension layer 52E are integrated. Schematic cross-sectional views of a parison are shown in FIGS. 1 to 4, 24 and 25, but are simplified without slanting lines.

In the first portion, the first resin layer 51A and the first-resin-layer extension layer 52A constitute the outer surface layer of the multi-layered article, and the fifth resin layer 51E and the fifth-resin-layer extension layer 52E constitute the inner surface layer of the multi-layered article which inner surface layer is opposed to the outer surface layer. The second resin layer 51B is encapsulated, sealed or blocked with the first resin layer 51A and the third resin layer 51C, and the fourth resin layer 51D is encapsulated, sealed or blocked with the fifth resin layer 51E and the third resin layer 51C. In the second portion, the second-resin-layer/fourth-resin-layer extension layer 52C is encapsulated, sealed or blocked with the first-resin-layer extension layer 52A and the fifth-resin-layer extension layer 52E.

Furthermore, in a second portion region 52c in the vicinity of the third portion 53, the thickness of the second-resin-layer/fourth-resin-layer extension layer 52C decreases toward the third portion 53, and the second-resin-layer/fourth-resin-layer extension layer 52C is discontinuously present. That is, the second portion region 52c is formed of the second resin 40B and the first resin 40A, which are in a crudely mixed state, and the second portion region 52c is constituted of a portion the second resin 40B occupies and the balanced portion the first resin 40A occupies.

Meanwhile, the crudely-mixed-state resin portion 40b injected into the cavity 25 moves forward inside the previously injected first molten resin 40A, and a thin layer (not shown) formed of the crudely-mixed-state resin portion 40b is left between the first resin layer 51A constituting the first portion 51 and the second resin layer 51B to be finally formed, and is also left between the five resin layer 51A constituting the first portion 51 and the fourth resin layer 51D to be finally formed. Further, it is left between the first-resin-layer extension layer 52A constituting the second portion 52 and the second-resin-layer/fourth-resin-layer extension layer 52C to be finally formed, and is also left between the fifth-resin-layer extension layer 52E constituting the second portion 52 and the second-resin-layer/fourth-resin-layer extension layer 52C to be finally formed. The above thin layer is a crudely-mixed-state layer of the first molten resin 40A and the second molten resin 40B and therefore works as a layer to improve adhesion. As a result, improvements are made in the interlayer adhesion between the first resin layer 51A and the second resin layer 51B, the interlayer adhesion between the fifth resin layer 51E and the fourth resin layer 51D, the interlayer adhesion between the first-resin-layer extension layer 52A and the second-resin-layer/fourth-resin-layer extension layer 52C, and the interlayer adhesion between the fifth-resin-layer extension layer 52E and the second-resin-layer/fourth-resin-layer extension layer 52C.

In [Step-110], generally, the first molten resin 40a which has flowed into and has been left in the second resin-flow-passage 23B in a previous molding cycle, the crudely-mixed-state resin portion 40b and the second molten resin 40B which has been melted in the , second injection cylinder 10B are consecutively injected into the cavity 25. Therefore, a resin layer formed of the first molten resin 40a which has flowed into and has been left in the second resin-flow-passage 23B in a previous molding cycle is substantially integrated with the third portion 53. Further, the second portion region 52c is formed from the crudely-mixed-state resin portion 40b. Further, the second-resin-layer/fourth-resin-layer extension layer portion which is away from the third portion 53, and the second resin layer 51B and the fourth resin layer 51D, are formed from the second molten resin 40B melted in the second injection cylinder 10B. If the amount of the molten resin 40a left in the second resin-flow-passage 23B is increased, the thickness of the layer (formed of the first resin) which is part of the multi-layered article opposed to the gate portion 24 and is in the vicinity of the inner surface layer can be increased. As a result, the fourth resin layer 51D formed of the second resin 40B can be positioned on the outer surface layer side of the multi-layered article, that is, it can be positioned far from a content such as a beverage in the multi-layered article such as a multi-layered bottle, so that humidity to which the fourth resin layer 51D is exposed decreases, whereby the multi-layered article can be more improved in gas-barrier properties.

Figure 5A:
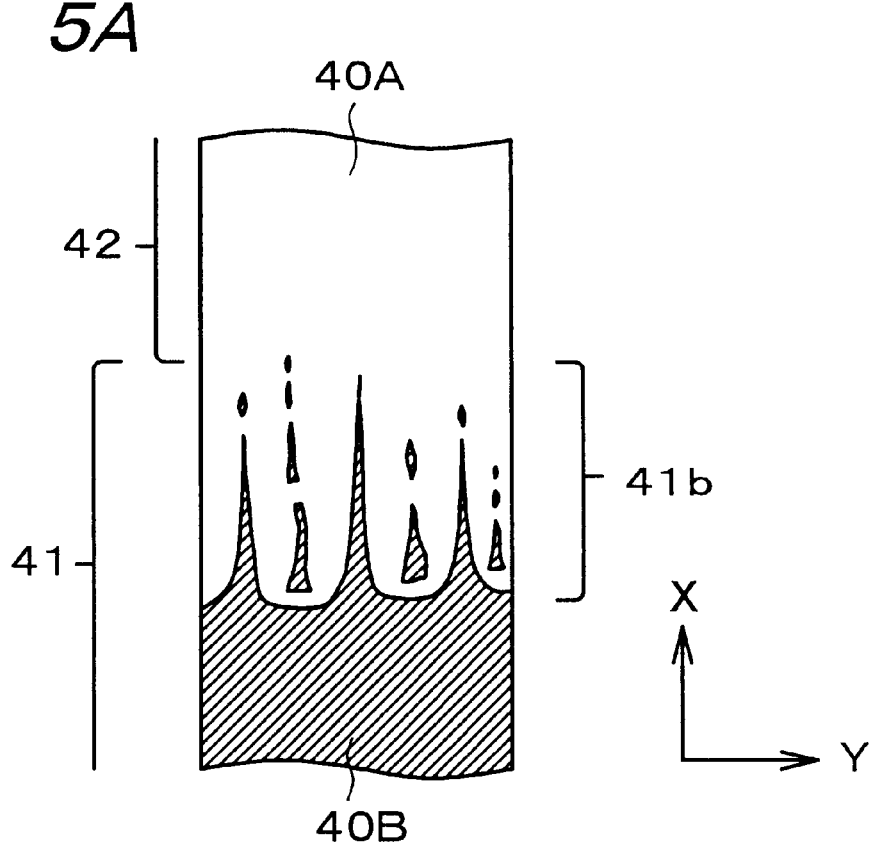
FIGS. 5A and 5B are development views schematically showing the states of a first portion region and the state of a second portion region, respectively.
Figure 5B:
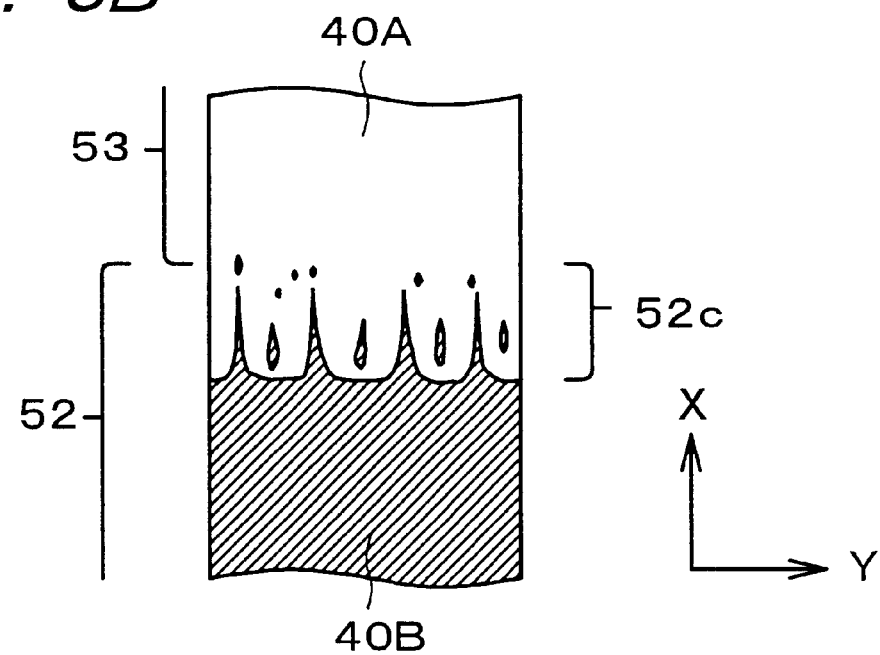

In the multi-layered article shown in FIG. 3, in the second portion region 52c, the second-resin-layer/fourth-resin-layer extension layer 52C is discontinuously present along the direction toward the third portion 53 depending upon some injection molding conditions. Specifically, in the second portion region 52c, the second resin is dispersed like islands along the direction toward the third portion 53. Otherwise, in the second portion region 52c, the second-resin-layer/fourth-resin-layer extension layer 52C is discontinuously present along the direction which is at right angles with the direction toward the third portion 53 and is at right angles with the thickness direction of the multi-layered article, depending upon some injection molding conditions. Specifically, in the second portion region 52c, the second resin extends in an acicular state along the direction (X direction) toward the third portion 53. Otherwise, in the second portion region 52c, the second-resin-layer/fourth-resin-layer extension portion 52C is discontinuously present along the direction (X direction) toward the third portion 53 and along the direction (Y direction) which is at right angles with the direction (X direction) toward the third portion 53 and is at right angles with the thickness direction of the multi-layered article, depending upon some injection molding conditions. Specifically, as shown in the schematic development view of FIG. 5B, in the second portion region 52c, the second resin is dispersed like islands along the direction (X direction) toward the third portion 53 and extends in an acicular state along the direction (X direction) toward the third portion 53. FIG. 5A and FIG. 5B show schematic views prepared by developing the multi-layered article along the direction (Y direction) which is at right angles with the direction (X direction) toward the second portion 41 of the multi-layered article shown in FIG. 1 or the third portion 52 of the multi-layered article shown in FIG. 3 and which is at right angles with the thickness direction of the multi-layered article. It is shown that the number of the second resin being dispersed like islands or extending in an acicular state in FIG. 5A is greater than the counterpart in FIG. 5B.

Part of the first portion (part opposed to the gate portion 24) has a three layer structure which is constituted of the first resin layer 51A, the third resin layer 51C and the fifth resin layer 51E (shown by one layer in FIG. 3) which are formed of the first resin 40A, and the fourth resin layer 51D formed of the second resin 40B.

Figure 4:
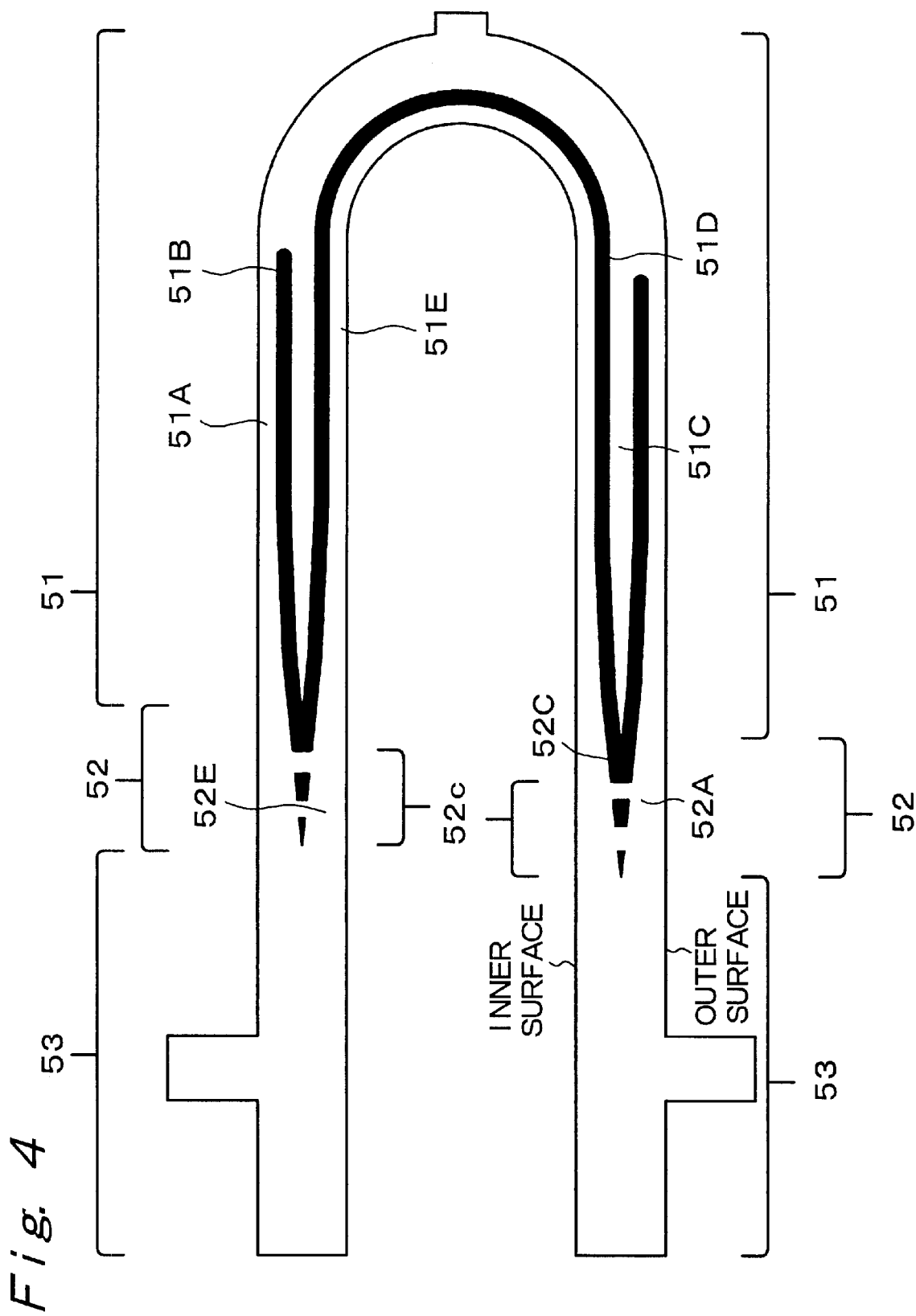
FIG. 4 is a schematic cross-sectional view of a variant of the parison which is a multi-layered article according to the third aspect of the present invention, including the fourth aspect of the present invention.

A parison whose first portion 51 (side surface of the parison) has a five-layer/three-layer structure as shown in FIG. 4 can be produced depending upon some injection conditions.

Figure 21:
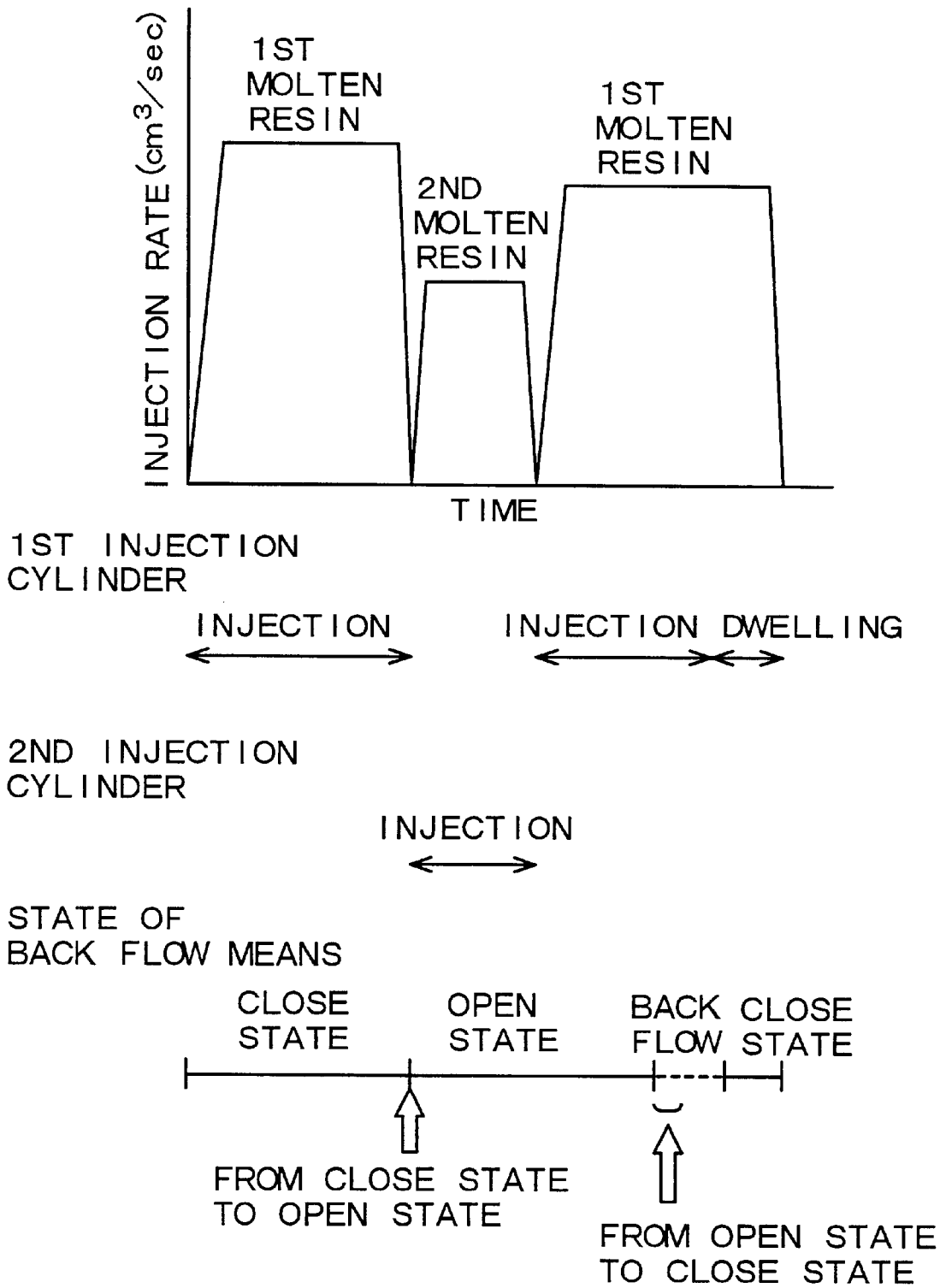
FIG. 21 is a graph showing changes of an injection rate, etc., with the elapse of time in the method of injection molding the multi-layered article according to the fourth aspect of the present invention.
Figure 22:
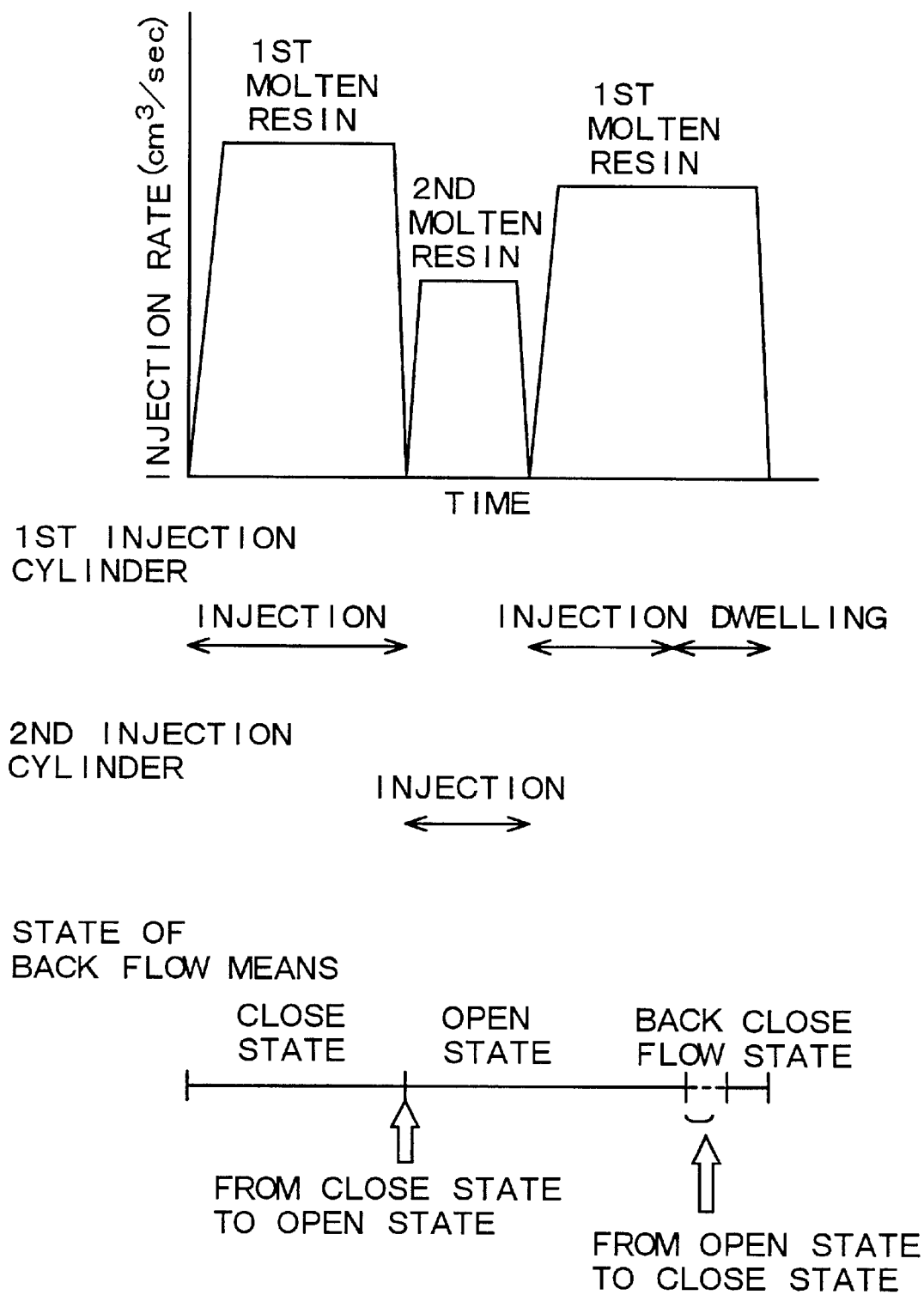
FIG. 22 is a graph showing changes of an injection rate, etc., with the elapse of time in the method of injection molding the multi-layered article according to the fourth aspect of the present invention.
Figure 23A:
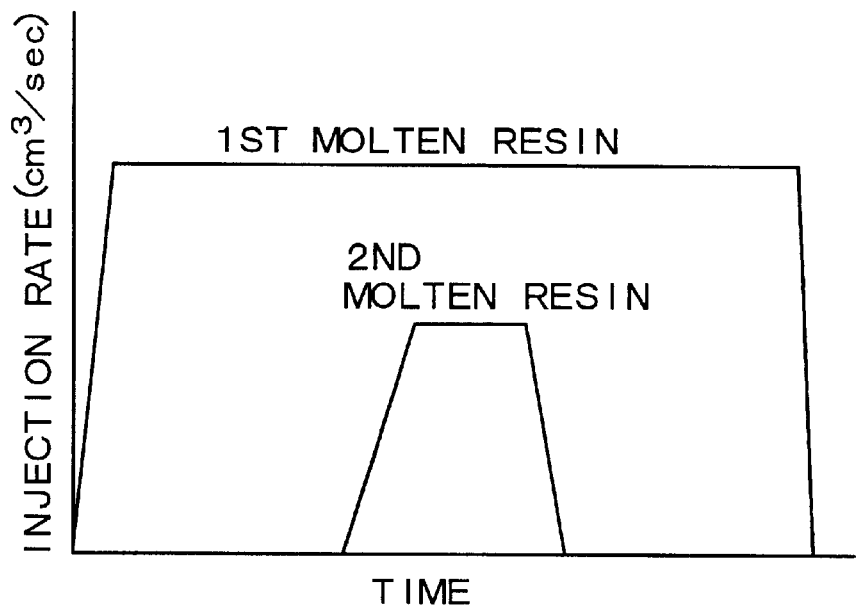
FIGS. 23A and 23B are graphs which schematically show the injection rates of the molten resins.
Figure 23B:
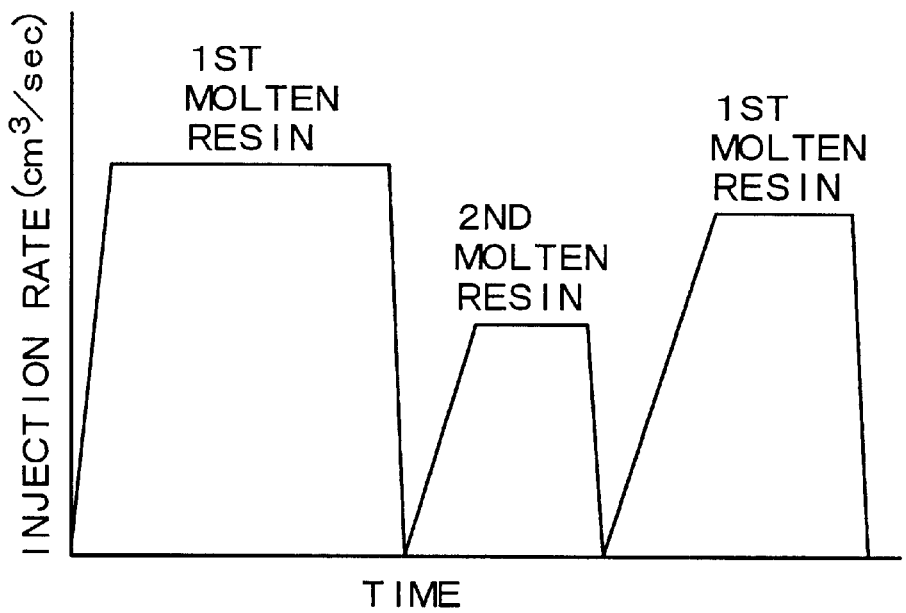

As FIGS. 20, 21 and 22 show changes of injection rates, etc., with the lapse of time in the alternate-injection molding method, it depends upon injection molding conditions whether the phenomenon of flowing of part of the first molten resin 40A in the first resin-flow-passage 23A into the second resin-flow-passage 23B takes place during the injection of the first molten resin 40A (see FIGS. 20 and 21) or after the injection is completed (see FIG. 22). When the first molten resin 40A in the first resin-flow-passage 23A flows into the second resin-flow-passage 23B on the basis of operation of the back flow means after completion of injection of the first molten resin 40A, specifically, a dwell pressure is applied by means of the first injection cylinder 10A and the back flow means is operated to allow the first molten resin 40A in the first resin-flow-passage 23A to flow into the second resin-flow-passage 23B after completion of injection of the first molten resin 40A (see FIG. 22). When the first molten resin 40A in the first resin-flow-passage 23A begins to flow into the second resin-flow-passage 23B on the basis of operation of the back flow means during the injection of the first molten resin 40A, the flowing of the first molten resin 40A into the second resin-flow-passage 23B may be completed during the injection of the first molten resin 40A (see FIG. 20), concurrently with the completion of injection of the first molten resin 40A or during the application of a dwell pressure after completion of injection of the first molten resin 40A (see FIG. 21).

Further, when an injection is carried out on the basis of the simultaneous-injection molding method, which is the method of injection molding the multi-layered article according to the first aspect including the second aspect of the present invention, a certain amount of the second molten resin 40B is injected into the cavity 25 while the injection of the first molten resin 40A into the cavity 25 is continued in [Step-110]. As a result, there is obtained a multi-layered article (parison) as FIG. 1 schematically shows the cross-sectional view of the parison.

That is, the first portion 41 is constituted mainly of consecutively laminated resin layers of the first resin layer 41A formed of the first resin 40A, the second resin layer 41B formed mainly of the second resin 40B and the third resin layer 41C formed of the first resin 40A. Further, the second portion 42 is constituted of resin layers extending from the first resin layer 41A and the third resin layer 41C which constitute the first portion 41. The first resin layer 41A constitutes the outer surface layer of the multi-layered article and the third resin layer 41C constitutes the inner surface layer of the multi-layered article which inner surface layer is opposed to the outer surface layer. Further, the second resin layer 41B is encapsulated, sealed or blocked with the first resin layer 41A and the third resin layer 41C.

In the first portion region 41b in the vicinity of the second portion 42, the thickness of the second resin layer 41B decreases toward the second portion 42, and the second resin layer 41B is discontinuously present. That is, the first portion region 41b is formed of the second resin 40B and the first resin 40A, which are in a crudely mixed state, and the first portion region 41b is constituted of a portion the second resin 40B occupies and the balanced portion the first resin 40A occupies.

In a step similar to [Step-110], the first molten resin 40a which has flowed into and has been left in the second resin-flow-passage 23B in a previous molding cycle, a crudely-mixed-state resin portion 40b and the second molten resin 40B melted in the second injection cylinder 10B are consecutively injected into the cavity 25. The resin layer formed from the first molten resin 40a which has flowed into and has been left in the second resin-flow-passage 23B in a previous molding cycle is therefore substantially integrated with the second portion 42. Further, the first portion region 41b is formed from the crudely-mixed-state resin portion 40b. The crudely-mixed-state resin portion 40b to be injected into the cavity 25 is injected into the cavity 25 together with the first molten resin 40A, so that the amount of the crudely-mixed-state resin occupying the first portion region 41b is larger than the amount of the crudely-mixed-state resin occupying the second portion region 52c of the multi-layered article according to the third aspect of the present invention including the fourth aspect of the present invention. Further, the second resin layer portion away from the second portion 42 is formed from the second molten resin 40B melted in the second injection cylinder 10B.

In the multi-layered article shown in FIG. 1, the second resin layer 41B is discontinuously present in the first portion region 41b along the direction toward the second portion 42 depending upon some injection molding conditions. Specifically, in the first portion region 41b, the second resin is dispersed like islands along the direction toward the second portion 42.

Otherwise, in the first portion region 41b, the second resin layer 41B is discontinuously present along the direction which is at right angles with the direction toward the second portion 42 and is at right angles with the thickness direction of the multi-layered article, depending upon some injection molding conditions. Specifically, in the first portion region 41b, the second resin extends in an acicular state. Otherwise, in the first portion region 41b, the second resin layer 41B is discontinuously present along the direction (X direction) toward the second portion 42 and along the direction (Y direction) which is at right angles with the direction (X direction) toward the second portion 42 and is at right angles with the thickness direction of the multi-layered article, depending upon some injection molding conditions. Specifically, as shown in the schematic development of FIG. 5A, in the first portion region 41b, the second resin is dispersed like islands along the direction (X direction) toward the second portion 42, and extends in an acicular state along the direction (X direction) toward the second portion 42.

In some cases, as FIG. 2 shows the schematic cross-sectional view of a parison, there can be obtained a structure in which part of the fist portion (main portion of side surface of the parison) of the multi-layered article has a three-layer structure of the first resin layer 41A/the second resin layer 41B/the first resin layer 41C and the first portion 41 opposed to the gate portion 24 has a two-layer structure of the first resin layer 41A and the first resin layer 41C. In FIG. 2, the two-layer structure of the first resin layer 41A and the first resin layer 41C is shown as one layer.

Figure 19:
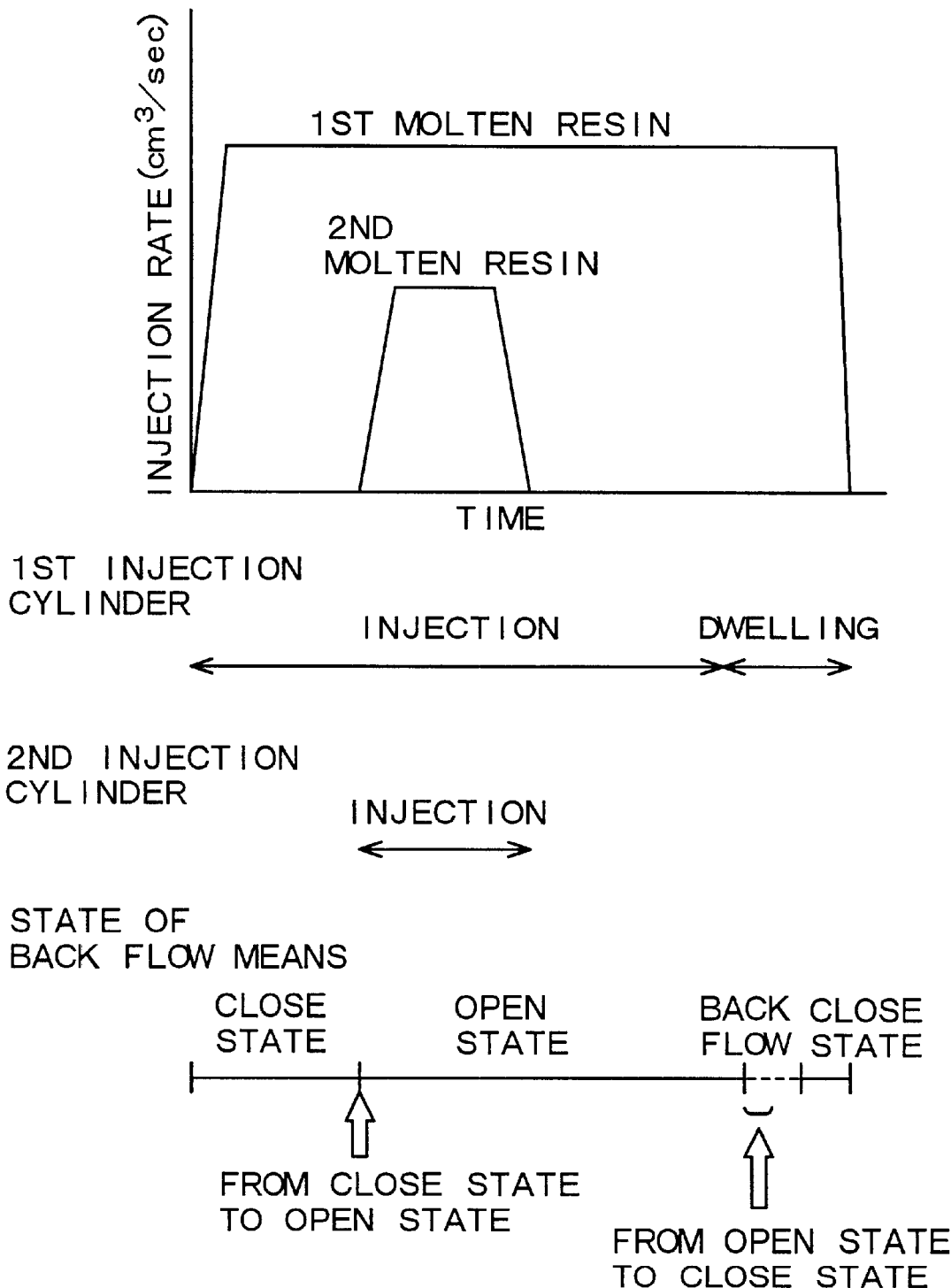
FIG. 19 is a graph showing changes of an injection rate, etc., with the elapse of time in the method of injection molding the multi-layered article according to the second aspect of the present invention.

As FIGS. 17, 18 and 19 show changes of injection rates, etc., with the lapse of time, after completion of injection of the second molten resin 40B, and during, or after completion of, the injection of the first molten resin 40A, the first molten resin 40A in the first resin-flow-passage 23A flows into the second resin-flow-passage 23B on the basis of operation of the back flow means. It depends upon injection molding conditions whether the phenomenon of flowing of part of the first molten resin 40A in the first resin-flow-passage 23A into the second resin-flow-passage 23B takes place during the injection of the first molten resin 40A (see FIGS. 17 and 18) or after the injection is completed (see FIG. 19). When the first molten resin 40A in the first resin-flow-passage 23A flows into the second resin-flow-passage 23B on the basis of operation of the back flow means after completion of injection of the first molten resin 40A, specifically, a dwell pressure is applied by means of the first injection cylinder 10A and the back flow means is operated to allow the first molten resin 40A in the first resin-flow-passage 23A to flow into the second resin-flow-passage 23B after completion of injection of the first molten resin 40A (see FIG. 19). When the first molten resin 40A in the first resin-flow-passage 23A begins to flow into the second resin-flow-passage 23B on the basis of operation of the back flow means during the injection of the first molten resin 40A, the flowing of the first molten resin 40A into the second resin-flow-passage 23B may be completed during the injection of the first molten resin 40A (see FIG. 17), concurrently with completion of injection of the first molten resin 40A or during the application of a dwell pressure after completion of injection of the first molten resin 40A (see FIG. 18).

The volume of the first molten resin 40A which flows into the second resin-flow-passage 23B (the volume of the inflow first molten resin ), that is, the total volume of the first molten resin 40a which is left in the second resin-flow-passage 23B and the first molten resin 40A which constitutes the crudely-mixed-state resin portion 40b, is preferably 5 to 50% based on the volume of the cavity 25. The crudely-mixed-state resin portion 40b and the first molten resin 40a which has flowed into the second resin-flow-passage 23B are injected into the cavity 25 together with the second molten resin 40B when the second molten resin 40B is injected. As far as the volume of the inflow first molten resin does not exceed 50% of the volume of the, cavity 25, therefore, the first molten resin 40a and the crudely-mixed-state resin portion 40b which are injected into the cavity together with the second molten resin 40B causes no detrimental effect on properties of the multi-layered article. Further, as far as the volume of the inflow first molten resin does not exceed 25% of the volume of the cavity 25, the occurrence of a turbulence in the resin layers composing the layers of the multi-layered article can be reliably prevented. When the volume of the inflow first molten resin exceeds 25%, and does not exceed 50%, of the volume of the cavity 25, a turbulence may occur in the resin layers composing the layers of the multi-layered article to some extent in some cases, while it is not the turbulence which causes a problem in practical use.

When the volume of the inflow first molten resin exceeds 50% of the volume of the cavity 25, there are some cases in which a turbulence may occur in the resin layers composing the layers of the multi-layered article and causes a problem in practical use.

On the other hand, when the volume of the inflow first molten resin is less than 5 % based on the volume of the cavity 25, for example, the crudely-mixed-state resin portion 40b and the first molten resin 40a which has flowed into and remained in the second resin-flow-passage 23B during the previous molding cycle and further, the second molten resin 40B in the second resin-flow-passage 23B may be taken into the first molten resin 40A being injected into the cavity 25 when the first molten resin 40A is injected into the cavity 25, and the second molten resin 40B also flows into the cavity 25 or is accompanied by the first molten resin 40A into the cavity 25. As a result, the first molten resin 40A and the second molten resin 40B are mixed in the cavity 25, and in some cases there is a problem that the second resin 40B comes to exist on the outermost layer of a multi-layered article.

As explained already, a phenomenon that the first molten resin 40A in the first resin-flow-passage 23A flows into the second resin-flow-passage 23B does not take place constantly, while it takes place when the molten resin filling ratio in the cavity 25 exceeds, e.g., 70%. In [Step-100], as far as the molten resin filling ratio in the cavity 25 does not exceed, e.g., 70% of the volume of the cavity 25, and when the first molten resin 40A is injected into the cavity 25, a pressure heading for the second injection cylinder 10B, caused by the injection of the first molten resin 40A, is hardly exerted on second molten resin 40B in the second resin-flow-passage 23B, and in no case, the first molten resin 40A flows into the second resin-flow-passage 23B. In [Step-110], similarly, as far as the second molten resin 40B is injected into the cavity 25 through the second-flow-passage 23B and the gate portion 24 such that the molten resin filling ratio in the cavity 25 does not exceed, e.g., 70%, a pressure heading for the first injection cylinder 10A, caused by the injection of the second molten resin 40B, is hardly exerted on the first molten resin 40A in the first resin-flow-passage 23A when the second molten resin 40B is injected into the cavity 25. Therefore, the first molten resin 40A in the first resin-flow-passage 23A does not flow back toward the first injection cylinder 10A. It is not necessary to provide a valve for preventing back flow into the nozzle portion 12A of the first injection cylinder 10A or between the nozzle portion 12A and the mold 20, while such a valve may be provided in the nozzle portion 12A of the first injection cylinder 10A or between the nozzle portion 12A and the mold 20. The above valve may have the same structure as that of the ball-type back flow control valve 30B or the sliding valve-type back flow control valve 60, or it may be a conventional ball check valve which prevent back flow of a molten resin.

The injection molding apparatus having two injection cylinders and having two resin-flow-passages connecting the insides of the two injection cylinders to the cavity is explained as an example, while the number of injection cylinders may be three or more. In this case, resin-flow-passages of the same number as that of the injection cylinders can be provided. And, between [Step-110] and [Step-120], third, fourth, . . . molten resins prepared in the third, the fourth, . . . injection cylinders can be injected into the cavity 25. In this case, one resin-flow-passage corresponds to the first resin-flow-passage, and the remaining resin-flow-passages correspond to the second resin-flow-passage. The volume of the first molten resin which flows into each of the second resin-flow-passages is 5 to 50%, preferably 5 to 35%, more preferably 5 to 25%, based on the volume of the cavity. Further, the number of cavities provided in the mold shall not be limited to one, and any number of cavities can be provided. When a plurality of cavities are provided, it is sufficient to divide each of the first resin-flow-passage and the second resin-flow-passage into branches of the same number as that of the cavities and connect resin-flow-passage branches to gate portions opened to the cavities. In this case, it is preferred in the injection molding apparatus to divide the resin-flow-passages downstream to the back flow means. The volume of the first molten resin which flows into each of the second resin-flow-passages is 5 to 50%, preferably 5 to 35%, more preferably 5 to 25%, based on the volume of the cavity.

The example employs a structure in which the gate cut pin 26 is provided in the second resin-flow-passage 23B, while the gate cut pin may be omitted when the structure of the gate portion and the temperature of molten resin in the gate portion are properly set.

In the example, resins are plasticized, melted and metered in the injection cylinders, and molten resins are injected from the injection cylinders, while there may be employed a pot type molding apparatus (also called a shooting pot type or heating pot type). In the pot type molding apparatus, a resin is plasticized, melted and metered in a cylinder, and a molten resin is filled in an injection pot. A check valve is provided between the cylinder and the injection pot. The molten resin filled in the injection pot is pressurized with the injection cylinder, and the molten resin is injected into a cavity through a resin-flow-passage and a gate portion. In the above pot type molding apparatus, the back flow means can be provided in a second resin-flow-passage connecting the injection pot and the cavity.

The present invention will be explained more in detail with reference to Examples 1 and 2 and Comparative Examples 1 and 2, hereinafter. The following Table 1 shows temperature conditions in these Examples and Comparative Examples. Further, these Examples and Comparative Examples used the injection molding apparatus of shown in FIG. 6.

TABLE 1

| | |
|---|---|
| Temperature of first molten resin 40A in injection cylinder 10A: | 270° C. |
| Temperature of second molten resin 40B in injection cylinder 10B: | 260° C. |
| Temperatures in first and second resin-flow-passages in hot runner block: | 270° C. |
| Temperature of mold coolant in cavity block: | 15° C. |

A polyethylene terephthalate resin was measured for an intrinsic viscosity ($\eta$) in the presence of mixed solvents of phenol/tetrachloroethane=6/4 (weight ratio) at 30° C. A poly-m-xylyleneadipamide resin was measured for a relative viscosity ($\eta_{rel}$) under, conditions of resin 1 gram/96% sulfuric acid 100 ml at 25° C. Further, a sample having dimensions of 10 mm (width)×100 mm (length) was measured for an interlayer adhesion strength at a peel direction of 180 degrees at a peel rate of 200 mm/minute.

EXAMPLE 1

A polyethylene terephthalate resin having an intrinsic viscosity of 0.75 (PET resin, RT543C, supplied by Nippon Unipet K.K.) was used as a first resin 40A, and a poly-m-xylyleneadipamide resin having a relative viscosity of 2.7 (N-MXD6 resin, #6007, supplied by Mitsubishi Gas Chemical Co., Inc.) was used as a second resin 40B. PET resin, N-MXD6 resin and PET resin were injected according to the steps explained above, to mold a multi-layered article (parison) shown in FIG. 1, according to the first aspect including the second aspect of the present invention and according to a simultaneous-injection molding method. The parison had a length of 132 mm, a wall thickness of 4.4 mm and an outer diameter of 28 mm. A multi-layered bottle obtained from the above parison by a biaxial stretch blow molding method has dimensions of 310 mm in total length, 90 mm in outer diameter and 1500 ml in volume.

Part of each of the first resin-flow-passage 23A and the second resin-flow-passage 23B upstream to (on the injection cylinder side) the junction portion of the first and second resin-flow-passages 23A and 23B has a dual (double) tube structure, and these parts had a length of 120 mm. The first resin-flow-passage 23A on the outer side of the dual tube structure had an outer diameter of 18 mm and an inner diameter of 14 mm. The tubular second resin-flow-passage 23B on the inner side of the dual tube structure had a diameter of 8 mm. Further, the cylindrical gate cut pin 26 had an outer diameter of 4 mm.

An injection cylinder having an inner diameter of 50 mm was used as a first injection cylinder 10A, and the first resin 40A (PET resin) was plasticized and melted. An injection cylinder having an inner diameter of 40 mm was used as a second injection cylinder 10B, and the second resin 40B (N-MXD6 resin) was plasticized and melted. The ball-type back flow control valve 30B was used as back flow means. The mold 20 was provided with four cavities 25, each of the resin-flow-passages 23A and 23B was divided into branches downstream to the back flow control valve 30B, and branches were connected to the gate portions 24 opened to the cavities 25.

Before injection molding, the first molten resin 40A which flowed into the second resin-flow-passage 23B in a previous molding cycle (the total of the first molten resin 40a which was left in the second resin-flow-passage 23B and the first molten resin 40A which was to constitute the crudely-mixed-state resin portion 40b) was left in the second resin-flow-passage 23B in an amount equivalent to 10% of the volume of each cavity 25.

First, the first molten resin 40A (molten PET resin) was injected into each cavity 25 in an amount equivalent to 20% of the volume of each cavity 25. In this step, no first molten resin 40A flowed into the second resin-flow-passage 23B.

Then, while the injection of the first molten resin 40A (molten PET resin) into each cavity 25 was continued, the second molten resin 40B (molten N-MXD6 resin) was injected into each cavity 25 from the second injection cylinder 10B in an amount equivalent to 5% of the volume of each cavity 25. The crudely-mixed-state resin portion 40b and the first molten resin 40a which flowed into and was left in the second resin-flow-passage 23B in the previous molding cycle, were also injected into each cavity 25.

Then, the injection of the second molten resin 40B into each cavity 25 was terminated. And, the injection of the first molten resin 40A (molten PET resin) into each cavity 25 was continued, to completely fill each cavity 25 with the molten resin. The amount of the first molten resin 40A injected in this step was a total of an amount equivalent to 65% of the volume of each cavity 25 and an amount equivalent to an amount in which the second molten resin 40B in the second resin-flow-passage 23B flowed back. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 10% of the volume of each cavity 25 by the operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had the structure as shown in FIG. 1, and these resin layers were finely formed without any turbulence. Further, there was found no phenomenon that the N-MXD6 resin layer came to exist on the outermost layer (the inner surface and the outer surface) of the parison. When the obtained multi-layered parisons were heated at 100° C. and biaxially stretch blow molded into multi-layered bottles, each of the obtained multi-layered bottles had an excellent appearance. A test piece was taken from a portion including the first portion 41 and the second portion 42 of the multi-layered bottle and measured for an interlayer adhesion strength to show that the adhesion strength between the PET resin layer and the N-MXD6 resin layer was 40 gf/10 mm. Further, it was found that the thickness of the second resin layer 41B in the first portion region 41b in the vicinity of the second portion 42 decreased toward the second portion 42 and that the second resin layer 41B was discontinuously present. Specifically, it was found that, in the first portion region 41b, the second resin was dispersed like islands along the direction toward the second portion 42 and extended in an acicular state along the direction toward the second portion 42, as shown in FIG. 5A.

Figure 26:
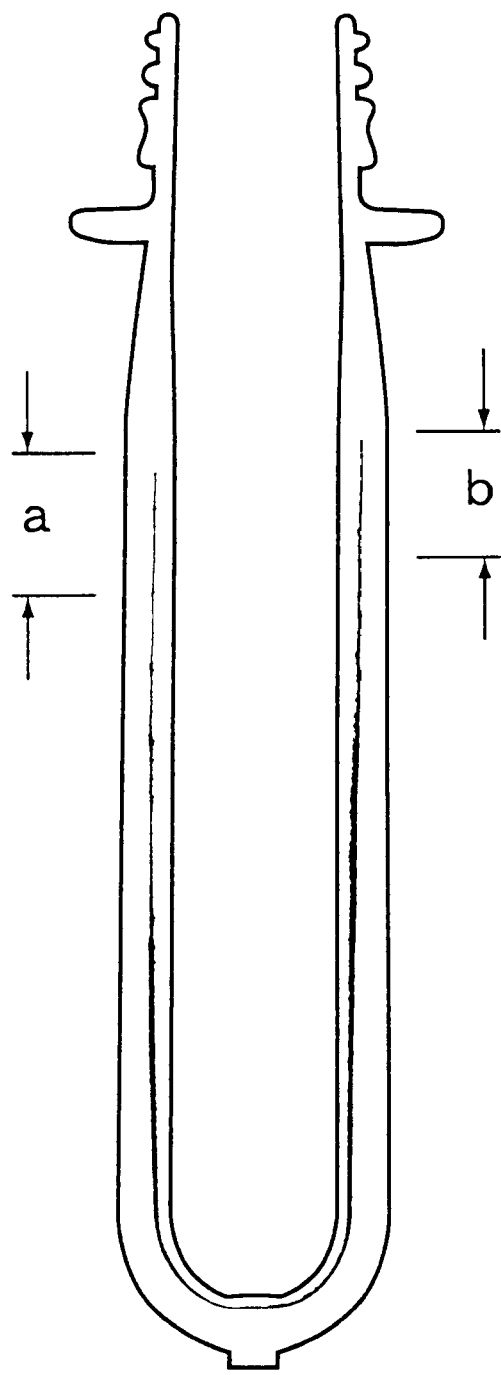
FIG. 26 is a view prepared by digitizing a photograph of cross section of a parison obtained in Example 1.
Figure 27:
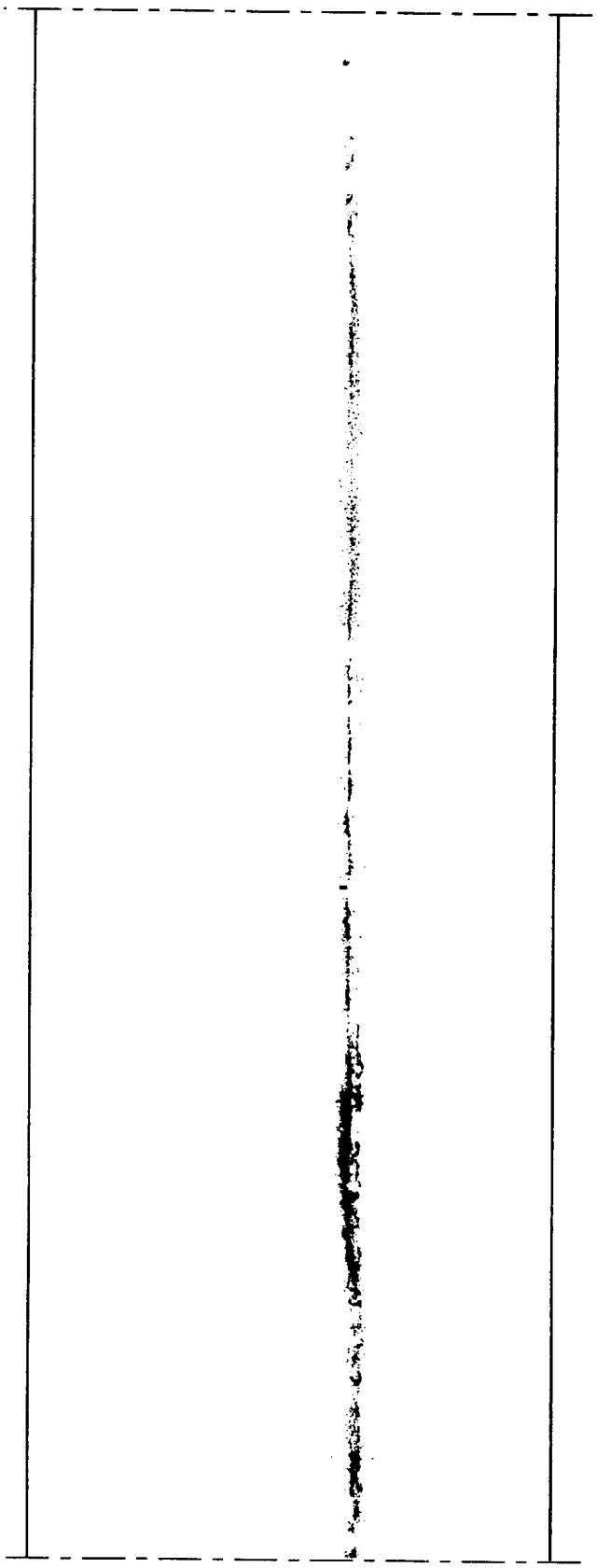
FIG. 27 is a view prepared by digitizing an enlarged photograph of one portion of cross section of the parison shown in FIG. 26.
Figure 28:
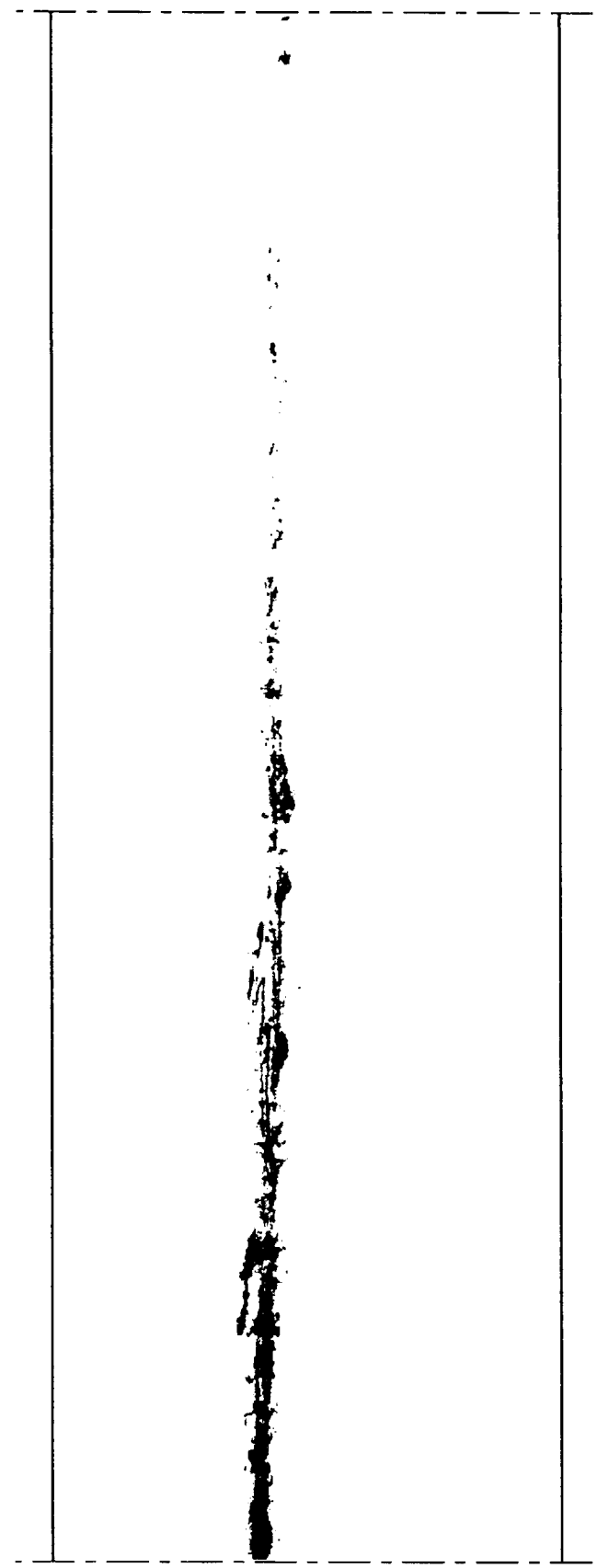
FIG. 28 is a view prepared by digitizing an enlarged photograph of other portion of cross section of the parison shown in FIG. 26.
Figure 29:
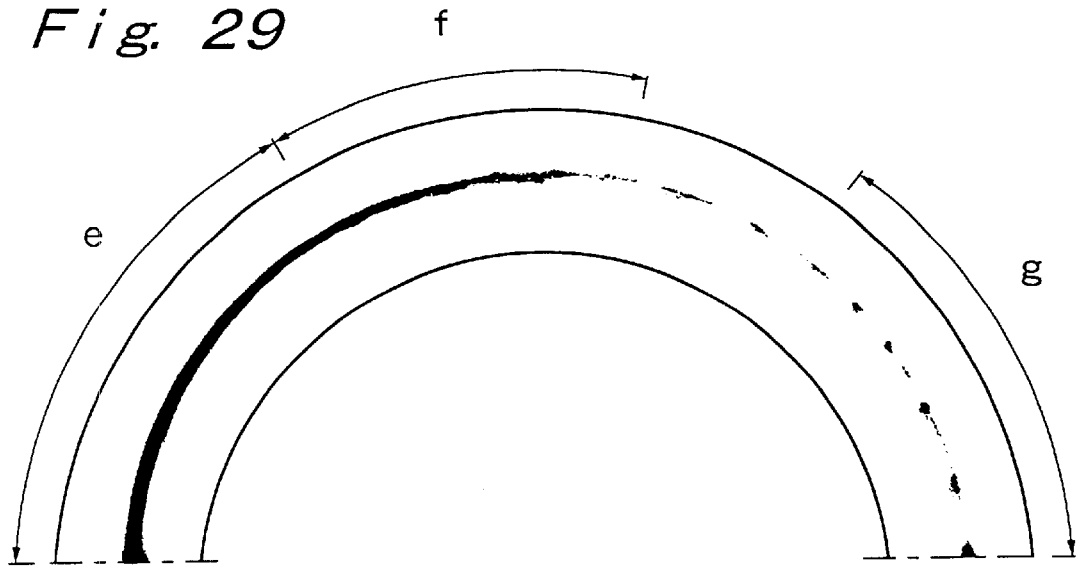
FIG. 29 is a view prepared by digitizing a photograph, taken from an angle different from that for FIG. 26, of cross section of a parison obtained in Example 1.
Figure 30:
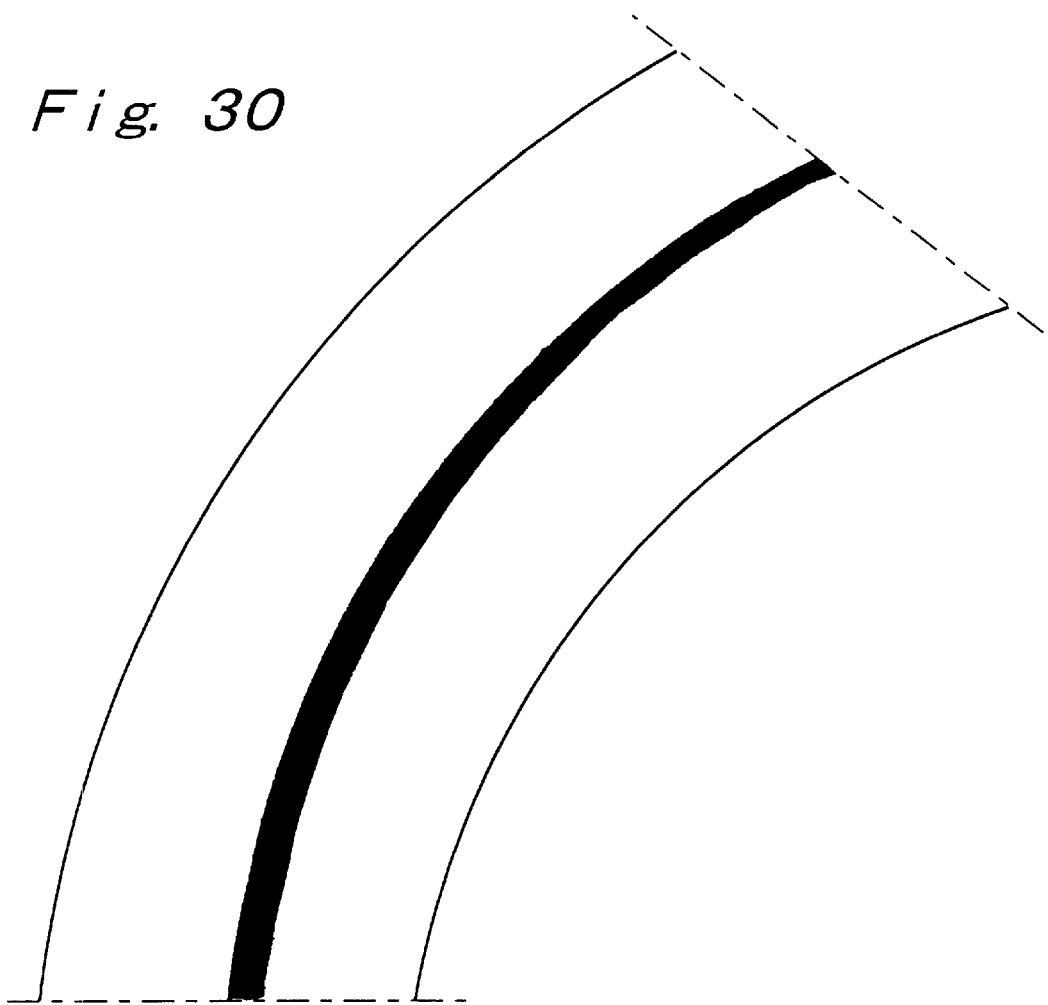
FIG. 30 is a view prepared by digitizing an enlarged photograph of one portion of cross section of the parison shown in FIG. 29.
Figure 31:
FIG. 31 is a view prepared by digitizing an enlarged photograph of another portion of cross section of the parison shown in FIG. 29.
Figure 32:
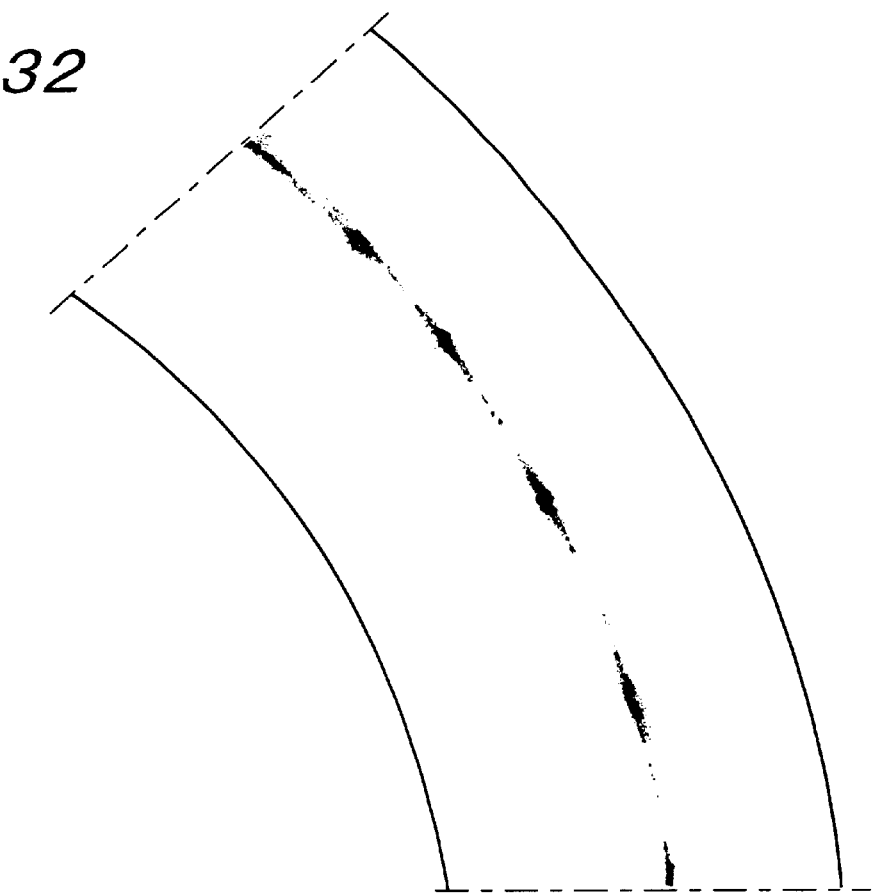
FIG. 32 is a view prepared by digitizing an enlarged photograph of further another portion of cross section of the parison shown in FIG. 29.
Figure 33:
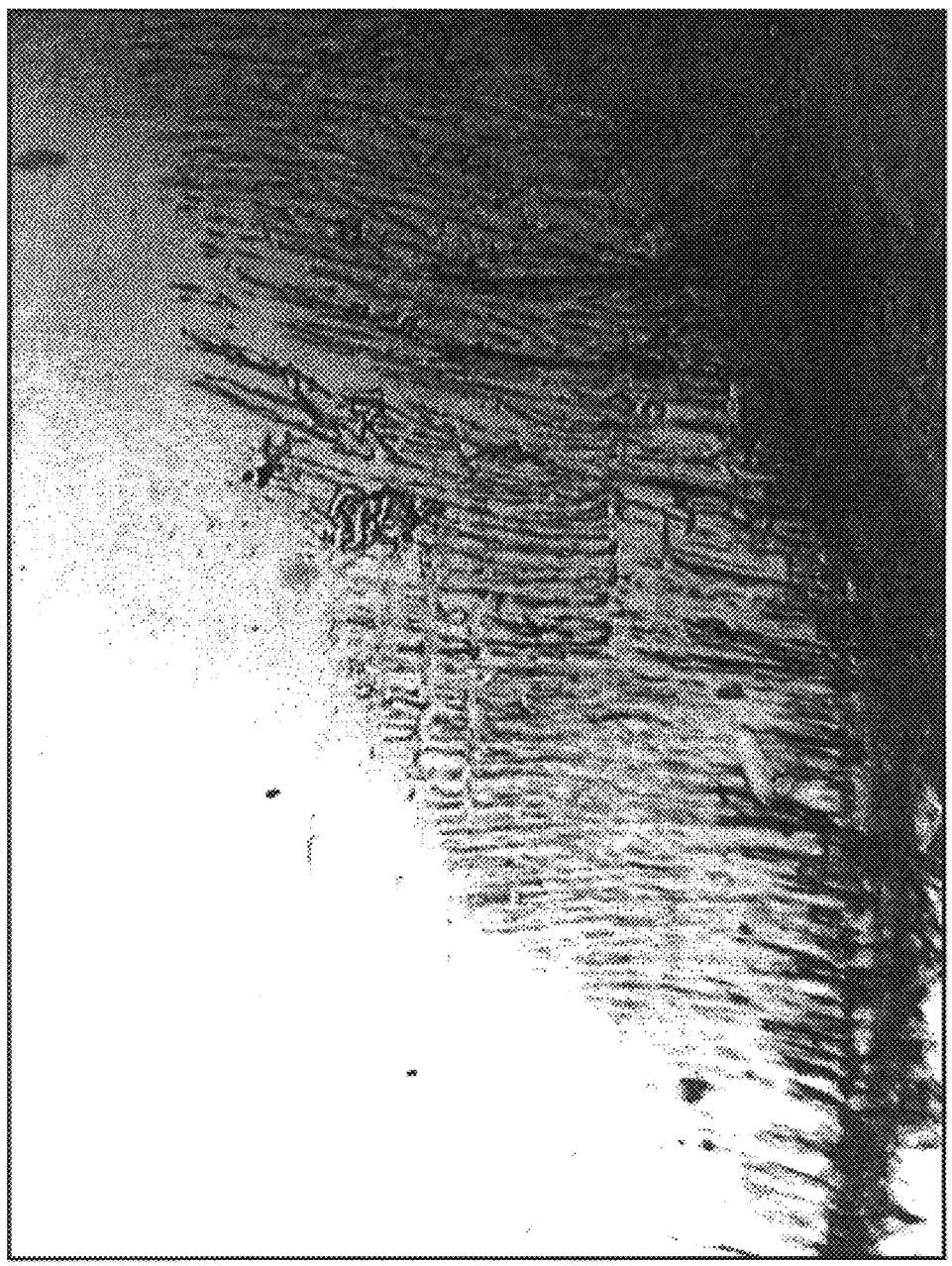
FIG. 33 is a microscopic photograph of an exposed surface which was prepared by peeling off a first resin layer of a multi-layered bottle obtained in Example 1 and stained with iodine tincture.

One of the resultant parisons was sectioned through a plane including the axial line of the parison, and the N-MXD6 resin (the second resin) exposed on the sectioned surface was stained with iodine tincture. A photograph of the sectioned surface was taken (real dimensions), and digitized. FIG. 26 shows the resultant view. Further, there were prepared photographs of areas, corresponding to areas "a" and "b" in FIG. 26, which areas were enlarged 18 times the real dimensions, and the photographs were digitized. FIGS. 27 and 28 show the resultant views. Further, another parison was sectioned through a plane perpendicular to the axial line of the parison, a sectioned ring-like parison was further sectioned into two equal parts, and the N-MXD6 resin (the second resin) exposed on the sectioned surface was stained with iodine tincture. A photograph of the sectioned surface was taken through a microscope (4 diameters), and the photograph was digitized. FIG. 29 shows the resultant view. Further, there were prepared photographs of areas corresponding to areas "e", "f" and "g" in FIG. 29 which areas were enlarged 9 times, and the photographs were digitized. FIG. 30, 31 and 32 show the resultant views. Further, the first resin layer of the obtained multi-layered bottle was peeled off, and an exposed surface was stained with iodine tincture. A photograph of the exposed surface was taken and enlarged. FIG. 33 shows the enlarged photograph.

Figure 40:
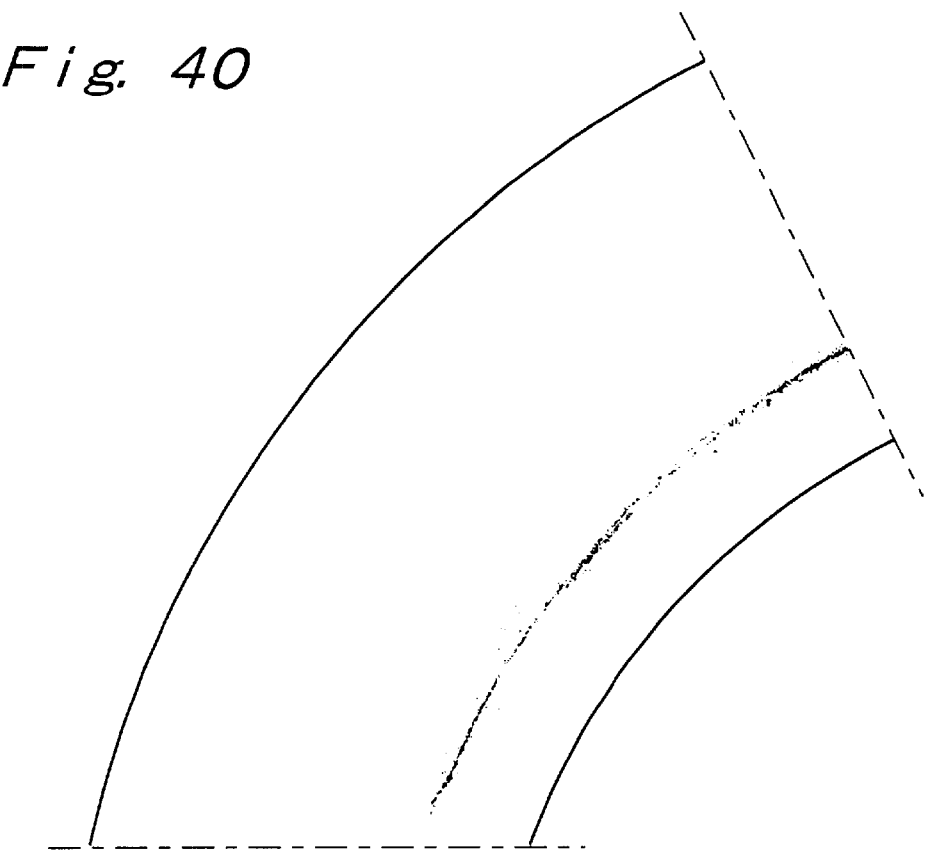
FIG. 40 is a view prepared by digitizing an enlarged photograph of further another portion of cross section of the parison shown in FIG. 37.
Figure 41:
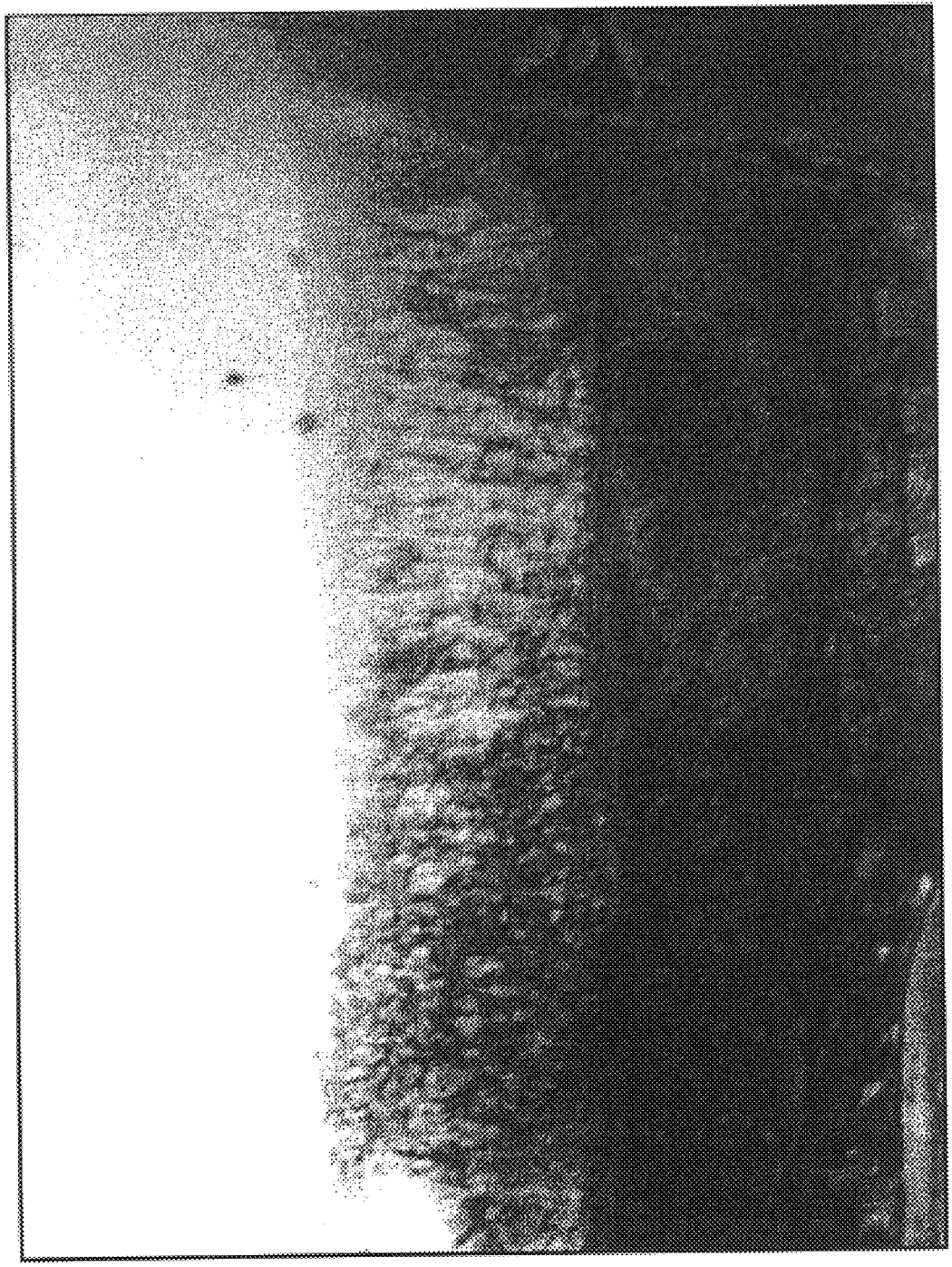
FIG. 41 is a microscopic photograph of an exposed surface which was prepared by peeling off a first resin layer of a multi-layered bottle obtained in Example 2 and stained with iodine tincture.

In FIGS. 26 to 32 and FIGS. 34 to 40 to be explained later, black areas show the N-MXD6 resin, and outlined white areas show the PET resin. Further, in FIGS. 33 and 41, blackish areas show the N-MXD6 resin, and white areas show the PET resin. In FIG. 33, on the left-hand side is the second portion side, and on the right-hand side is the first portion side. In FIG. 41, on the left-hand side is the third portion side, and on the right-hand side is the second portion side.

In the obtained parison, the position of the boundary area of the first portion 41 and the second portion 42 along the axial line of the parison changes in a circumferential direction of the obtained parison. That is, the area "e" in FIG. 29 (see FIG. 30 for details) is an area which constitutes the first portion 41 of the three-layered structure and is considerably apart from the second portion 42. Further, the area "f" in FIG. 29 (see FIG. 31 for details) is an area which constitutes the first portion 41 of the three-layered structure and is close to the second portion 42. Furthermore, the area "g" in FIG. 29 (see FIG. 32 for details) is an area of the first portion region 41b in the vicinity of the second portion 42, in which region, the thickness of the second resin layer (N-MXD6 resin layer) decreases toward the second portion 42 and the second resin layer (N-MXD6 resin layer) is discontinuously present. FIGS. 26 to 28 and FIG. 33 show that, in the first portion region 41b near the second portion 42, the thickness of the second resin layer (N-MXD6 resin layer) decreases toward the second portion 42, and the second resin layer (N-MXD6 resin layer) is discontinuously present. In the first portion, the second resin layer had a thickness which decreased towards the second portion gradually.

EXAMPLE 2

The same resins as those in Example 1 and the same injection molding apparatus as that in Example 1 were used for injection molding. Temperature conditions were set as shown in Table 1. Example 2 differs from Example 1 in the following point. Example 1 employed a simultaneous-injection molding method, while Example 2 employed an alternate-injection molding method.

Before injection molding, the first molten resin 40A which flowed into the second resin-flow-passage 23B in a previous molding cycle (the total of the first molten resin 40a which was left in the second resin-flow-passage 23B and the first molten resin 40A which was to constitute the crudely-mixed-state resin portion 40b) was left in the second resin-flow-passage 23B in an amount equivalent to 15% of the volume of each cavity 25.

First, in the same manner as in [Step-100], the first molten resin 40A (molten PET resin) was injected into each cavity 25 in an amount equivalent to 40% of the volume of each cavity 25. In this step, no first molten resin 40A flowed into the second resin-flow-passage 23B.

Then, the injection of the first molten resin 40A was discontinued, and, in the same manner as in [Step-110], the second molten resin 40B (molten N-MXD6 resin) was injected into each cavity 25 from the second injection cylinder 10B in an amount equivalent to 5% of the volume of each cavity 25. The crudely-mixed-state resin portion 40b and the first molten resin 40a which flowed into and was left in the second resin-flow-passage 23B in the previous molding cycle, were also injected into each cavity 25. In this step, neither second molten resin 40B nor first molten resin 40a flowed into the first resin-flow-passage 23A.

Then, the injection of the second molten resin 40B was terminated, and in the same manner as in [Step-120], the first molten resin 40A (molten PET resin) was injected into each cavity 25 from the first injection cylinder 10A. The amount of the first resin 40A injected in this step was a total of an amount equivalent to 40% of each cavity 25 to fill each cavity 25 with the molten resins and an amount equivalent to an amount in which the second molten resin 40B in the second resin-flow-passage 23B flowed back. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 15% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had the structure as shown in FIG. 3, and these resin layers were finely formed without any turbulence. Further, there was found no phenomenon that the N-MXD6 resin layer came to exist on the outermost layer (the inner surface and the outer surface) of the parison. When the obtained multi-layered parisons were heated at 100° C. and biaxially stretch blow molded into multi-layered bottles, each of the obtained multi-layered bottles had an excellent appearance. A test piece was taken from a portion including the first portion 51 and the second portion 52 of the multi-layered bottle and measured for an interlayer adhesion strength to show that the adhesion strength between the PET resin layer and the N-MXD6 resin layer was 45 gf/10 mm. Further, it was found that the thickness of the second-resin-layer/fourth-resin-layer extension layer 52C in the second portion region 52c in the vicinity of the third portion 53 decreased toward the third portion 53 and that the second-resin-layer/fourth-resin-layer extension layer 52C was discontinuously present. Specifically, it was found that, in the second portion region 52c, the second resin was dispersed like islands along the direction toward the third portion 53 and extended in an acicular state along the direction toward the third portion 53, as shown in FIG. 5B.

Figure 34:
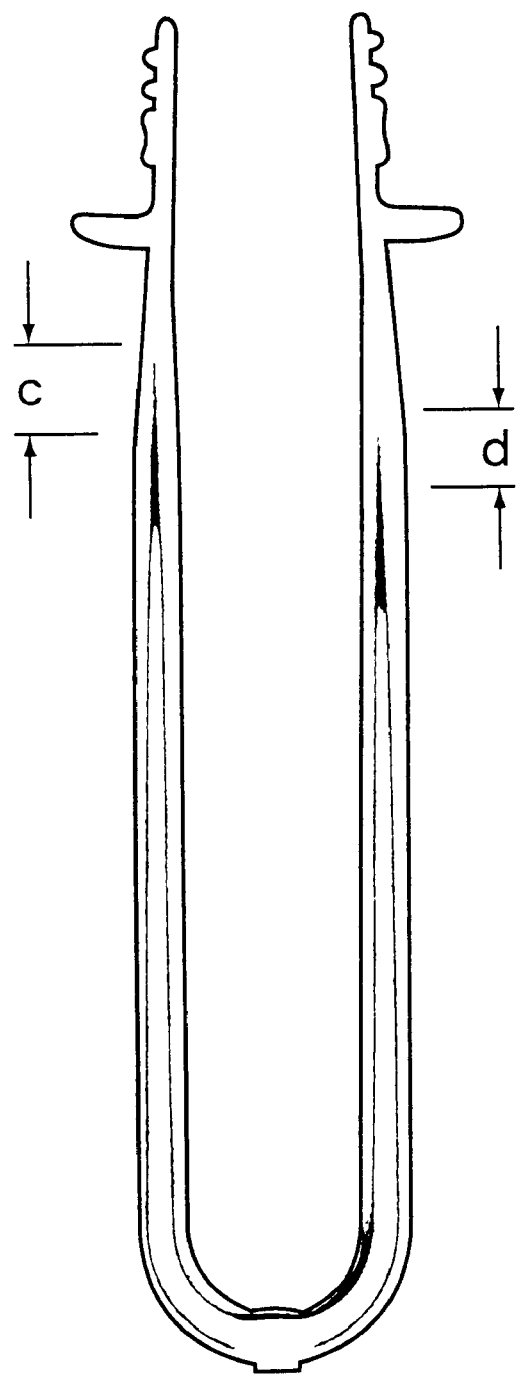
FIG. 34 is a view prepared by digitizing a photograph of cross section of a parison obtained in Example 2.
Figure 35:
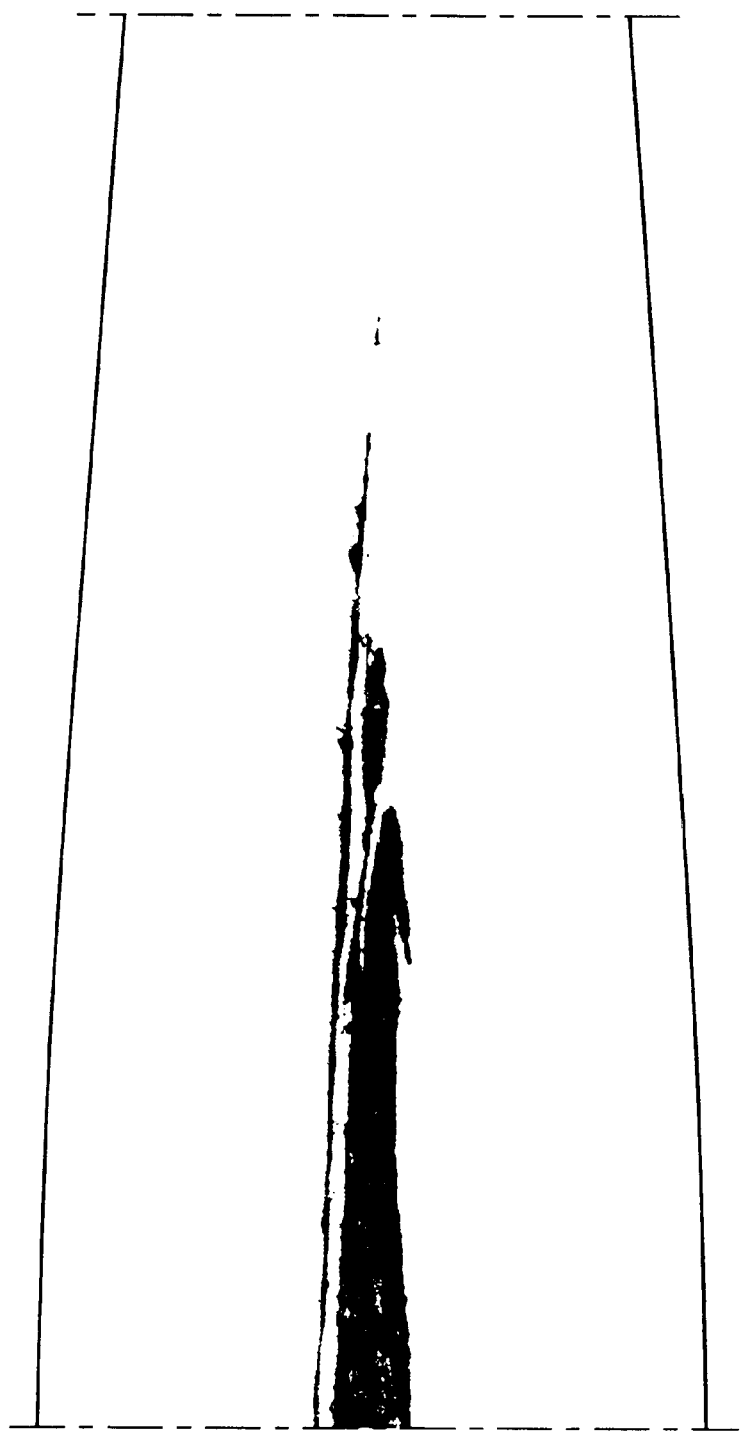
FIG. 35 is a view prepared by digitizing an enlarged photograph of one portion of cross section of the parison shown in FIG. 34.
Figure 36:
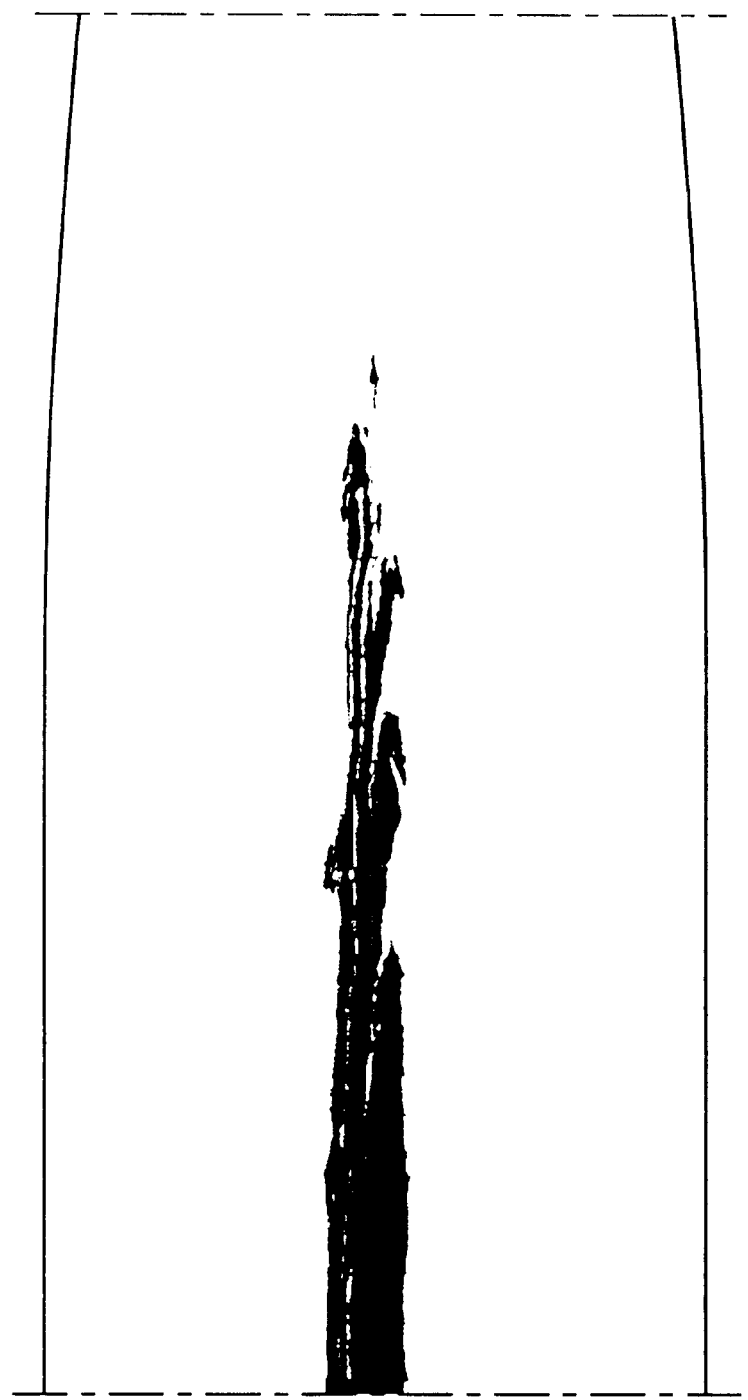
FIG. 36 is a view prepared by digitizing an enlarged photograph of other portion of cross section of the parison shown in FIG. 34.
Figure 37:
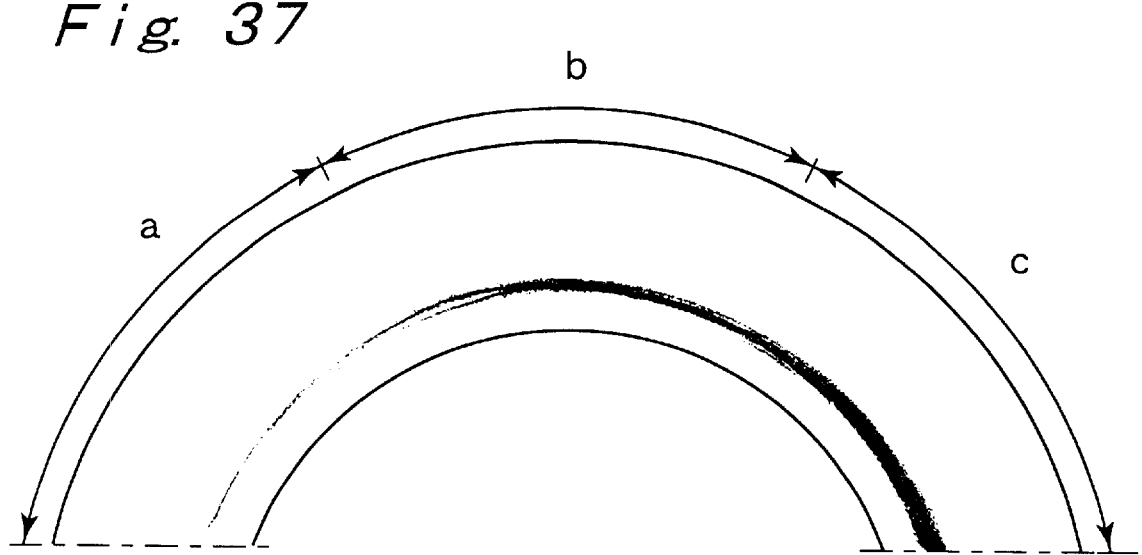
FIG. 37 is a view prepared by digitizing a photograph, taken from an angle different from that for FIG. 34, of cross section of a parison obtained in Example 2.
Figure 38:
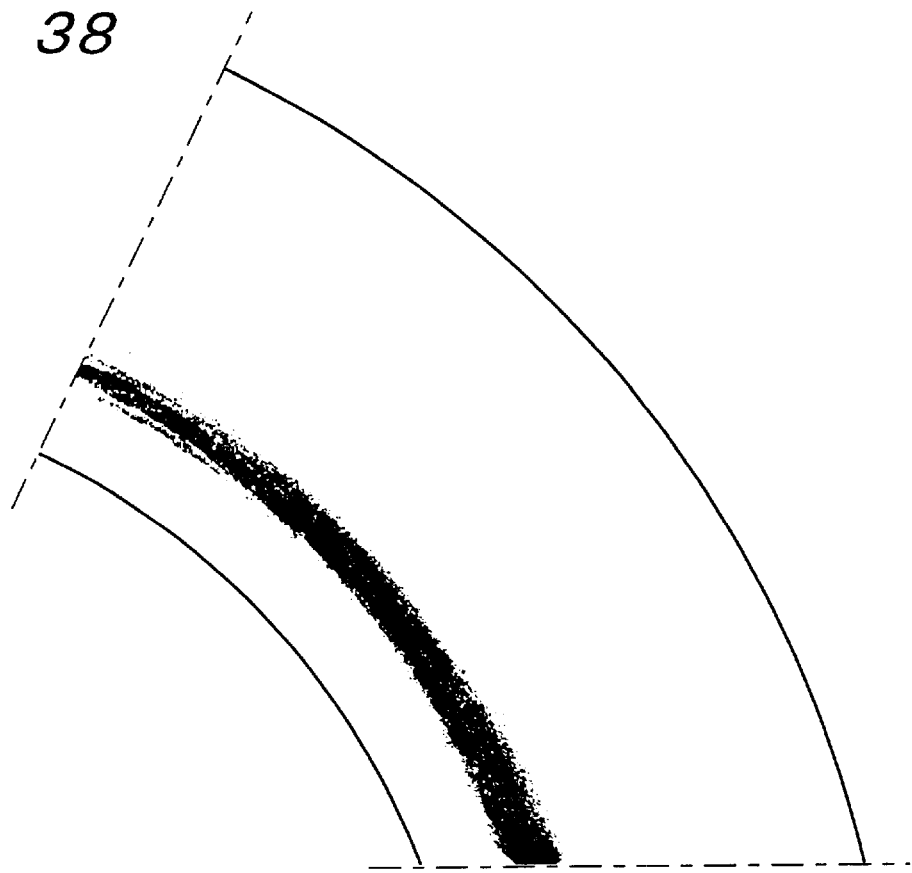
FIG. 38 is a view prepared by digitizing an enlarged photograph of one portion of cross section of the parison shown in FIG. 37.
Figure 39:
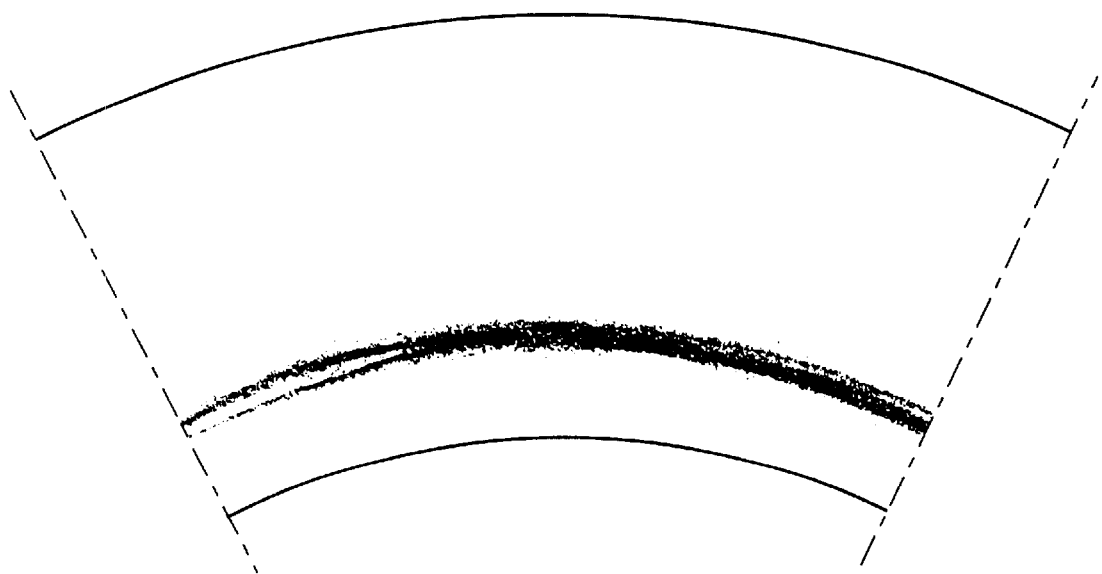
FIG. 39 is a view prepared by digitizing an enlarged photograph of another portion of cross section of the parison shown in FIG. 37.

One of the resultant parisons was sectioned through a plane including the axial line of the parison, and the N-MXD6 resin (the second resin) exposed on the sectioned surface was stained with iodine tincture. A photograph of the sectioned surface was taken (real dimensions), and digitized. FIG. 34 shows the resultant view. Further, there were prepared photographs of areas corresponding to areas "c" and "d" in FIG. 34 which areas were enlarged 18 times the real dimensions, and the photographs were digitized. FIGS. 35 and 36 show the resultant views. Further, another parison was sectioned through a plane perpendicular to the axial line of the parison, a sectioned ring-like parison was further sectioned into two equal parts, and the N-MXD6 resin (the second resin) exposed on the sectioned surface was stained with iodine tincture. A photograph of the sectioned surface was taken through a microscope (4 diameters), and the photograph was digitized. FIG. 37 shows the resultant view. Further, there were prepared photographs of areas, corresponding to areas "c", "b" and "a" in FIG. 37, which areas were enlarged 9 times, and the photographs were digitized. FIG. 38, 39 and 40 show the resultant views. Further, the first resin layer of the obtained multi-layered bottle was peeled off, and an exposed surface was stained with iodine tincture. A photograph of the exposed surface was taken and enlarged. FIG. 41 shows the enlarged photograph.

In the obtained parison, the position of a boundary area of the second portion 52 and the third portion 53 along the axial line of the parison changes in a circumferential direction of the obtained parison. That is, the area "c" in FIG. 37 (see FIG. 38 for details) is an area which constitutes the second portion 52 of the five-layered structure and is considerably apart from the third portion 53. Further, the area "b" in FIG. 37 (see FIG. 39 for details) is an area which constitutes the second portion 52 of the five-layered structure and is close to the third portion 53. Furthermore, the area "a" in FIG. 37 (see FIG. 40 for details) is an area of the second portion region 52b in the vicinity of the third portion 53, in which region, the thickness of the second-resin-layer/fourth-resin-layer extension layer (N-MXD6 resin layer) decreases toward the third portion 53 and the second-resin-layer/fourth-resin-layer extension layer (N-MXD6 resin layer) is discontinuously present.

COMPARATIVE EXAMPLE 1

Parisons were molded in the same manner as in Example 1 (a simultaneous-injection molding method) using the same first and second resins and the same injection molding apparatus as those described in Example 1, except that the back flow means was replaced with a conventional ball check valve for preventing back flow of a molten resin.

First, the first molten resin 40A (molten PET resin) was injected into each cavity 25 in an amount equivalent to 20% of the volume of each cavity 25. No first molten resin flowed into the second resin-flow-passage 23B in a previous molding cycle. In this step, no first molten resin 40A flowed into the second resin-flow-passage 23B.

Then, while the injection of the first molten resin 40A (molten PET resin) into each cavity 25 was continued, the second molten resin 40B (molten N-MXD6 resin) was injected into each cavity 25 from the second injection cylinder 10B in an amount equivalent to 5% of the volume of each cavity 25.

Then, the injection of the second molten resin 40B into each cavity 25 was terminated. And, the injection of the first molten resin 40A (molten PET resin) into each cavity 25 was continued, to completely fill each cavity 25 with the molten resin in an amount equivalent to 75% of the volume of each cavity 25.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. When the injection of the first molten resin 40A (molten PET resin) was initiated, the second molten resin 40B (molten N-MXD6 resin) in the second resin-flow-passage 23B was taken together into the cavity 25, and the second resin 40B (N-MXD6 resin) appeared on the outermost surface layer formed of the first resin 40A (PET resin) near the opening portion of the obtained three-layered parison. Further, the thickness of the second resin layer region of the first portion region in the vicinity of the second portion 42 was nearly uniform toward the second portion 42, and in the first portion region, there was found no phenomenon that the second resin layer 41B was discontinuously present (FIG. 24). The obtained multi-layered parison was heated up to 100° C. and formed into a multi-layered bottle by a biaxial stretch blow molding method. A test piece was taken from a portion including the first portion 41 and the second portion 42 of the multi-layered bottle and measured for an interlayer adhesion strength to show that the adhesion strength between the PET resin layer and the N-MXD resin layer was 15 gf/10 mm.

COMPARATIVE EXAMPLE 2

Parisons were molded in the same manner as in Example 2 (an alternate-injection molding method) using the same first and second resins and the same injection molding apparatus as those described in Example 1, except that the back flow means was replaced with a conventional ball check valve for preventing back flow of a molten resin.

First, in the same manner as in [Step-100], the first molten resin 40A (molten PET resin) was injected into each cavity 25 in an amount equivalent to 40% of the volume of each cavity 25. No first molten resin flowed into the second resin-flow-passage 23B in a previous molding cycle. In this step, no first molten resin 40A flowed into the second resin-flow-passage 23B.

Then, in the same manner as in [Step-100], the second molten resin 40B (molten N-MXD6 resin) was injected into each cavity 25 from the second injection cylinder 10B in an amount equivalent to 5% of the volume of each cavity 25.

Then, in the same manner as in [Step-120], the first molten resin 40A (molten PET resin) was injected into each cavity 25 from the first injection cylinder 10A in an amount equivalent to 55% of the volume of each cavity 25 to fill each cavity 25 with the molten resins. In this step, the first molten resin 40A did not flow into the second resin-flow-passage 23B since the conventional check valve was used.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. The second resin 40B (N-MXD6 resin) appeared on the outermost surface layer formed of the first resin 40A (PET resin) near the opening portion of the obtained five-layered parison. Further, the thickness of the second-resin-layer/fourth-resin-layer extension layer 52C decreases toward the third portion 53, however, the ending portion of the second-resin-layer/fourth-resin-layer extension layer 52C came to be roundish. There was found no phenomenon that the second-resin-layer/fourth-resin-layer extension layer 52C was discontinuously present (FIG. 25). The obtained multi-layered parison was heated up to 100° C. and formed into a multi-layered bottle by a biaxial stretch blow molding method. A test piece was taken from a portion including the first portion 51, the second portion 52 and the third portion 53 of the multi-layered bottle and measured for an interlayer adhesion strength to show that the adhesion strength between the PET resin layer and the N-MXD resin layer was 15 gf/10 mm.

The present invention has been explained with reference to preferred embodiments hereinabove, while the present invention shall not be limited thereto. The injection molding apparatus explained is shown as an example and may be modified in design as required. Further, the injection molding conditions explained in Examples are shown as examples and may be modified in design or changed as required. The resins used in Examples are also shown as examples.

For injection-molding the multi-layered article according to the first or third aspect of the present invention, in some cases, an injection molding apparatus provided with a shut-off valve may be used. In a conventional injection molding method, the nozzle portion 12B of the second injection cylinder 10B is provided with a shut-off valve operable with a hydraulic cylinder. In a conventional injection molding method, immediately after the completion of [Step-110], the hydraulic cylinder is operated to close the shut-off valve, so that back flow of the second molten resin 40B into the second injection cylinder 10B is prevented. For injection-molding the multi-layered article according to the first or third aspect of the present invention, the shut-off valve is kept open even after the completion of [Step-110], and the hydraulic cylinder is operated to close the shut-off valve at a point of time when the second molten resin 40B having a volume equal to the volume of the first molten resin 40A which flows into the second resin-flow-passage 23B flows back into the second injection cylinder 10B, so that further back flow of the second molten resin 40B into the second injection cylinder 10B is prevented, whereby the first molten resin in the first resin-flow-passage can be allowed to flow into the second resin-flow-passage. The timing of closing the shut-off valve provided in the second injection cylinder 10B after the initiation of injection of the first molten resin 40A in [Step-120] can be determined by carrying out various experiments.

Otherwise, the injection hydraulic cylinder 18B provided in the second injection cylinder 10B may be modified, and the back flow means may be constituted of the screw 11B provided in the second injection cylinder 10B and the injection hydraulic cylinder 18B. That is, when a pressure of the second molten resin 40B is exerted on the screw 11B from the cavity side, the screw 11B is not free to move backward, but moves back in a predetermined quantity, and the injection hydraulic cylinder 18B is allowed to have the function to inhibit any further backward movement of the screw 11B. In the above constitution, in [Step-120], when the first molten resin 40A flows into the second resin-flow-passage 23B, the second molten resin 40B flows back into the injection cylinder 10B. However, at a point of time when the second molten resin 40B having a volume equal to the first molten resin 40A which flows into the second resin-flow-passage 23B flows back into the second injection cylinder 10B, any further backward movement of the screw 11B is inhibited by the injection hydraulic cylinder 18B. That is, any further back flow of the second molten resin 40B into the second injection cylinder 10B is inhibited, and as a result, the amount of the first molten resin 40A which flows into the second resin-flow-passage 23B is controlled to be constant. In this manner, a constant amount of the first molten resin in the first resin-flow-passage can be allowed to flow into the second resin-flow-passage.

In the multi-layered article of the present invention, part of the second resin layer or part of the second-resin-layer/fourth-resin-layer extension layer gradually decreases, and these portions therefore come to be not easily observable, so that the multi-layered article can have an excellent appearance and further that the multi-layered article as a whole can be further improved in gas-barrier properties. Moreover, in the above part, the second resin layer or the second-resin-layer/fourth-resin-layer extension layer is discontinuously present, so that the multi-layered article can be improved in interlayer separation strength and that the problem of whitening with the lapse of time can be overcome. Further, the multi-layered article is free from the problem that the resin layer which is not to constitute the outermost layer appears on the outermost surface layer.

What is claimed is:

1. A multi-layered article having a first portion constituted of laminated three resin layers and a second portion extending from the first portion, the first portion being constituted mainly of consecutively laminated resin layers composed of a first resin layer formed of a first resin, a second resin layer formed mainly of a second resin and a third resin layer formed of the first resin, the second portion being constituted of resin layers extending from the first resin layer and the third resin layer which constitute the first portion, the first resin layer constituting the outer surface layer of the multi-layered article, the third resin layer constituting the inner surface layer of the multilayered article which inner surface layer is opposed to said outer surface layer, the second resin layer being encapsulated with the first resin layer and the third resin layer, and the second resin layer having a thickness which decreases towards the second portion, said second resin layer being discontinuously present in a region of the first portion connected to the second portion and along the direction toward the second portion and along the direction which is at right angles with the direction toward the second portion and is at right angles with the thickness direction of the multilayered article, and said second resin layer being continued in a region of the first portion other than said region of the first portion connected to the second portion.

2. The multi-layered article according to claim 1, wherein, in the first portion, the second resin layer has a thickness which decreases towards the second portion gradually.

3. The multi-layered article according to claim 1, wherein the first resin is at least one resin selected from the group consisting of a thermoplastic polyester resin, a thermoplastic copolyester resin, a polyolefin resin, an aliphatic polyamide resin, a polycarbonate resin, a polyacrylonitrile resin, a polyvinyl chloride resin and a polystyrene resin, and the second resin is at least one resin selected from the group consisting of a thermoplastic resin having gas barrier properties, a recycled polyethylene terephthalate resin and a colored polyethylene terephthalate resin.

4. The multi-layered article according to claim 3, wherein the thermoplastic resin having gas barrier properties is at least one resin selected from the group consisting of a m-xylylene-group-containing polyamide resin, a saponification product of an ethylene-vinyl acetate copolymer resin, a polyacrylonitrile resin and a polyvinylidene chloride resin.

5. The multi-layered article according to claim 1, wherein the multi-layered article is a multi-layered container.

6. The multi-layered article according to claim 1, wherein the multi-layered article is a parison as a precursor for forming a multi-layered container.

7. The multi-layered article according to claim 1, wherein the multi-layered article is a blow molded multi-layered container.

8. The multi-layered article according to claim 1, wherein the multi-layered article is molded using an injection molding apparatus which comprises;

(a) a mold having a cavity block provided with a cavity and a hot runner block, (b) a first injection cylinder for injection a first molten resin and a second injection cylinder for injecting a second molten resin, (c) a first resin-flow-passage for connecting an inside of the first injection cylinder and the cavity, and (d) a second resin-flow-passage for connecting an inside of the second injection cylinder and the cavity, the injection molding apparatus having a structure in which, those portions of the first and second resin-flow-passages which are located within the mold are provided in the hot runner block, and the first resin-flow-passage and the second resin-flow-passage meet with each other in a junction portion upstream to a gate portion opened to the cavity, the injection molding apparatus being provided with back flow means for letting the first molten resin in the first resin-flow-passage flow into the second resin-flow-passage after the second molten resin is injected into the cavity through the second resin-flow-passage, and the back flow means being operable with a pressure which the first molten resin in the first resin-flow-passage exerts on the second molten resin in the second resin-flow-passage, wherein the first portion is constituted mainly of consecutively laminated resin layers composed of the first resin layer and the third resin layer which are formed of the first molten resin injected from the first injection cylinder into e cavity trough the first resin-flow-passage and the gate portion, and the second resin layer which is formed of the second molten resin injected from the second injection cylinder into the cavity through the second resin-flow-passage and the a portion, and said region of the first portion connected to the second portion is formed of the first molten resin which has flowed into the second resin-flow-passage and the second molten resin from the second injection cylinder wherein the second resin layer is discontinuously present in said region of the first portion connected to the second portion and along the direction toward the second portion and along the direction which is at right angles with the direction toward the second portion and is at right angles with the thickness direction of the multi-layered article.

9. The multi-layered article according to claim 8, wherein the volume of the first molten resin which is allowed to flow into the second resin-flow-passage is 5 to 50%.

10. The multi-layered article according to claim 9, wherein the volume of the first molten resin which is allowed to flow into the second resin-flow-passage is 5 to 25%.

11. The multi-layered article according to claim 8, wherein the first resin is at least one resin selected from the group consisting of a thermoplastic polyester resin, a thermoplastic copolyester resin, a polyolefin resin, an aliphatic polyamide resin, a polycarbonate resin, a polyacrylonitrile resin, a polyvinyl chloride resin and a polystyrene resin, and the second resin is at least one resin selected from the group consisting of a thermoplastic resin having gas barrier properties, a recycled polyethylene terephthalate resin and a colored polyethylene terephthalate resin.

12. The multi-layered article according to claim 11, wherein the thermoplastic resin having gas barrier properties is at least one resin selected from the group consisting of a m-xylylene-group-containing polyamide resin, a saponification product of an ethylene-vinyl acetate copolymer resin, a polyacrylonitrile resin and a polyvinylidene chloride resin.

13. The multi-layered article according to claim 8, wherein the multi-layered article is a multi-layered container.

14. The multi-layered article according to claim 8, wherein the multi-layered article is a parison as a precursor for forming a multi-layered container.

15. The multi-layered article according to claim 8, wherein the multi-layered article is a blow molded multi-layered container.

16. A multi-layered article having a first portion constituted of laminated five resin layers, a second portion extending from the first portion and a third portion extending from the second portion, the first portion being constituted mainly of consecutively laminated resin layers composed of a first resin layer formed of a first resin, a second resin layer formed of a second resin, a third resin layer formed of the first resin, a fourth resin layer formed of the second resin and a fifth resin layer formed of the first resin, the second portion being constituted mainly of a first-resin-layer extension layer extending from the first resin layer constituting the first portion, a fifth-resin-layer extension layer extending from the fifth resin layer constituting the first portion, and a second-resin-layer/fourth-resin-layer extension layer mainly extending from the second resin layer and the fourth resin layer constituting the first portion, the third portion being constituted of resin layers extending from the first-resin-layer extension layer and the fifth-resin-layer extension layer constituting the second portion, the first resin layer and the first-resin-layer extension layer constituting the outer surface layer of the multi-layered article, the fifth resin layer and the fifth-resin-layer extension layer constituting the inner surface layer of the multilayered article which inner surface layer is opposed to said outer surface layer, the second resin layer being encapsulated with the first resin layer and the third resin layer, the fourth resin layer being encapsulated with the fifth resin layer and the third resin layer, the second-resin-layer/fourth-resin-layer extension layer being encapsulated with the first-resin-layer extension layer and the fifth-resin-layer extension layers and the second-resin-layer/fourth-resin-layer extension layer having a thickness which decreases toward the third portion, being discontinued in a region of the second portion connected to the third portion and being continued in a region of the second portion other than said region of the second portion connected to the third portion.

17. The multi-layered article according to claim 16, wherein the second-resin-layer/fourth-resin-layer extension layer is discontinuously present in said region of the second portion connected to the third portion and along the direction toward the third portion and along the direction which is at right angles with the direction toward the third portion and is at right angles with the thickness direction of the multi-layered article.

18. The multi-layered article according to claim 16, wherein the first resin is at least one resin selected from the group consisting of a thermoplastic polyester resin, a thermoplastic copolyester resin, a polyolefin resin, an aliphatic polyamide resin, a polycarbonate resin, a polyacrylonitrile resin, a polyvinyl chloride resin and a polystyrene resin, and the second resin is at least one resin selected from the group consisting of a thermoplastic resin having gas barrier properties, a recycled polyethylene terephthalate resin and a colored polyethylene terephthalate resin.

19. The multi-layered article according to claim 18, wherein the thermoplastic resin having gas barrier properties is at least one resin selected from the group consisting of a m-xylylene-group-containing polyamide resin, a saponification product of an ethylene-vinyl acetate copolymer resin, a polyacrylonitrile resin and a polyvinylidene chloride resin.

20. The multi-layered article according to claim 16, wherein the multi-layered article is a multi-layered container.

21. The multi-layered article according to claim 16, wherein the multi-layered article is a parison as a precursor for forming a multi-layered container.

22. The multi-layered article according to claim 16, wherein the multi-layered article is a blow molded multi-layered container.

23. The multi-layered article according to claim 16, wherein the multi-layered article is molded using an injection molding apparatus which comprises;

(a) a mold having a cavity block provided with a cavity and a hot runner block, (b) a first injection cylinder for injecting a first molten resin and a second injection cylinder for injecting a second molten resin, (c) a first resin-flow-passage for connecting an inside of the first injection cylinder cylinder and the cavity, and (d) a second resin-flow-passage for connecting an inside of the second injection cylinder and the cavity, the injection molding apparatus having a structure in which;

those portions of the first and second resin-flow-passages which are located within the mold are provided in the hot runner block, and the first resin-flow-passage and the second resin-flow-passage meet with each other in a junction portion upstream to a gate portion opened to the cavity, the injection molding apparatus being provided with back flow means for letting the first molten resin in the first resin-flow-passage flow into the second resin-flow-passage after the second molten resin is injected into the cavity through the second resin-flow-passage the back flow means being operable with a pressure which the first molten resin in the first resin-flow-passage exerts on the second molten resin in the second resin-flow-passage, wherein the first portion is constituted mainly of consecutively laminated resin layers composed of the first resin layer, the third resin layer and the fifth resin layer which are formed of the first molten resin injected from the first injection cylinder into the cavity trough the first resin-flow-passage and the gate portion, and the second resin layer and the fourth resin layer which are formed of the second molten resin injected from the second injection cylinder into the cavity through the second resin-flow-passage and the gate portion, and said region of the second portion connected to the third portion is formed of the first molten resin which has flowed into the second resin-flow-passage and the second molten resin from the second injection cylinder.

24. The multi-layered article according to claim 23 wherein the second-resin-layer/fourth-resin-layer extension layer is discontinuously present in said region of the second portion connected to the third portion and along the direction toward the third portion and along the direction which is at right angles with the direction toward the third portion and is at right angles with the thickness direction of the multi-layered article.

25. The multi-layered article according to claim 23, wherein the volume of the first molten resin which is allowed to flow into the second resin-flow-passage is 5 to 50%.

26. The multi-layered article according to claim 25, wherein the volume of the first molten resin which is allowed to flow into the second resin-flow-passage is 5 to 25%.

27. The multi-layered article according to claim 23, wherein the first resin is at least one resin selected from the group consisting of a thermoplastic polyester resin, a thermoplastic copolyester resin, a polyolefin resin, an aliphatic polyamide resin, a polycarbonate resin, a polyacrylonitrile resin, a polyvinyl chloride resin and a polystyrene resin, and the second resin is at least one resin selected from the group consisting of a thermoplastic resin having gas barrier properties, a recycled polyethylene terephthalate resin and a colored polyethylene terephthalate resin.

28. The multi-layered article according to claim 27, wherein the thermoplastic resin having gas barrier properties is at least one resin selected from the group consisting of a m-xylylene-group-containing polyamide resin, a saponification product of an ethylene-vinyl acetate copolymer resin, a polyacrylonitrile resin and a polyvinylidene chloride resin.

29. The multi-layered article according to claim 23, wherein the multi-layered article is a multi-layered container.

30. The multi-layered article according to claim 23, wherein the multi-layered article is a parison as a precursor for forming a multi-layered container.

31. The multi-layered article according to claim 23, wherein the multi-layered article is a blow molded multi-layered container.

* * * * *